(12) United States Patent
Ueda et al.

(10) Patent No.: US 8,812,732 B2
(45) Date of Patent: Aug. 19, 2014

(54) INFORMATION PROCESSING DEVICE, CONTENT USING SYSTEM, INFORMATION PROCESSING METHOD, AND COMPUTER PROGRAM

(75) Inventors: Kenjiro Ueda, Kanagawa (JP); Shinichi Fujita, Shizuoka (JP)

(73) Assignee: Sony Corporation, Tokyo (JP)

( * ) Notice: Subject to any disclaimer, the term of this patent is extended or adjusted under 35 U.S.C. 154(b) by 1139 days.

(21) Appl. No.: 12/211,373

(22) Filed: Sep. 16, 2008

(65) Prior Publication Data

US 2009/0094284 A1 Apr. 9, 2009

(30) Foreign Application Priority Data

Oct. 4, 2007 (JP) ................................. 2007-261400

(51) Int. Cl.
*G06F 15/16* (2006.01)

(52) U.S. Cl.
USPC ............ 709/246; 709/224; 707/736; 707/758

(58) Field of Classification Search
CPC ..... G06T 1/0021; G06T 1/0028; G06T 1/005; G06T 1/0071; G06T 2201/0064; G06T 2201/0065; G06T 2201/0051; G06T 2201/0052; G06F 17/30876; G06F 21/10; G06F 17/30017; G06F 21/00; G06F 11/3664
See application file for complete search history.

(56) References Cited

U.S. PATENT DOCUMENTS

| | | | |
|---|---|---|---|
| 8,014,761 B2 * | 9/2011 | Kelly et al. ................. | 455/414.1 |
| 8,099,519 B2 * | 1/2012 | Ueda et al. .................... | 709/246 |
| 2003/0161614 A1 | 8/2003 | Yanagihara et al. | |
| 2003/0231861 A1 * | 12/2003 | Yoo et al. ......................... | 386/46 |
| 2006/0155790 A1 * | 7/2006 | Jung et al. ..................... | 707/205 |
| 2006/0156354 A1 * | 7/2006 | Jung et al. ......................... | 725/86 |
| 2006/0164930 A1 * | 7/2006 | Seo et al. ..................... | 369/30.1 |
| 2006/0227975 A1 | 10/2006 | Ueda et al. | |
| 2007/0177466 A1 | 8/2007 | Ando et al. | |

FOREIGN PATENT DOCUMENTS

| | | |
|---|---|---|
| EP | 1 513 152 A1 | 3/2005 |
| EP | 1 950 963 A1 | 7/2008 |
| JP | 2002-41482 | 2/2002 |
| JP | 2002-101390 | 4/2002 |

(Continued)

OTHER PUBLICATIONS

"White Paper Blu-Ray Disc Format 2.B Audio Visual Application Format Specifications for BD-ROM", http://www.blu-raydisc.com/assets/downloadablefile/2b_bdrom_audiovisualapplication_0305-12955-13403.pdf>, Internet draft, XP007903517, Mar. 31, 2005, 35 pages.

(Continued)

*Primary Examiner* — Shyue Jiunn Hwa
(74) *Attorney, Agent, or Firm* — Oblon, Spivak, McClelland, Maier & Neustadt, L.L.P.

(57) ABSTRACT

An information processing device for executing playback processing of a disc recorded content, includes: a data processing unit configured to employ a playlist where content playback order information has been recorded to execute playback of a content; and a local storage unit storing a content; wherein the data processing unit plays a local storage unit stored content instead of a disc recorded content specified with the playlist by content obtaining processing employing mapping information for obtaining a local storage unit stored content as a playback content by employing a disc recorded content information recorded in the playlist. Thus, for example, processing can be performed such that a new commercial content provided by a server is played instead of an old commercial content recorded in a disc.

9 Claims, 33 Drawing Sheets

(56) References Cited

FOREIGN PATENT DOCUMENTS

| | | |
|---|---|---|
| JP | 2002-183587 | 6/2002 |
| JP | 2002-325221 | 11/2002 |
| JP | 3772023 | 2/2006 |
| JP | 3772023 | 5/2006 |
| JP | 2007-250161 | 9/2007 |
| WO | WO 2006/009305 A1 | 1/2006 |
| WO | WO 2006/073247 A1 | 7/2006 |
| WO | WO 2006/073259 A2 | 7/2006 |
| WO | WO 2007/058025 A1 | 5/2007 |

OTHER PUBLICATIONS

U.S. Appl. No. 12/424,906, filed Apr. 16, 2009, Fujita, et al.
U.S. Appl. No. 12/486,173, filed Jun. 17, 2009, Ueda, et al.
U.S. Appl. No. 12/234,075, filed Sep. 19, 2008, Ueda, et al.
U.S. Appl. No. 13/338,946, filed Dec. 28, 2011, Ueda, et al.

* cited by examiner

FIG. 3

| INDEX (INDEX DISTINGUISHABLE WITH APPLICATION LAYER, SUCH AS TITLE OR THE LIKE) | CONTENT MANAGEMENT UNIT NUMBER (CPS UNIT NUMBER) | ENCRYPTED CPS UNIT KEY |
|---|---|---|
| TITLE 1 | CPS1 | [Ku1] |
| TITLE 2 | CPS1 | [Ku1] |
| APPLICATION 1 | CPS2 | [Ku2] |
| APPLICATION 2 | CPS3 | [Ku3] |
| .. | .. | .. |
| DATA GROUP 1 | CPS4 | [Ku4] |
| DATA GROUP 2 | CPS5 | [Ku5] |
| .. | .. | .. |

FIG. 10

| INDEX | (a) FILE NAME OF CONTENT ENTITY (DOWNLOAD CONTENT) | (b) PLAYBACK-SPECIFIED CONTENT FILE NAME ON PLAYLIST |
|---|---|---|
| 1 | BINDING_ROOT\DOWNLOAD\001.dat | root\BDMV\STREAM\00002.m2ts |
| 2 | BINDING_ROOT\DOWNLOAD\002.dat | root\AACS\Unit_Key_RO.inf |
| 3 | BINDING_ROOT\DOWNLOAD\003.dat | root\AACS\Content000.cer |
| 4 | BINDING_ROOT\DOWNLOAD\004.dat | root\AACS\CPSUnit00001.cci |

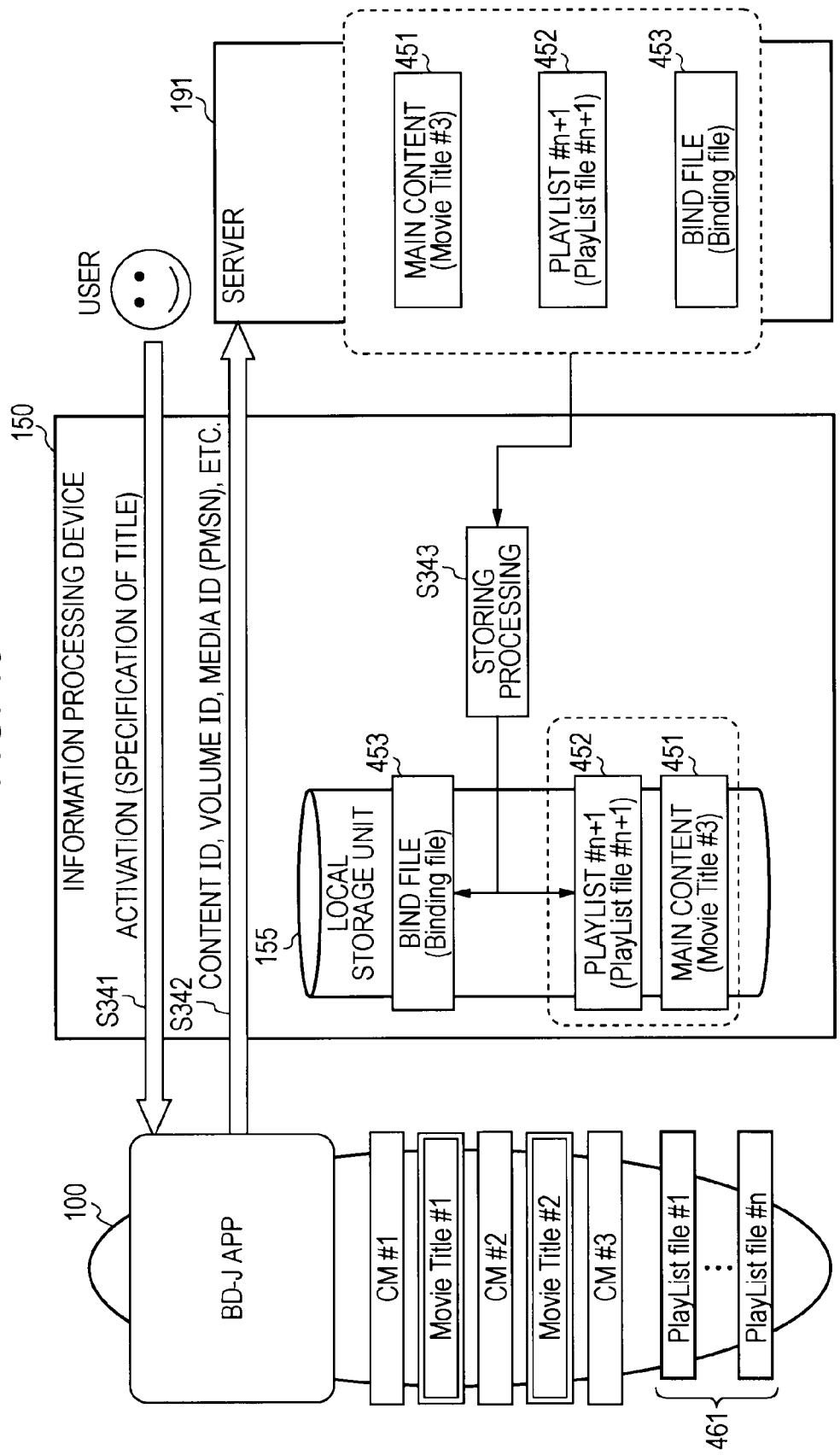

FIG. 20

- PlayList() {
  - Number of Streams (16 bits);
  - for (i = 0; i < n; i++) {
    - Stream file index (16 bits);
  - }
- }

THIS IS A FILE CREATED BY Authoring facility OF A CONTENT, AND DISPOSED IN THE SERVER. THE INDEX OF A FILE TO BE DOWNLOADED IS ADDED TO THIS LOOP. SUBSEQUENTLY, AN Updated PlayList TO WHICH AN Index HAS BEEN ADDED IS ALSO DOWNLOADED ALONG WITH THE CONTENT. ACCORDING TO THIS PROCESSING, A USER r CAN PLAY A CONTENT t IN DIFFERENT PLAYBACK SEQUENCE FROM WHICH ONE HAS IN THE PAST.

FIG. 22

| USAGE CONTROL INFORMATION [Usage Rules (IN THE CASE OF Movie Title)] |
|---|
| EPN (FLAG REGARDING INTERNET RETRANSMISSION)<br>EPN-unasserted: REFERENCED ONLY WHEN CCI IS Copy Control Not Asserted. |
| CCI (COPY CONTROL INFORMATION)<br>Never Copy: INHIBITION OF COPYING |
| Image_Constraint_Token (INFORMATION REGARDING RESOLUTION RESTRICTION)<br>High Definition Analog Output in High Definition Analog Form: NO RESOLUTION RESTRICTION |
| Digital_Only_Token (INFORMATION REGARDING ANALOG OUTPUT)<br>Output of decrypted content is allowed for Analog/Digital Outputs: BOTH OF DIGITAL AND ANALOG CAN BE OUTPUT |
| APS (INFORMATION REGARDING PROTECTION OF CONTENT SUBJECTED TO ANALOG OUTPUT)<br>APS1 on: type 1 (AGC): TYPE 1 of Macrovision |
| Type_of_Title (WHETHER TO BE A CONTENT WITH NETWORK CONNECTION AT THE TIME OF PLAYBACK)<br>Basic Title: NETWORK CONNECTION IS UNCALLED |

FIG. 23

| USAGE CONTROL INFORMATION [Usage Rules (IN THE CASE OF CM)] |
|---|
| EPN (FLAG REGARDING INTERNET RETRANSMISSION)<br>EPN-unasserted: ENCRYPTION IS UNCALLED |
| CCI (COPY CONTROL INFORMATION)<br>Copy Control Not Asserted: NO COPY RESTRICTION, RECORDED AS PLAIN TEXT |
| Image_Constraint_Token (INFORMATION REGARDING RESOLUTION RESTRICTION)<br>High Definition Analog Output in High Definition Analog Form: NO RESOLUTION RESTRICTION |
| Digital_Only_Token (INFORMATION REGARDING ANALOG OUTPUT)<br>Output of decrypted content is allowed for Analog/Digital Outputs: BOTH OF DIGITAL AND ANALOG CAN BE OUTPUT |
| APS (INFORMATION REGARDING PROTECTION OF CONTENT SUBJECTED TO ANALOG OUTPUT)<br>APS off: No ANALOG PROTECTION |
| Type_of_Title (WHETHER TO BE A CONTENT WITH NETWORK CONNECTION AT THE TIME OF PLAYBACK)<br>Basic Title: NETWORK CONNECTION IS UNCALLED |

FIG. 28

PURCHASING USER INFORMATION OF DISC ID #m

| INDEX | USER ID | USER PERSONAL INFORMATION | INFORMATION PROCESSING DEVICE ID (DEVICE ID) |
|---|---|---|---|
| 1 | 0xABCD... | ..... | ABCD... |
| 2 | 0xEFGH... | ..... | 0FGH... |
| 3 | 0xIJKL... | ..... | xIKL... |
| 4 | 0xMNOP... | ..... | 0NOP... |
| ... | ... | ... | ... |

INFORMATION PROCESSING DEVICE, CONTENT USING SYSTEM, INFORMATION PROCESSING METHOD, AND COMPUTER PROGRAM

CROSS REFERENCES TO RELATED APPLICATIONS

The present invention contains subject matter related to Japanese Patent Application JP 2007-261400 filed in the Japanese Patent Office on Oct. 4, 2007, the entire contents of which are incorporated herein by reference.

BACKGROUND OF THE INVENTION

1. Field of the Invention

The present invention relates to an information processing device, content using system, information processing method, and computer program. More particularly, the present invention relates to an information processing device, content using system, information processing method, and computer program whereby a content stored in an information processing device or content obtained from a server or the like in a post-release manner is played.

2. Description of the Related Art

Various data, such as audio data such as music or the like, image data such as a movie or the like, game programs, various types of application programs, or the like (hereafter, referred to as content) is recorded in a recording medium, e.g., an information recording medium (disc), such as a Blu-ray Disc (registered trademark), DVD (Digital Versatile Disc), or the like, and this medium can be provided to a user. For example, a Blu-ray Disc (registered trademark) employing blue laser is a disc capable of recording with high density, and can record a mass picture content or the like as high-definition data, and is employed widely.

A content stored disc is provided to a user, and the user can employ various types of playback device such as a PC (Personal Computer), disc player, or the like to play and use a content.

A content is recorded in a disc in a format stipulated beforehand. In the case of playing the content recorded in a predetermined format, processing employing a playlist recorded in a disc as playback order information along with the content can be performed. The playlist is a list stipulating the playback order of contents. For example, in a case wherein multiple movie contents 1, 2, 3, and so on, and multiple commercial contents a, b, c, and so on are recorded in a disc, a playlist stipulates the playback order of contents such as movie content 1→commercial a→movie content 2→commercial b→movie content 3→commercial c and so on, and the content playback order is determined, and playback processing is performed. Note that the number of playlists is not restricted to one, and a user can select and use a playlist from multiple playlists.

For example, in the case of a ROM disc wherein no new data recording can be performed, a disc stored content is basically fixed. Even immediately after the disc is provided to a user, the content of a playback content is not changed even after a certain period of time elapses. However, there is a case wherein a content such as a commercial or the like is preferably changed to the latest commercial or latest preview information, for example, after a certain period of time has elapsed since the disc was provided to the user. Also, even with a main content such as a movie content or the like, in a case wherein an update version such as corrected version, revised version, or the like has been created after the release of a disc, or the like, there is a case wherein the update version thereof is preferably provided to a user. Further, there is a case wherein data not stored in a disc when the disc was provided, is preferably provided to the disc possessing user as new additional data.

With regard to disc stored data, an arrangement has been disclosed in Japanese Patent No. 3772023 as the related art wherein data to be modified in a post-release manner and additional data and the like are provided to a user from a server through a network. Japanese Patent No. 3772023 has disclosed a content using system wherein a link image corresponding to a disc stored content is downloaded from a server to be stored in a storage unit such as a hard disk of a playback device, and the downloaded link image is played along with a disc recorded content. Such a system is employed, whereby a commercial of the latest version can be obtained from the server as the above-mentioned link image to subject this to playback processing.

However, the arrangement disclosed in Japanese Patent No. 3772023 is an arrangement wherein link information is recorded in a disc beforehand, and a downloaded content recorded in a hard disk is extracted and played in accordance with the link information, and is an arrangement wherein elapsed time since start of playback of a disc recorded content is measured at the time of playback to control playback timing, and playback of a disc content is stopped at predetermined set time to switch to playback of a downloaded content of the hard disk.

The arrangement disclosed in Japanese Patent No. 3772023 is an arrangement wherein with a certain content being provided from the server since release of a disc as a premise, link information is recorded in the disc under the premise thereof beforehand. Accordingly, it is not assumed that post-release data not scheduled at the time of release of a disc is provided to a user, and it is difficult to provide such data to the server in a post-release manner to play this instead of a disc stored content. Also, link information is recorded in the disc beforehand, which leads to a problem wherein post-release data is unavailable with a disc where link information is not recorded. Also, the playback device measures elapsed time since start of playback of a content, which leads to a problem wherein burden of the playback device becomes great.

SUMMARY OF THE INVENTION

There has been recognized a desire to provide an information processing device, content using system, information processing method, and computer program whereby a content stored in an information recording medium, and a content obtained from a server or the like in a post-release manner and stored in a local storage unit of a playback device can be switched and played without placing a great burden as to the playback device.

According to an embodiment of the present invention, an information processing device for executing playback processing of a disc recorded content includes: a data processing unit configured to employ a playlist where content playback order information has been recorded to execute playback of a content; and a local storage unit storing a content; with the data processing unit playing a local storage unit stored content instead of a disc recorded content specified with the playlist by content obtaining processing employing mapping information for obtaining a local storage unit stored content as a playback content by employing a disc recorded content information recorded in the playlist.

The local storage unit may store a binding file including mapping information of a disc recorded content and a local storage unit stored content; with the data processing unit building a file system including mapping information, and playing a local storage unit stored content instead of a disc recorded content recorded in the playlist by content playback processing employing the file system.

The data processing unit may execute processing for reading out an identifier for identifying a disc or content recorded in a disc to transmit this to a server, and receiving a content and the binding file from the server to store these in the local storage unit.

The data processing unit may receive a commercial content from the server to store this in the local storage unit, and execute playback of the commercial content stored in the local storage unit instead of a commercial content recorded in a disc.

The data processing unit may receive a commercial content and a playlist including the playback specification information of the commercial content thereof from the server to store this in the local storage unit, and execute playback processing by the playlist stored in the local storage unit to execute playback of the commercial content stored in the local storage unit.

The data processing unit may receive a content and a playlist from the server to store these in the local storage unit, and employ the playlist stored in the local storage unit to execute playback of the commercial content stored in the local storage unit.

The data processing unit may receive usage control information (Usage Rule) of a content from the server to store this in the local storage unit, and execute content usage control to which the usage control information stored in the local storage unit has been applied instead of usage control information recorded in a disc.

The data processing unit may receive a program content from the server to store this in the local storage unit, and execute playback of the program content stored in the local storage unit.

The data processing unit may transmit the component information of the program content stored in the disc to the server, receive a program component equivalent to the difference as to the disc stored program content from the server to store this in the local storage unit, and perform program execution processing employing both of the disc stored program and local storage unit stored program.

According to an embodiment of the present invention, a content using system includes: an information processing device configured to execute playback processing of a disc recorded content; and a server configured to execute content providing processing; with the information processing device reading out an identifier for identifying a disc or content recorded in a disc mounted on the information processing device to transmit this to the server; with the server transmitting a content selected based on the identifier received from the information processing device, and a binding file having mapping information of a disc recorded content and local storage unit stored content to the information processing device; with the information processing device storing the content and binding file received from the server in a local storage unit of the information processing device; and with a local storage unit stored content being played instead of a disc recorded content specified with a playlist by content playback processing employing mapping information of the binding file.

According to an embodiment of the present invention, an information processing method executed at an information processing device, which is a content playback step wherein a data processing unit executes playback of a content by employing a playlist where content playback order information has been recorded, includes the step of: playing a local storage unit stored content instead of a disc recorded content specified with the playlist by content obtaining processing employing mapping information for obtaining a local storage unit stored content as a playback content by employing the disc recorded content information recorded in the playlist.

The local storage unit may store a binding file including mapping information of a disc recorded content and a local storage unit stored content; with in the content playback step, a file system including mapping information being built by applying the binding file, and a local storage unit stored content being played instead of a disc recorded content recorded in the playlist.

The information processing method may further include the step of: executing processing wherein the data processing unit reads out an identifier for identifying a disc or content recorded in a disc to transmit this to a server, and receives a content and the binding file from the server to store these in the local storage unit.

The information processing method may further include the step of: executing processing wherein the data processing unit receives a commercial content from the server to store this in the local storage unit, and executes playback of the commercial content stored in the local storage unit instead of a commercial content recorded in a disc.

The information processing method further may include the step of: executing processing wherein the data processing unit receives a commercial content and a playlist including the playback specification information of the commercial content thereof to store these in the local storage unit, and executes playback processing with the playlist stored in the local storage unit to execute playback of the commercial content stored in the local storage unit.

The information processing method may further include the step of: executing processing wherein the data processing unit receives a content and a playlist from the server to store these in the local storage unit, and employs the playlist stored in the local storage unit to execute playback of the content stored in the local storage unit.

The information processing may further include the step of: executing processing wherein the data processing unit receives the usage control information (Usage Rule) of a content from the server to store this in the local storage unit, and executes content usage control to which the usage control information stored in the local storage unit has been applied instead of usage control information recorded in a disc.

The information processing may further include the step of: executing processing wherein the data processing unit receives a program content from the server to store this in the local storage unit, and executes playback of the program content stored in the local storage unit.

The information processing method may further include the step of: executing processing wherein the data processing unit transmits the component information of the program content stored in the disc to the server, receives a program component equivalent to the difference as to the disc stored program content from the server to store this in the local storage unit, and performs program execution processing employing both of the disc stored program and local storage unit stored program.

According to an embodiment of the present invention, a computer program causes an information processing device to execute execution information processing, which is a content playback step wherein a data processing unit executes playback of a content by employing a playlist where content playback order information has been recorded, including the step of: playing a local storage unit stored content instead of a disc recorded content specified with the playlist by content obtaining processing employing mapping information for obtaining a local storage unit stored content as a playback content by employing the disc recorded content information recorded in the playlist.

Note that a computer program according to an embodiment of the present invention is a computer program which can be provided with a storage medium or communication medium to be provided to a general-purpose computer system which can execute various program code in a computer-readable format. Such a program is provided in a computer-readable format, thereby realizing processing corresponding to the program on the computer system.

Further objects, features, and advantages of the present invention will become apparent from more detailed description based on the later-described embodiments of the present invention and the attached drawings. Note that "system" employed in the present specification is a logical group configuration of multiple devices, and is not restricted to each component device being within the same housing.

According to the arrangement of an embodiment of the present invention, with an information processing device which executes playback processing of a disc recorded content, a local storage unit stored content can be played instead of a disc recorded content specified with a playlist by content obtaining processing employing mapping information for obtaining a local storage unit stored content as a playback content employing a disc recorded content information recorded in the playlist. For example, processing can be performed wherein a new commercial content is played instead of an old commercial content recorded in a disc.

BRIEF DESCRIPTION OF THE DRAWINGS

FIG. 3 is a diagram for describing the configuration of a CPS unit key file;

FIG. 10 is a diagram for describing a specific example of a bind file (Binding file);

FIG. 19 is a diagram for describing a download processing example of a main content, for example, such as an AV stream which is a movie content, or the like;

FIG. 20 is a diagram for describing an example of a playlist file transmitted by the server;

FIG. 22 is a diagram for describing usage control information (Usage Rule) corresponding to a main content (Movie Title) such as a movie or the like;

FIG. 23 is a diagram for describing an example of usage control information (Usage Rule) corresponding to a commercial content;

FIG. 28 is a diagram for describing a specific example of user management by the server;

DESCRIPTION OF THE PREFERRED EMBODIMENTS

Description will be made below regarding the details of an information processing device, content using system, information processing method, and computer program according an embodiment of the present invention with reference to the diagrams. Description will be made in accordance with the following items.

Figure 1:
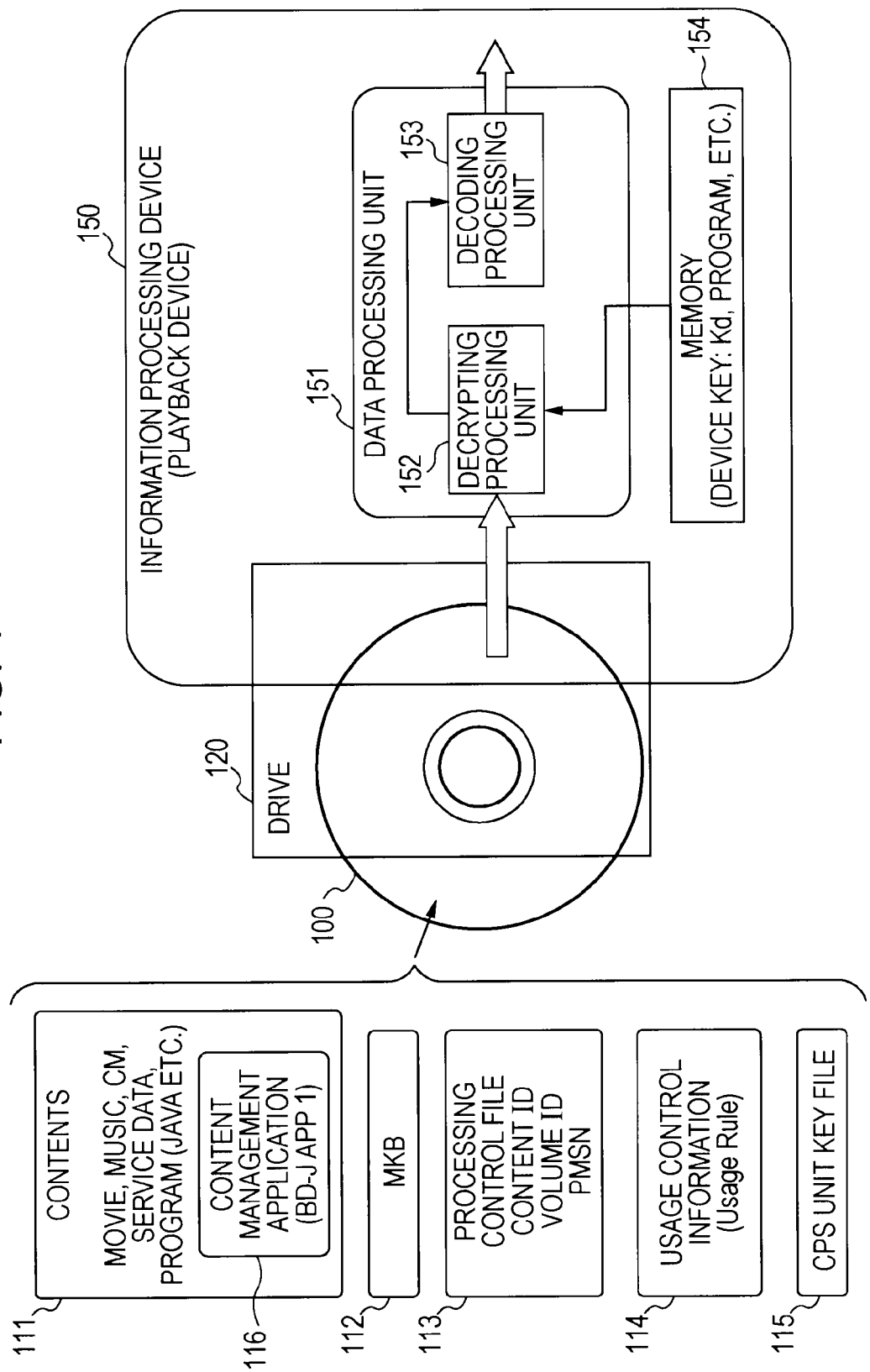
FIG. 1 is a diagram for describing the stored data structure of an information recording medium, and the configuration and processing of an information processing device for executing playback processing.

1. Stored Data of Information Recording Medium, and Overview of Information Processing Device
2. Content Download Processing by Information Processing Device
3. Content Playback Processing
4. Automatic Download and Automatic Playback Processing of Content
5. Details of Download Processing According to Content Type
6. Download Providing Processing Configuration of Playlist as to Playlist Unrecorded Disc
7. User Management Processing by Server
8. Creation and Management Processing of Disc Stored Content and Download Content 1. Stored Data of Information Recording Medium, and Overview of Information Processing Device First, description will be made regarding a stored data example of an information recording medium employed for content playback with an information processing device according to the present invention, and an embodiment of the information processing device. FIG. 1 illustrates a configuration example of an information recording medium 100 storing a content, and an information processing device (playback device) 150. Here, an information storing example of a ROM disc serving as a content stored disc will be shown. The information processing device 150 is various types of information processing device, for example, such as a PC, playback dedicated device, or the like, and includes a drive 120 for executing data reading processing from the information recording medium 100.

Examples of a ROM disc serving as the information recording medium (disc) 100 include an information recording medium such as a Blu-ray Disc (registered trademark), DVD, or the like, and an information recording medium storing a legal content manufactured in a disc manufacturing factory under permission of a legal content right holder.

As shown in FIG. 1, the information recording medium (disc) stores contents 111, an MKB (Media Key Block) 112 serving as an encrypted key block generated based on a tree-structure key distribution method available as one mode of a broadcast encryption method, a processing control file 113 including a content ID serving as the identifier of a stored content of the information recording medium 100, a volume ID set as identification information for recording-medium individual or for each information recording medium in increments of a predetermined number of discs, a processing control file 113 including PMSN (Pre-recorded Media Serial Number) and the like equivalent to a media ID serving as disc-specific identification information, usage control information (Usage Rule) 114 including CCI (Copy Control Information) and the like serving as copying/playback control information of a content, and a CPS unit key file 115 storing a CPS unit key which is an encryption key set for each content management unit (CPS unit) serving as a content usage management increment.

Note that the present example shows an example wherein a content management application (BD-J app 1) 116 is included as program information to be applied to later-described content download processing. A processing example employing the content management application (BD-J app 1) 116 will be described later. Now, overview of information to be stored in the information recording medium 100 will be described below.

(1) Contents 111

Various contents are stored in the information recording medium (disc) 100. Examples of these contents include an AV (Audio Visual) stream of a moving image content such as an HD (High Definition) movie content or the like which is a high-definition moving image data, game program, image file, audio data, text data, and Java (registered trademark) application program.

Of these contents, for example, a movie content, which is a main content, is particular AV format standard data, and is recorded as encrypted data in accordance with the AACS (Advanced Access Content System) standard which is content copyright protection technology standard. That is to say, contents are classified into units (CPS units), and each of the units is recorded in a disc as an encrypted content to which a unit key (CPS unit key) corresponding to each unit has been applied. A CPS unit key file 115 storing a unit key used for content decryption, and an MKB (Media Key Block) 112 which is an encrypted key block are recorded in the disc.

Further, for example, a Java (registered trademark) application program, game program, image file, audio data, text data, and so forth are stored in the contents 111 as sub contents. Some sub contents are data not following a particular AV data format in some cases.

The types of contents include various contents such as music data, image data such as a moving image, still image, or the like, game program, web content, and so forth along with a main content and sub content, and these contents include various modes of information such as content information which can be used only with data from the information recording medium 100, content information which can be used with a combination between data from the information recording medium 100 and data provided from the server connected to a network, and so forth.

(2) MKB

The MKB (Media Key Block) 112 is an encrypted key block generated based on a tree-structured key distribution method which is one mode of a broadcast encryption method. The MKB 112 is a key information block whereby a media key (Km) which is a key used for content decryption can be obtained only by processing (decryption) based on a device key (Kd) stored in the information processing device of a user possessing a valid license. This is a method to which an information distribution method following a so-called hierarchical tree structure has been applied, and only a user device (information processing device) possessing a valid license enables obtaining of a media key (Km), and an invalidated (revoked) user device disables obtaining of a media key (Km).

A control center for controlling an MKB changes a device key employed for encryption of key information to be stored in an MKB, whereby an MKB having a structure can be generated wherein it is difficult to perform decryption using a device key stored in a particular user device, i.e., it is difficult to obtain a media key used for content decryption. Accordingly, an encrypted content which can be decrypted can be provided to only a device having a valid license while revoking an unauthorized device at arbitrary timing. The details of content decryption processing will be described later.

(3) Processing Control File

The processing control file 113 includes a content ID serving as the identifier of a stored content of the information recording medium 100, a volume ID set as identification information for recording-medium individual or for each information recording medium in increments of a predetermined number of discs, PMSN (Pre-recorded Media Serial Number) equivalent to a media ID serving as disc-specific identification information, and so forth. The volume ID is employed as key generation information to be applied to content decryption. Such processing will be described later.

(4) Usage Control Information (Usage Rule)

The usage control information (Usage Rule) 114 includes, for example, copying/playback control information (CCI). That is to say, this is copying restriction information for usage control corresponding to the encrypted contents 111 stored in the information recording medium 100, and playback restriction information. This copying/playback control information (CCI) can be set variously, such as a case wherein this information is set as CPS unit individual information to be set as a content management unit, a case wherein this information is set so as to correspond to multiple CPS units, or the like.

(5) CPS Unit Key File

The encrypted contents stored in the information recording medium 100 are, as described above, classified into CPS units set as content management units, and are encrypted by an encryption key in increments of units. The information processing device which executes playback processing distinguishes the CPS unit to which a content to be played belongs, and the information processing device performs decryption processing by employing a CPS unit key as an encryption key corresponding to the distinguished CPS unit. A file storing data for obtaining this CPS unit key is a CPS unit key file. Note that content playback employs not only a CPS unit key but also other various key information, key generation information, and so forth. Specific processing regarding these will be described later.

FIG. 1 illustrates a simple overview of the configuration of the information processing device 150 which executes playback processing of a content stored in the information recording medium 100. The information processing device 150 includes a drive 120 which executes reading processing of stored data of an information recording medium. The data read by the drive 120 is input to a data processing unit 151 which executes decryption processing and decoding (e.g., MPEG decoding) processing of an encrypted content.

The data processing unit 151 includes a decryption processing unit 152 which executes decryption processing of an encrypted content, and a decoding processing unit 153 which executes decoding (e.g., MPEG decoding) processing. The decryption processing unit 152 employs various types of information stored in memory 154, and the data read from the information recording medium 100 to generate a key employed for content decryption, thereby executing decryption processing of the encrypted contents 111.

The memory 154 is memory made up of ROM and RAM employed as a program execution area, data storing area, and so forth, and stores a device key [Kd] employed for content decryption processing, a program which executes various processing, and so forth. When decrypting an encrypted content of the information recording medium 100, the information processing device 150 generates a key employed for content decryption based on the data stored in the memory 154, and the data read from the information recording medium 100, and executes decryption processing of the encrypted content included in the contents 111. The details of the decryption processing will be described later.

Next, description will be made with reference to FIG. 2 regarding a format example of an encrypted content included in the contents 111 stored in the information recording medium. As described above, encrypted contents to be stored in the information recording medium are assigned with a different key for each unit to realize different usage control for each unit, and are subjected to decryption processing, and are stored in the information recording medium. That is to say, the contents are classified into content management units (CPS units), subjected to individual encryption processing, and subjected to individual usage management.

When using a content, first, the CPS unit key assigned to each unit is obtained, and further data processing is executed based on a predetermined decryption processing sequence by employing other necessary keys, key generation information, and so forth to perform playback of the content. Description will be made regarding the setting mode of content management units (CPS units) with reference to FIG. 2.

Figure 2:
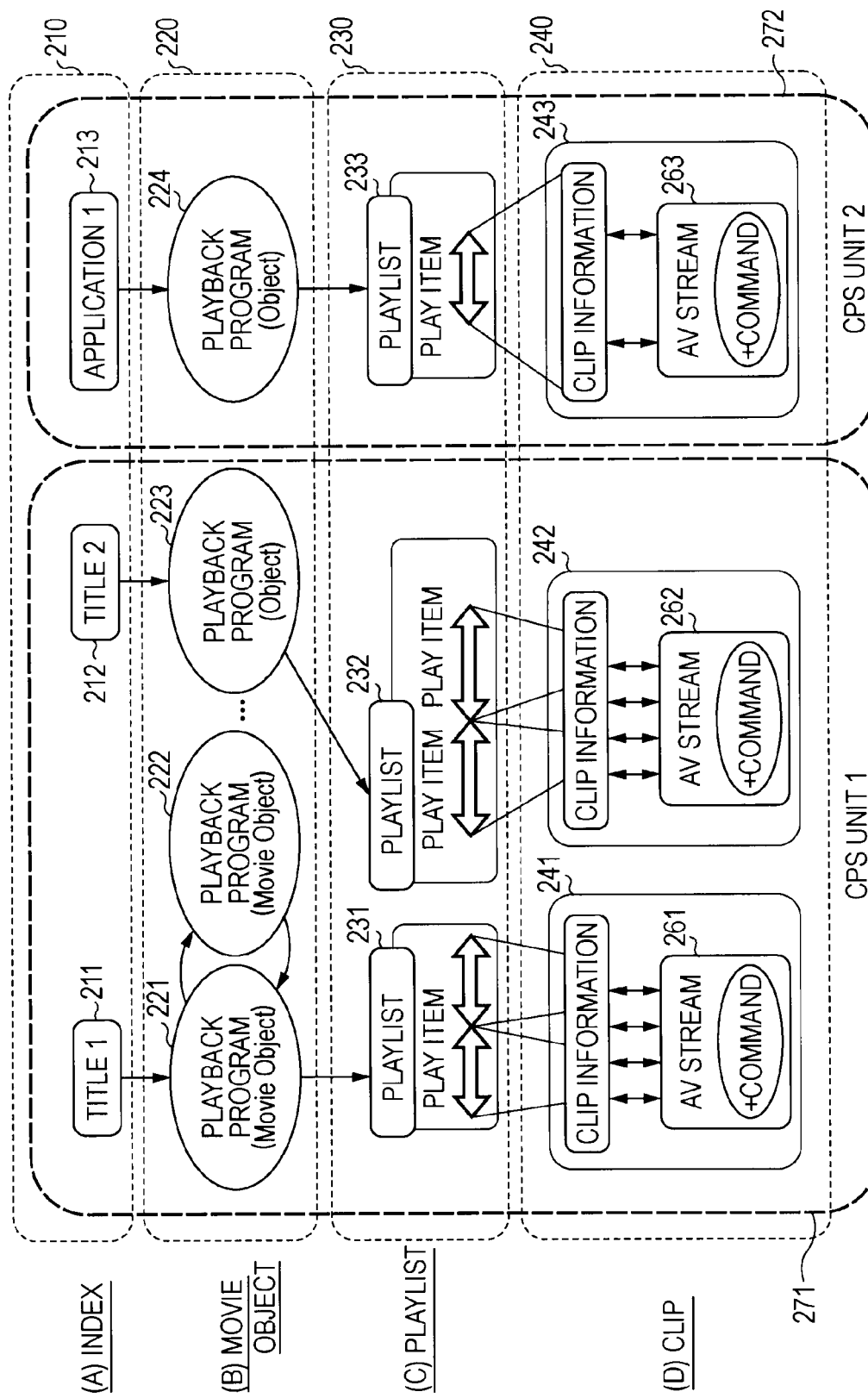
FIG. 2 is a diagram for describing a setting example of a content management unit for setting to a stored content of an information recording medium.

As shown in FIG. 2, contents include a hierarchical structure of (A) index 210, (B) movie object 220, (C) playlist 230, and (D) clip 240. Upon specifying an index such as a title or the like to be accessed by a playback application, for example, a playback program correlated with the title is specified, and a playlist stipulating the playback sequence and so forth of contents is selected in accordance with the program information of the specified playback program.

A playlist includes play items serving as playback target data information. According to clip information serving as a playback section specified with a play item included in a playlist, an AV stream or command serving as content actual data is selectively read out, thereby performing playback of the AV stream or execution processing of the command. Note that there are a great number of playlists and play items, each of which is correlated with a playlist ID and play item ID serving as identification information, respectively.

Note that the format shown in FIG. 2 is an encrypted content format in accordance with the AACS standard, but it not all of the contents 111 stored in the disc have to be data in accordance with this format. Various contents other than encoded data recorded in accordance with this format may be recorded in a disc, such as a commercial (i.e., advertisement) content, service content, Java (registered trademark) program content, and so forth. There is a case wherein such data is recorded in a disc as an unencrypted content, and a playlist may be employed for playback of such a content.

That is to say, all of the settings of the playlists shown in FIG. 2 illustrate examples of playlists specifying playback of only an AV stream serving as encrypted data, but other than these, a playlist stipulating the playback sequence for alternately playing AV streams in accordance with the AACS standard and commercial contents which are unencrypted data, a playlist for playing one commercial which is unencrypted data, or the like may be set. Note that, in the case of a user playing a content, playback is performed by specifying a title, but specifically, one playlist is selected by the user specifying a title, and one or multiple playback contents are selected with the selected playlist sequentially, thereby performing playback.

FIG. 2 illustrates two CPS units of encrypted contents included in the contents 111 recorded in the disc 100. These make up a part of contents stored in the information recording medium. A CPS unit 1 (271) and CPS unit 2 (272) are each CPS units set as a unit including a title serving as an index, a movie object serving as a playback program file, a playlist, and a clip including an AV stream file serving as content actual data.

The content management unit (CPS unit) 1 (271) includes a title 1 (211), a title 2 (212), playback programs 221 and 222, playlists 231 and 232, and clips 241 and 242, AV stream data files 261 and 262 which are content actual data included in the two clips 241 and 242 are at least data to be encrypted, and essentially are set as data encrypted by employing a CPS unit key (Ku1) which is an encryption key set in a correlated manner with the content management unit (CPS unit) 1 (271).

The content management unit (CPS unit) 2 (272) includes an application 1 (213), a playback program 224, a playlist 233, and a clip 243, and an AV stream data file 263 which is content actual data included in the clip 243 is encrypted by employing a CPS unit key (Ku2) which is an encryption key set in a correlated manner with the content management unit (CPS unit) 2 (272).

For example, in order for the user to execute an application file or content playback processing corresponding to the content management unit 1 (271), the user should obtain the unit key (Ku1) serving as an encryption key set in a correlated manner with the content management unit (CPS unit) 1 (271). In order to execute an application file or content playback processing corresponding to the content management unit 2 (272), the user should obtain the unit key (Ku2) serving as an encryption key set in a correlated manner with the content management unit (CPS unit) 2 (272).

Figure 4:
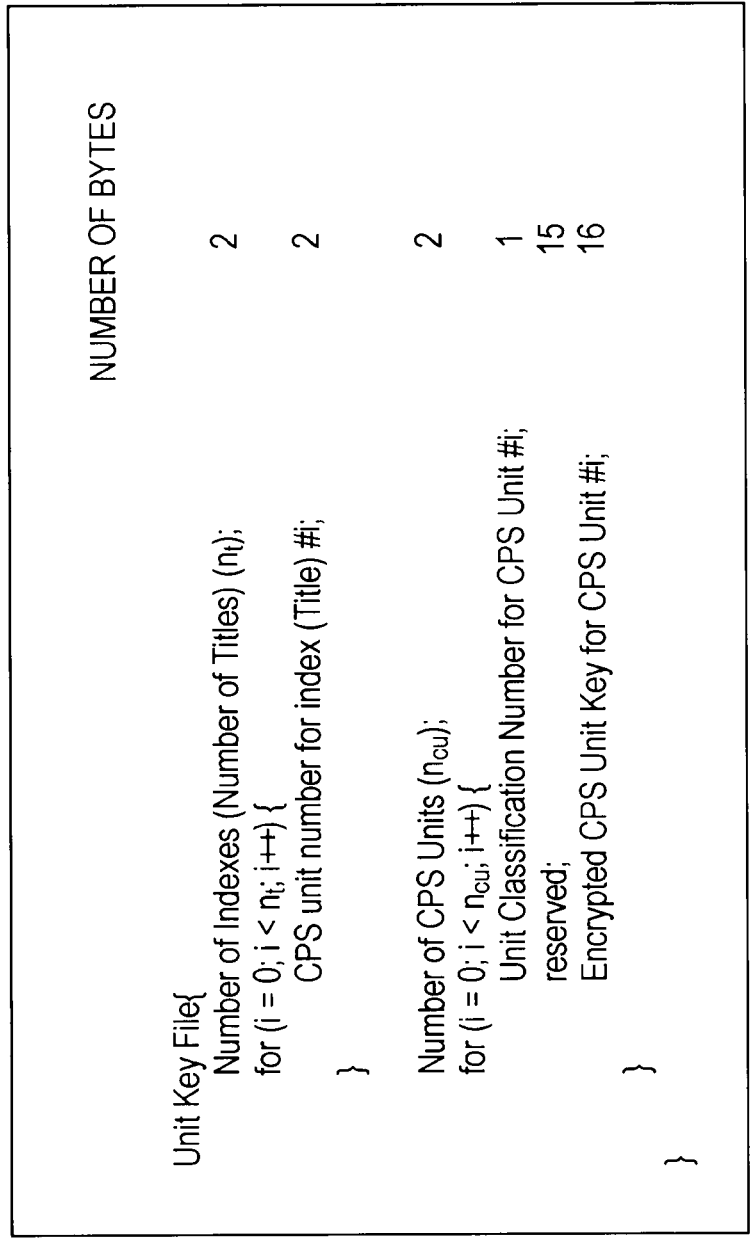
FIG. 4 is a syntax diagram for describing the configuration of a CPS unit key file.

The specific structure of a CPS unit key file will be described with reference to FIGS. 3 and 4. FIG. 3 shows the structure of a CPS unit key file as a table, and FIG. 4 is a syntax diagram showing an actual file data structure. As shown in FIG. 3, CPS unit key files are classified for each piece of index information such as titles, thereby providing a data structure with which the content management unit number (CPS unit number) and encrypted CPS unit key [Kun] corresponding to each index are correlated.

The information processing device 150 which executes content playback obtains the corresponding CPS unit key based on the unit number (CPS unit number) set to each CPS unit to execute decryption processing of the CPS unit which is an encrypted content. FIG. 4 is a syntax diagram showing the data structure corresponding to the CPS unit key file shown in FIG. 3.

Figure 5:
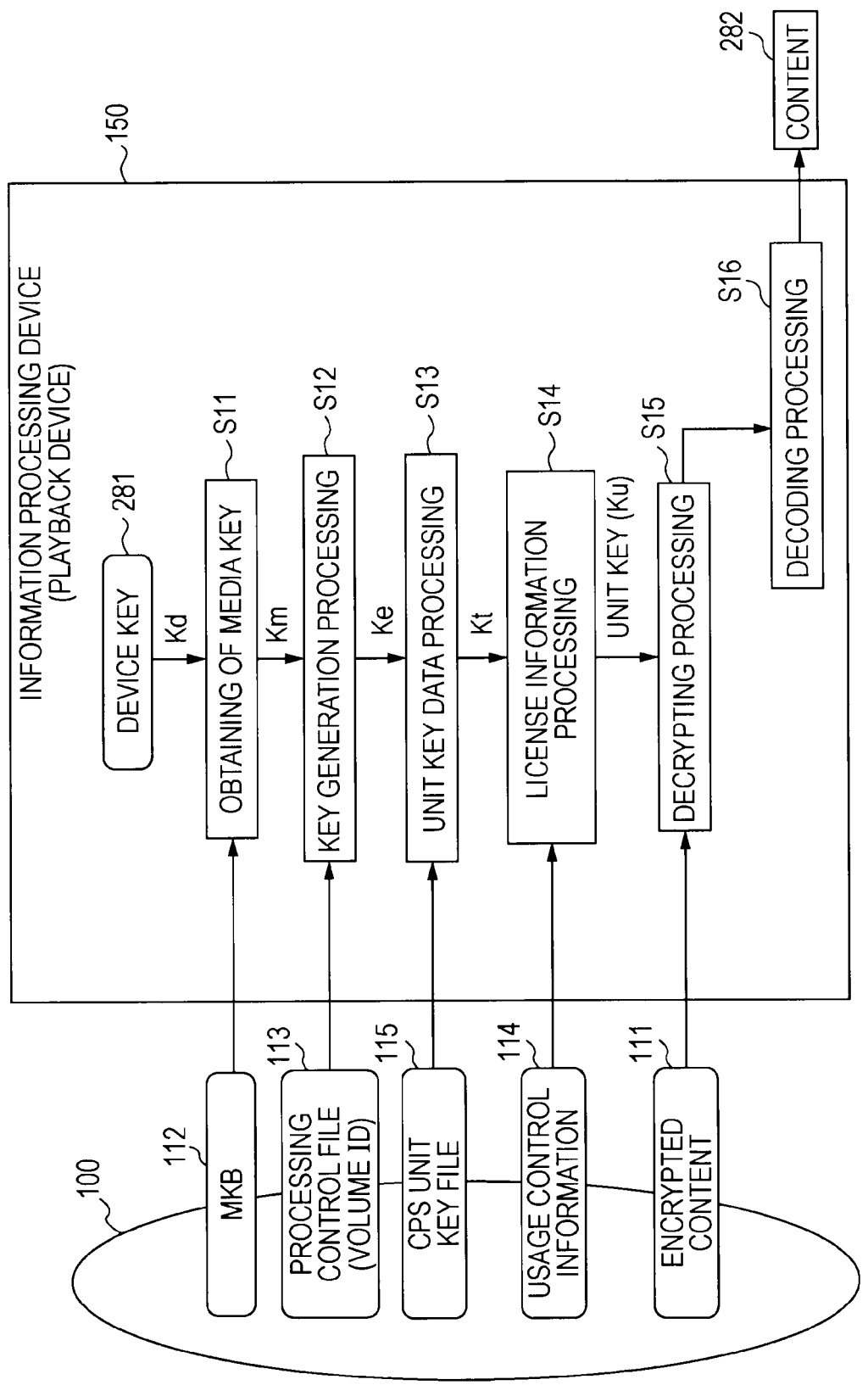
FIG. 5 is a diagram for describing a content playback processing sequence of the information processing device.

Next, description will be made regarding the playback processing sequence of an encrypted content with the information processing device 150 with reference to FIG. 5. The encrypted content is an encrypted content obtained by being subjected to encryption in increments of CPS units as described above.

The information processing device 150 reads various types of information from the disc 100, and executes decoding processing of the encrypted content based on the unit key (Ku) generated by key generation processing employing the read data and a device key 281 possessed by the information processing device 150.

First, the information processing device 150 reads out the device key (Kd) 281 stored in the memory. The device key 281 is a secret key stored in an information processing device which received a license relating to content usage.

Next, in step S11, the information processing device 150 executes decryption processing of the MKB 112 stored in the disc 100 by employing the device key 281 to obtain the media key Km. The media key Km is encrypted and stored in the MKB 112.

Next, in step S12, the information processing device 150 generates a title key generation key Ke (embedded Key) using encryption processing based on the media key Km obtained by the MKB processing in step S11, and a volume ID (e.g., recorded in the processing control file 113) read from the disc 100. This key generation processing is executed as processing, for example, in accordance with the AES encryption algorithm.

Next, in step S13, the information processing device 150 executes unit key data processing such as encryption processing (AES_H) or the like based on encrypted CPS unit key [Kun] obtained from the title key generation key Ke (embedded Key) and the CPS unit key file 115 (see FIGS. 3 and 4) read from the disc 100 to obtain a title key Kt.

Next, in step S14, the information processing device 150 generates a unit key Ku using encryption processing (AES_H) based on the title key Kt, and the usage control information 114 read from the disc 100, and in step S15, subjects the encrypted content read from the disc 100 to decryption processing (e.g., AES_D) employing the unit key.

Next, in step S16, the information processing device 150 executes necessary decoding processing, for example, such as MPEG decoding, decompression, descrambling, or the like, to obtain a content 282. The decryption and playback processing sequence of the encrypted content has thus ended.

2. Content Download Processing by Information Processing Device

The information processing device can perform not only playback of a content recorded in a disc but also playback processing by obtaining a content (download content), for example, from a server connected thereto through a network, and employing both of this download content and an information recording medium stored content.

Figure 6:
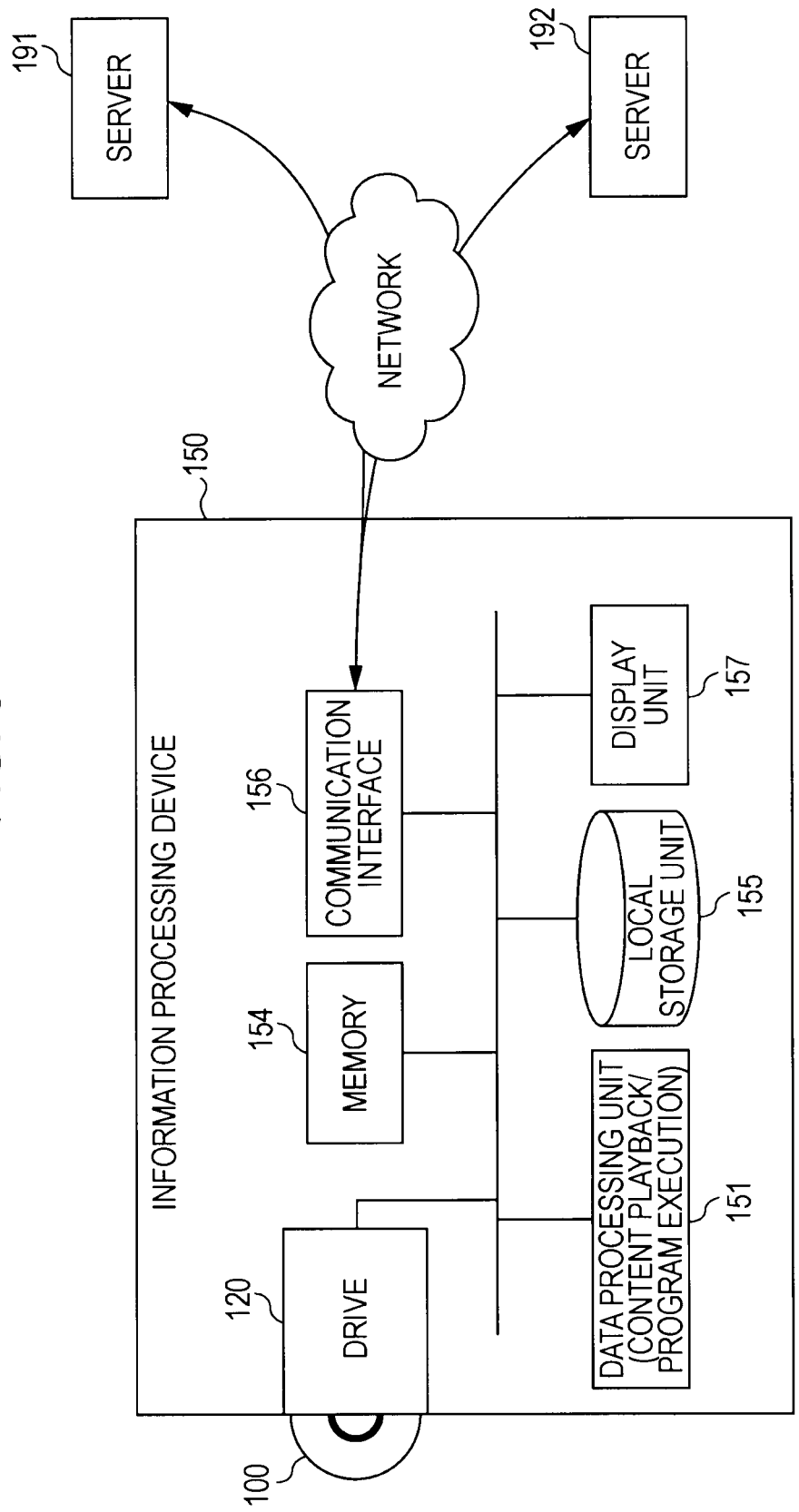
FIG. 6 is a diagram for describing content download processing of the information processing device.

Description will be made regarding an external content obtaining processing configuration with reference to FIG. 6. The information processing device 150 shown in FIG. 6 is the same device as the information processing device 150 shown in FIG. 1. In FIG. 1, the data processing unit 151, memory 154, and drive 120 are illustrated as the configuration employed for playback of a content from the information recording medium, but the information processing device 150 further includes, for example, a local storage unit 155 made up of a hard disk or flash memory or the like, a communication interface 156 for executing communication through a network, and a display unit 157 for displaying a content and content information, and further providing a UI function serving as a user input unit.

The information processing device 150 obtains a sub content which is available along with playback of a content stored in the disc 100, for example, such as caption data or dubbed-in data, commercial content, service content, program such as Java (registered trademark) or the like, and additionally, service data corresponding to the content stored in the disc 100, and so forth through servers 191 and 192 in a case wherein the content stored in the disc 100 is a movie content, and stores the obtained data, for example, in the local storage unit 155 made up of a hard disk, memory, or the like. When recording post-release data, the data processing unit 151 generates or updates the management table in which management information relating to the post-release data has been stored to record this in the local storage unit 155.

The post-release data to be stored in the local storage unit 155 is data obtained or generated corresponding to any of the stored content of the disc 100, and is stored in the local storage unit 155 at the time of playback processing of the stored content of the disc 100, and playback of the post-release data selected by the user can be executed along therewith. With this playback processing, under the control of the data processing unit 151, a VFS (Virtual File System) in which a disc stored content and a local storage unit stored content such as a hard disk are integrated is built, thereby performing playback processing. According to this playback processing based on this VFS, the same playback can be performed as playback processing as it were from one medium.

It is necessary to obtain a content from the server before the content playback processing employing a disc stored content and a local storage unit stored content is performed. An example of this content obtaining processing will be described with reference to FIG. 7. The content obtaining processing may be performed with various processing modes. The example shown in FIG. 7 is a processing example thereof, and is a processing example wherein three content management applications are combined and employed, thereby obtaining a content.

Figure 7:
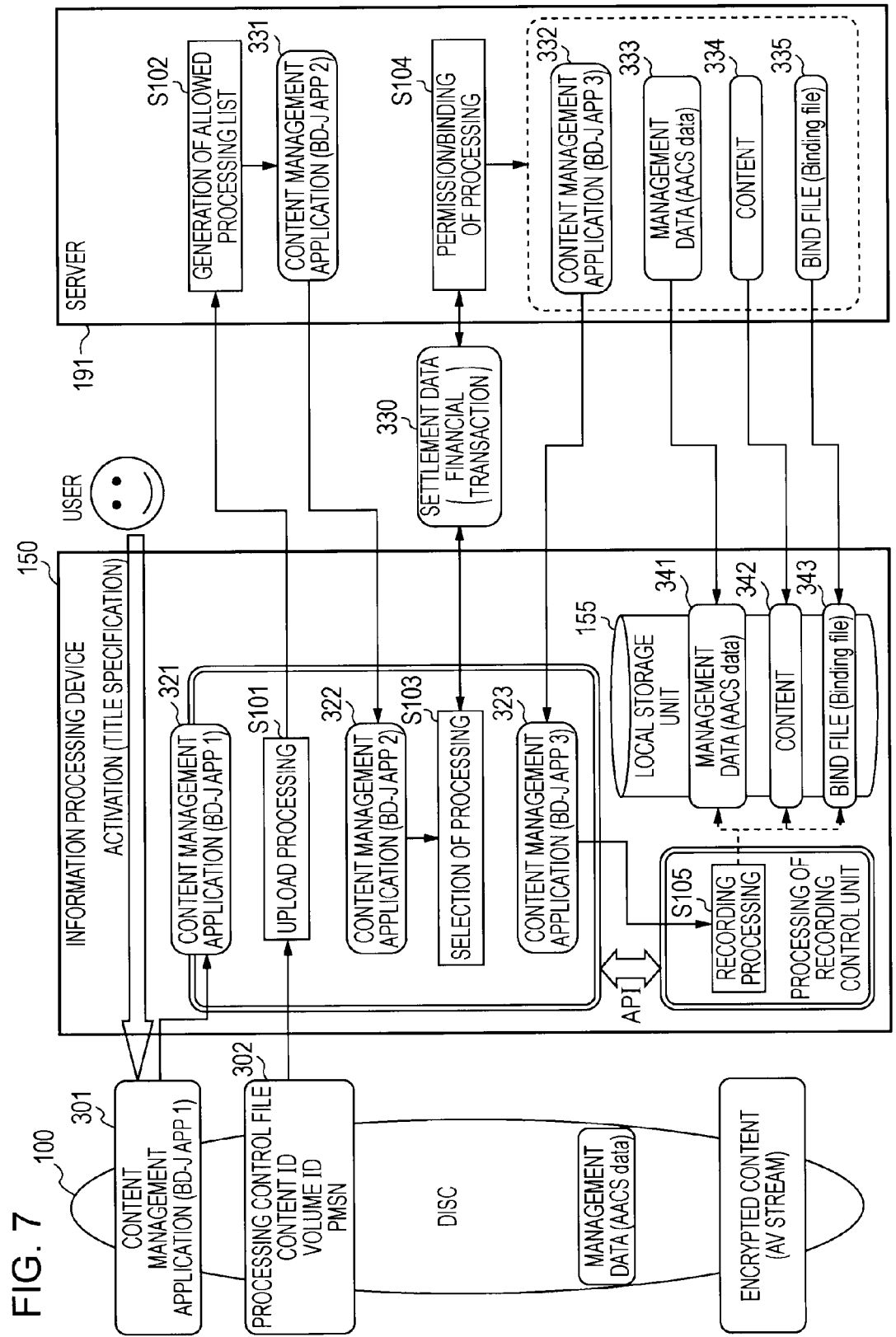
FIG. 7 is a diagram for describing a content obtaining processing sequence wherein the information processing device obtains a content from a server.

With the processing example shown in FIG. 7, the following three content management applications are employed.
(1) First content management application (BD-J app 1) 301 recorded in the disc 100
(2) Second content management application (BD-J app 2) 331 (=322) provided to the information processing device 150 from the server 191
(3) Third content management application (BD-J app 3) 332 (=323) provided to the information processing device 150 from the server 191

Note that [BD-J app n] represents a Java (registered trademark) application to be applied to a Blu-ray Disc (registered trademark) which is a recording/playback disc employing blue laser. With the following embodiment, an example employing a Java (registered trademark) application to be applied to a Blu-ray Disc (registered trademark) as a content management application will be described, but the present invention may be employed with an information recording medium other than a Blu-ray Disc (registered trademark), and also a program employed as a content management application may be a program other than a Java (registered trademark) program.

First, description will be made regarding processing executed by these three content management applications.

(1) First Content Management Application (BD-J App 1)

This first content management application (BD-J app 1) is an application to be executed before connection with the server, and executes the following processing.

(a) Processing for confirming whether to execute download with a user (b) Processing for confirming whether the playback device (information processing device) can handle network connection and AACS online functions (c) Processing for providing a URL to be accessed (d) Update processing of management data (org_id, disc_id) of the local storage unit, and data relating to AACS (e) Accounting processing (optional)

(2) Second Content Management Application (BD-J App 2)

This second content management application (BD-J app 2) is an application obtained from the server and executed, and executes the following processing.

(a) Processing for allowing a user to select a product (download data)

(b) Processing for informing the server of the product selected by a user (c) Accounting processing (optional)

(3) Third Content Management Application (BD-J App 3)

This third content management application (BD-J app 3) is an application obtained from the server and executed, and is executed at the time of recording download data in the local storage unit, and executes the following processing.

(a) Processing for recording an AV-related file (content to be played) in the local storage unit in a state usable with a virtual file system (VFS) for setting a disc stored content and local storage unit stored content as one virtual media stored content (b) Processing for recording an AACS-related file (management file) in the local storage unit in a state usable with a VFS Thus, the processing of each application is specialized, and an arrangement is employed wherein each application is obtained from a disc or the server as appropriate, whereby flexibility such as application update processing or the like increases, a more ease-to-use environment and advanced service can be provided.

Note that these respective content management applications (BD-J app n) are executed with the data processing unit 151 of the information processing device 150, i.e., a data processing unit including a CPU or the like having a program executing function, and perform the above-mentioned processing. For example, these applications are executed with a VM (Virtual Machine) which the data processing unit 151 of the information processing device 150 sets as a program execution area.

The processing sequence of the present processing example will be described with reference to FIG. 7. First, the content management application (BD-J app 1) 321 (=301) recorded in the disc (ROM disc) 100 is activated. Note that the activation processing of the content management application (BD-J app 1) 321 (=301) is performed with title selection in the same way as with the content playback processing. As for the user side processing, title specification processing similar to the case of playing a movie content activates the content management application (BD-J app 1) 321 (=301).

According to the content management application (BD-J app 1) 321 activated with title selection by the user, in step S101 the information processing device 150 obtains, for example, a processing control file 302 of the disc 100, reads a content ID, volume ID, and PMSN which is a serial number equivalent to a media ID, and transmits the disc recording IDs thereof, and identification information of at least one of a user ID and information processing device ID to the server 191 for performing content (download content) providing processing. Note that what kind of identification information is transmitted to the server 191 can be set by the server 191 side arbitrarily. For example, the content management application (BD-J app 1) 321 (=301) is set as an application wherein the transmission sequence of the identification information necessary for the server 191 side is set as a program.

In step S102, the server 191 generates an allowed processing list, which is a list of processing which the user (information processing device 150) is allowed to perform, based on the identification information included in the received data, e.g., a content ID or user ID, selects the content management application (BD-J app 2) 331 to provide this to the information processing device 150. The server 191 holds, for example, content usage condition information corresponding to a content ID or user ID, and selects the content management application (BD-J app 2) 331 which executes processing corresponding to the content ID or user ID based on that information to provide this to the information processing device 150.

The information processing device 150 executes processing to which the content management application (BD-J app 2) 322 (=331) received from the server 191 has been applied. The information processing device 150 displays the allowed processing included in the content management application (BD-J app 2) 322 on the display unit of the information processing device, and in step S103, the user performs, for example, selection of a download content.

Based on this selection the information processing device 150 executes settlement processing by transferring settlement data 330 to the server 191. The information processing device 150 displays a settlement screen on the display unit of the information processing device, and the user inputs data necessary for settlement, such as a credit card and so forth, on the settlement screen, and the information processing device 150 transmits this to the server 191. Next, in step S104, the server

191 allows processing to transmit permission information to the information processing device 150.

In step S104, the server 191 transmits data including a content 334, management data 333, and bind file (Binding file) 335 to be provided to the information processing device 150, and content management application (BD-J app 3) 332 for executing recording processing to the information processing device 150. Note that it is desirable to provide an arrangement for appending the signature of the server 191 to those data to enable tampering verification.

The information processing device 150 performs signature verification at the time of execution of the content management application (BD-J app 3) 323 (=332) received from the server 191, and performs processing for confirming that the received data is valid data without tampering. As a condition that validity has been confirmed, in step S105, the information processing device 150 records the content 334, management data 333, and bind file (Binding file) 335 in the local storage unit 155. As a result of this, the management data 341, content 342, and bind file (Binding file) 343 are recorded in the local storage unit 155.

Note that the management data (AACS data) 341 (=333) is management data which the AACS (Advanced Access Content System) stipulates which is a specification management system relating to content copyright protection art, and in a case wherein the content 334 provided by the server 191 is an encrypted content, the management data 341 (=333) includes a CPS unit key storing a key (CPS unit key) to be applied to decryption thereof, and is further made up of data including usage control information corresponding to a provided content, an MKB (Media Key Block) which is an encryption key block storing a media key for obtaining a CPS unit key, and so forth.

The bind file (Binding file) 343 (=335), which is a file provided to the information processing device 150 by the server 191, is a file storing mapping information necessary for building of a virtual file system (VFS) which the information processing device 150 builds at the time of playing the content 342 (=334) stored in the local storage unit 155 of the information processing device 150 along with the stored content of the information recording medium (disc) 100. The mapping information is information which allows a user to obtain a local storage unit stored content using disc recorded content information recorded in a playlist as a playback content.

Employing the mapping information recorded in the bind file (Binding file) 343 (=335) enables a part of a disc stored content to be replaced with a download content recorded in the local storage unit 155 to play the download content, for example, at the time of employing a playlist recorded in the disc 100 to perform playback of a content.

Specifically, for example, in a case wherein the following contents are recorded in a disc multiple movie contents 1, 2, 3, and so on, multiple commercial contents a, b, c, and so on, and a playlist stipulates the following playback order of movie content 1→commercial a→movie content 2→commercial b→movie content 3→commercial c, and so on, processing for replacing the commercials a, b, and c with download contents downloaded from the server 191 and recorded in the local storage unit 155 to play the download contents, and processing for playing a new additional content downloaded from the server 191, can be performed.

That is to say, in a case wherein the following contents are recorded in the local storage unit 155 as download contents downloaded from the server 191 and recorded in the local storage unit 155 commercial x, commercial y, and commercial z, a virtual file system (VFS) is built by employing the mapping information recorded in the bind file (Binding file) 343 (=335), and playback is performed by employing the same playlist, playback processing can be performed by replacing as follows:

movie content 1→commercial x→movie content 2→commercial y→movie content 3→next provided content preview information→commercial z, and so on.

Note that a specific example and usage example of a bind file (Binding file) will be described later in detail.

Figure 8:
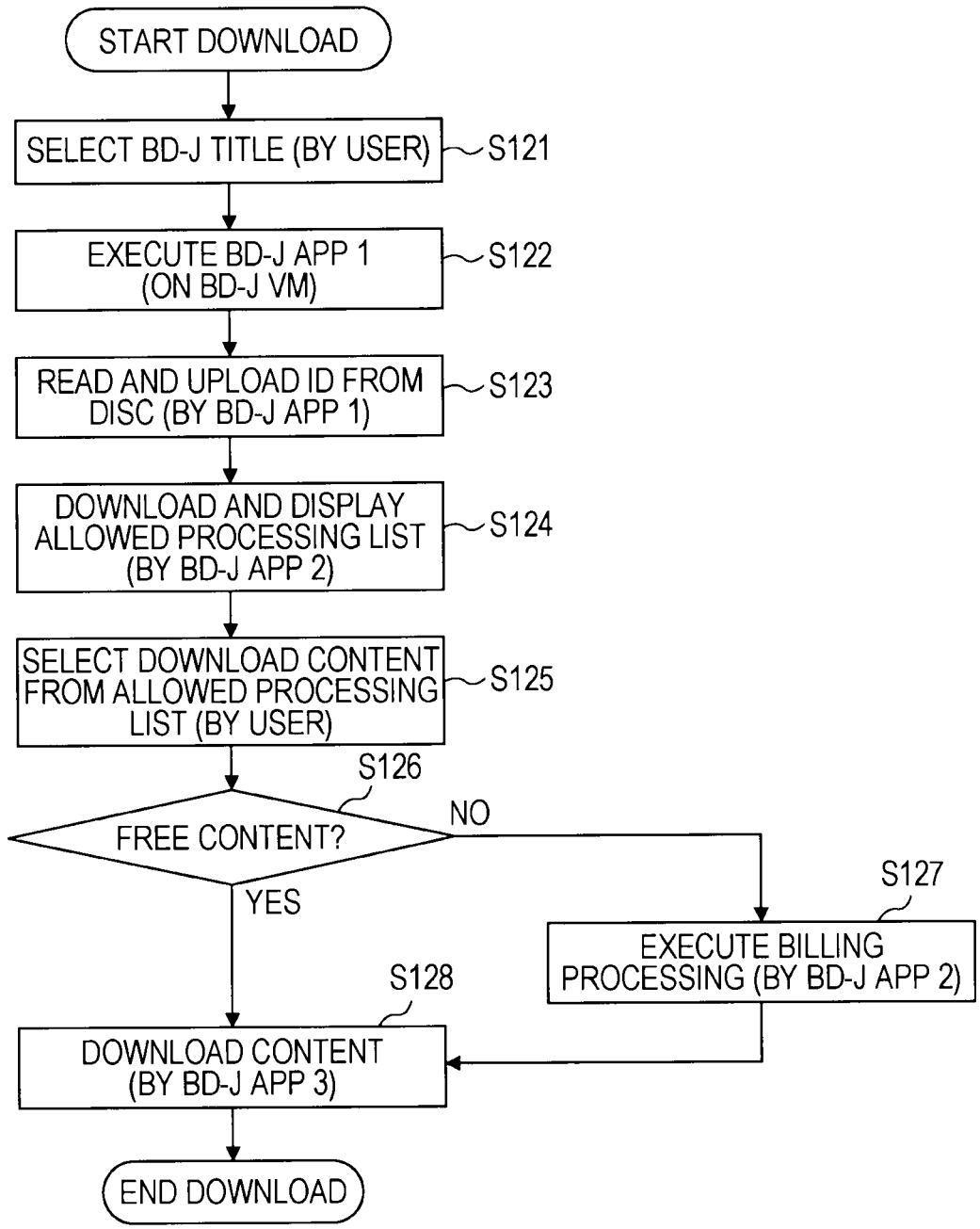
FIG. 8 is a diagram illustrating a flowchart for describing a content download processing sequence from the server.

Description will be made with reference to the flowchart shown in FIG. 8 regarding the content download processing sequence from the server described with reference to FIG. 7.

First, in step S121, a title is selected, which is for specifying an application program (BD-J) for downloading a content. This processing is executed by the a user employing the information processing device 150.

Next, in step S122, an application program (BD-J app 1) read from the disc 100 is executed by a user's specification. As described above, as for processing on the user side, the content management application (BD-J app 1) is activated by the same title specification processing as in the case of playing a movie content. The application (BD-J app 1) is executed at a VM (Virtual Machine) set as a program execution area in the information processing device 150.

Next, in step S123, the application (BD-J app 1) obtains, for example, a processing control file of the disc 100, and obtains a content ID, volume ID, and PMSN which is a serial number equivalent to a media ID, and uploads (transmits) these to the server 191 for performing providing processing such as a sub content or the like. Note that, as described above, a transmission identifier may be set variously, such as one of these disc recorded identifiers, user identifier, information processing device identifier, or a combination of these, or the like. This processing is executed in accordance with the application program (BD-J app 1).

Next, in step S124, the allowed processing list included in the content management application (BD-J app 2) is displayed on the display unit of the information processing device as processing to which the content management application (BD-J app 2) received from the server 191, and in step S125, the user selects a download content.

Next, in step S126, the content management application (BD-J app 2) determines whether the content selected by the user is a pay content or free content, and in the case of a pay content, the processing proceeds to step 127, where the content management application (BD-J app 2) executes settlement processing by transferring of settlement data 331 to/from the server 191. The content management application (BD-J app 2) displays a settlement screen on the display unit of the information processing device, the user inputs data necessary for settlement of a credit card or the like in the settlement screen, and the content management application (BD-J app 2) transmits this to the server 191.

In a case wherein such settlement processing has ended, or a case wherein the content selected by the user is a free content, the processing proceeds to step S128, where the information processing device 150 executes the content management application (BD-J app 3) received from the server 191, and records a content, management data, and bind file (Binding file) in the local storage unit 155. Downloading of the content has been completed by the above processing.

3. Content Playback Processing

Next, description will be made with reference to the flowchart shown in FIG. 9 regarding content playback processing executed by the information processing device 150, i.e., processing sequence for playing a stored content of the disc 100 and a download content stored in the local storage unit 155.

Figure 9:
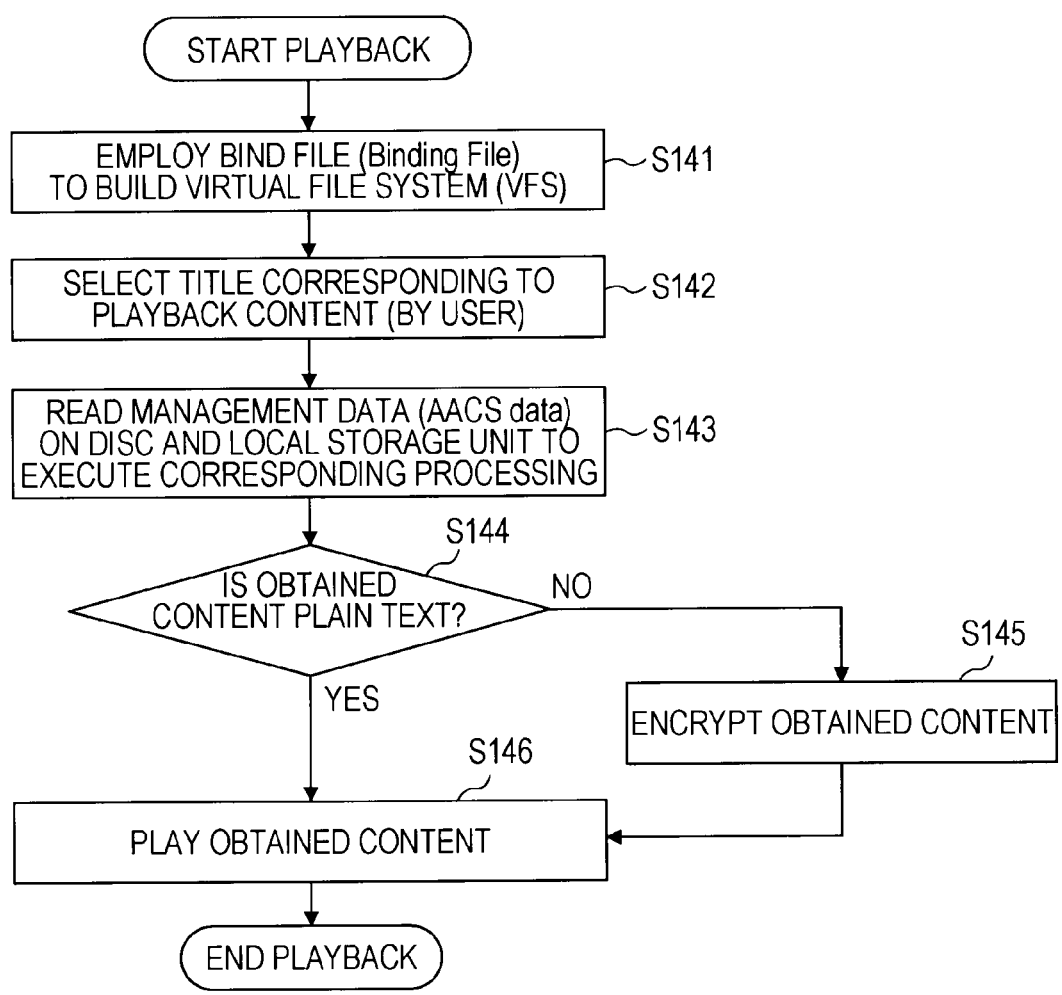
FIG. 9 is a diagram illustrating a flowchart for describing a content playback sequence employing a disc stored content and local storage unit stored content with the information processing device.

The flow shown in FIG. 9 is executed under the control of the data processing unit 151 of the information processing device 150.

First, in step S141, the data processing unit 151 builds a virtual file system by employing a bind file (Binding file) obtained from the server and stored in the local storage unit 155. A virtual file system (VFS) is a virtual file system which is set such that multiple storage contents of different storage portions are integrated, thereby enabling the same playback as that of playback processing as if from one medium.

With the present example, a VFS is built wherein a stored content of the disc 100 and a stored content of the local storage unit 155 are integrated. A bind file (Binding file) obtained from the server and stored in the local storage unit 155 is employed at the time of building this VFS.

A specific example of a bind file (Binding file) will be described with reference to FIG. 10. As shown in FIG. 10, a bind file (Binding file) is set as the corresponding data of the following data.

(a) The file name of a content entity (download content), and (b) A playback specified content file name on a playlist (a) The file name of a content entity (download content) is the file name of a download content which the information processing device 150 obtains by download processing from the server 191 and stored in the local storage unit 155.

(b) A playback specified content file name on a playlist is the file name of a playback content recorded in a playlist employed in the case of performing playback of a content. This file name corresponds to the file name of a content recorded in the disc 100.

Content playback processing is performed by sequentially selecting contents described in the playlist selected with the title specified by the user.

In a case wherein a playback specified content file name recorded in a playlist is recorded as "(b) a playback specified content file name on a playlist" of a bind file (Binding file), the virtual file system (VFS) is set so as to select "(a) the file name of a content entity (download content)" recorded in a manner corresponding to "(b) the playback specified content file name on a playlist" thereof as a playback content. That is to say, the virtual file system (VFS) is built as a file system holding mapping information.

In a case wherein the VFS is searched with a disc stored file name recorded in a playlist as a search key, the information processing device 150 employs a virtual file system (VFS) including mapping information, thereby obtaining a file name (download content) of the local storage unit based on the mapping information as search result, and accordingly, the file of the local storage unit can be obtained and played.

In a case wherein a playback specified content file name recorded in a playlist is not recorded as "(b) a playback specified content file name on a playlist" of a bind file (Binding file), the virtual file system (VFS) is set such that the playback specified content file name recorded in the playlist is set as is as a playback content. This content is a content recorded in the disc 100.

Thus, the mapping information of a bind file (Binding file) is mapping information for performing playback of a download content instead of playback of a content recorded in the disc. The data processing unit 151 of the information processing device 150 performs VFS building processing employing a bind file (Binding file) at the time of building a virtual file system (VFS) in step S141 in the flow shown in FIG. 9, thereby building a virtual file system (VFS) including mapping information.

Next, in step S142, the user performs input of specification information of a playback content, i.e., selection of a title. A title is employed as information for selecting a certain playlist. Next, in step S143, the data processing unit 151 of the information processing device 150 executes selection of the playback content based on the content name described in the playlist selected in accordance with the specified title. This selection of the playback content is performed based on the virtual file system (VFS) built in step S141. That is to say, this VFS is a VFS built by employing a bind file (Binding file), and the content of which the mapping information is recorded in the bind file is obtained not from the disc but from the local storage unit.

In step S144, the data processing unit 151 of the information processing device 150 determines whether or not the obtained content is an encrypted content, and in the case of the encrypted content, in step S145, executes content decryption processing. This processing is processing previously described with reference to FIG. 5. After completion of decryption of the content, or in a case wherein the obtained content is an unencrypted content, the processing proceeds to step S146 without decrypting the content, where the content is played.

Thus, the data processing unit 151 of the information processing device 150 executes content obtaining processing employing the mapping information for obtaining a local storage stored content as a playback content employing disc recorded content information recorded in the playlist, thereby playing the local storage unit stored content instead of the disc recorded content specified with the playlist.

With the information processing device according to an embodiment of the present invention, in a case wherein a content name which is recorded in a playlist as a content to be played is recorded as "(b) a playback specified content file name on a playlist" of a bind file (Binding file), an arrangement is made wherein "(a) the file name of a content entity (download content)" recorded in a manner corresponding to "(b) the playback specified content file name on a playlist" thereof is selected as a playback content to play this. Accordingly, for example, as described above, in a case wherein the following contents are recorded in a disc multiple movie contents 1, 2, 3, and so on, multiple commercial contents a, b, c, and so on, and a playlist stipulates the following playback order of movie content 1→commercial a→movie content 2→commercial b→movie content 3→commercial c, and so on, playback wherein the commercials a, b, and c are replaced with download contents downloaded from the server 191 and recorded in the local storage unit 155, i.e., commercial x, commercial y, and commercial z, playback processing can be performed by replacing the contents as follows:

movie content 1→commercial x→movie content 2→commercial y→movie content 3→commercial z, and so on.

Thus, the mapping information recorded in the bind file (Binding file) is employed to build a virtual file system (VFS), thereby executing playback of a new download content without changing the data of the playlist.

Description will be made regarding specific examples of a content playback processing example in the case of employing no bind file (Binding file), and a content playback processing example in the case of employing a bind file (Binding file) with reference to FIGS. 11 and 12.

Figure 11:
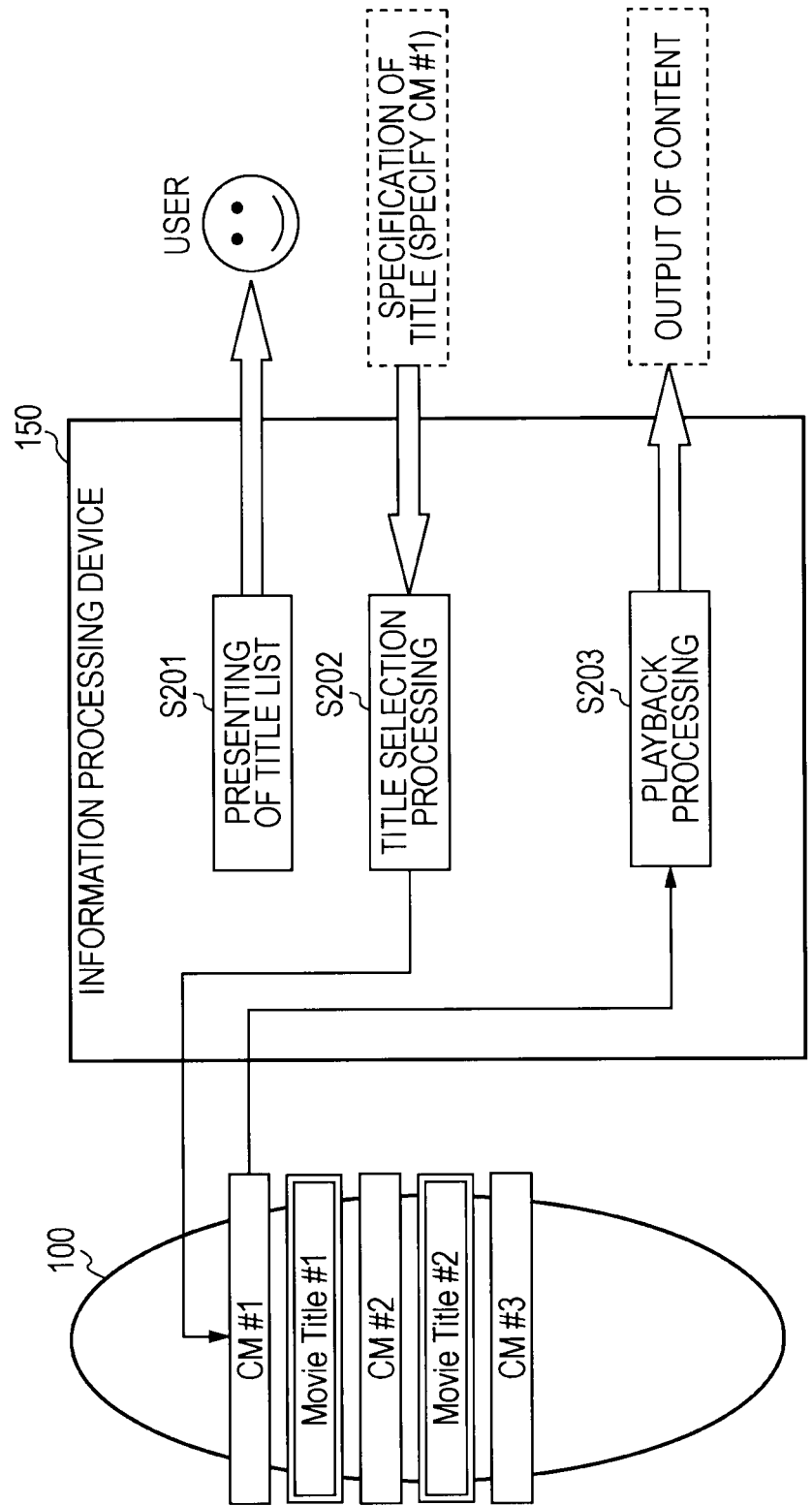
FIG. 11 is a diagram for describing a content playback processing example employing no bind file (Binding file)

FIG. 11 illustrates a content playback example in the case of employing no bind file (Binding file). In step S201, the information processing device 150 on which the disc 100 is mounted presents a title list employed for specifying a playback content to the user. For example, a title list is displayed on the display unit of the information processing device 150.

In step S202, the user selects a title to be played from the title list. In accordance with the selected title the information processing device 150 selects the playlist correlated with the title. Note that the title information and playlist are information recorded beforehand in the disc 100. A case is shown here wherein the user desires playback of a commercial content [CM#1] recorded in the disc 100, and a playlist in which only the commercial content [CM#1] is recorded as a playback content is selected and played.

A content name serving as content specification information is recorded in a playlist. In this case, the file name of the commercial content [CM#1] recorded in the disc 100 is recorded in the playlist, and in step S203 the information processing device 150 obtains the commercial content [CM#1] from the disc 100 based on the recorded information of the playlist to perform playback processing.

Figure 12:
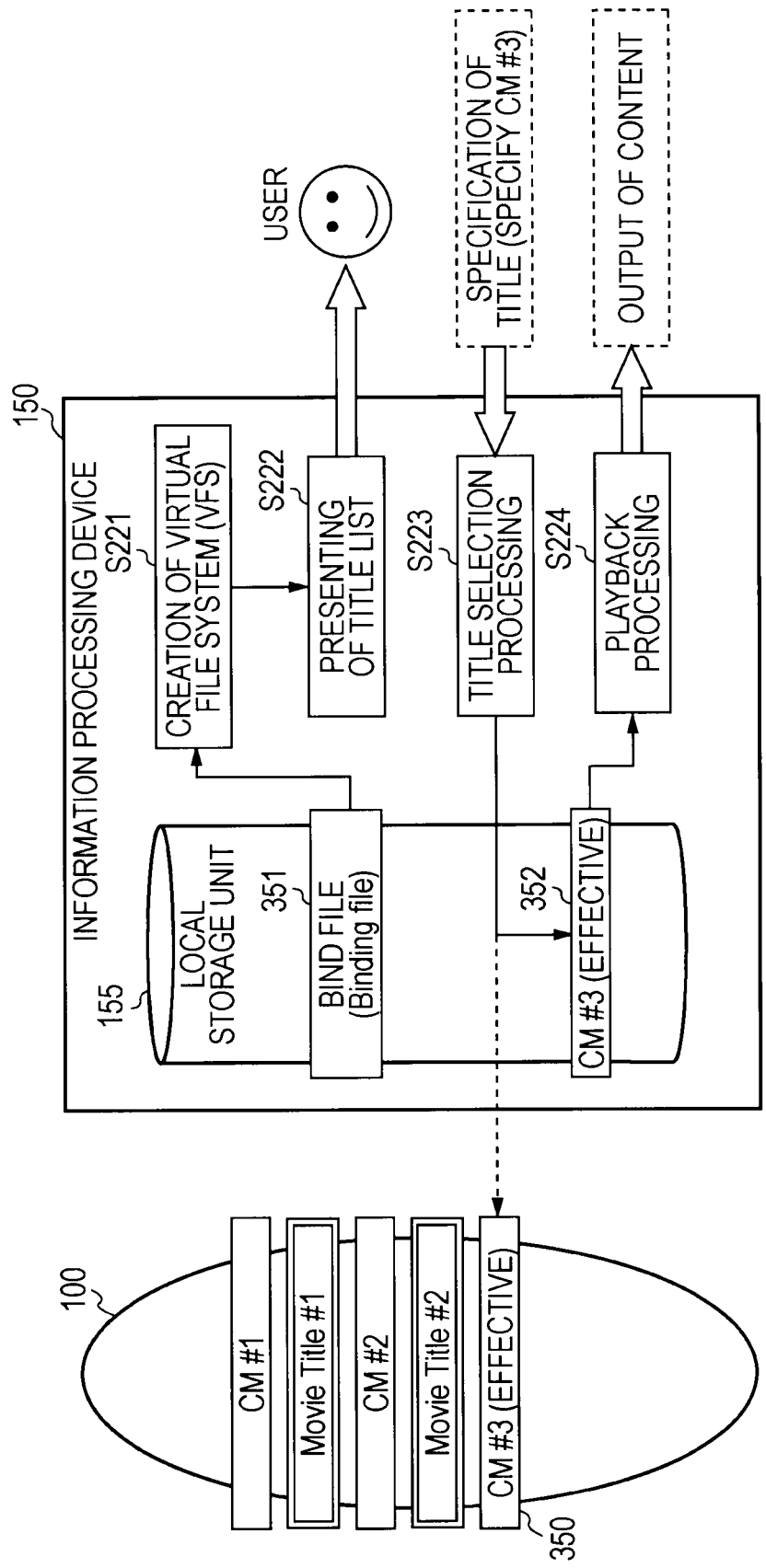
FIG. 12 is a diagram for describing a content playback processing example employing a bind file (Binding file)

FIG. 12 illustrates a content playback example in the case of employing a bind file (Binding file). The information processing device 150 stores a commercial content [CM#3] 352 downloaded from the server, and a bind file (Binding file) 351 in the local storage unit 155.

The information processing device 150 on which the disc 100 is mounted builds a virtual file system (VFS) in step S221. Processing employing the mapping information (see FIG. 10) of a bind file (Binding file) is performed at the time of building this VFS. That is to say, in a case wherein a content name which is recorded in a playlist as a content to be played is recorded as "(b) a playback specified content file name on a playlist" of a bind file (Binding file), a VFS is built so as to set "(a) the file name of a content entity (download content)" recorded in a manner corresponding to "(b) the playback specified content file name on a playlist" thereof as an access content.

Next, in step S222, the information processing device 150 presents a title list employed for specifying a playback content to the user. For example, a title list is displayed on the display unit of the information processing device 150. In step S223, the user selects a title to be played from the title list. In accordance with the selected title, the information processing device 150 selects the playlist correlated with the title. Note that the title information and playlist are information recorded beforehand in the disc 100. A case is shown here wherein the user desires playback of a commercial content [CM#3], and a playlist in which only the commercial content [CM#3] is recorded as a playback content is selected and played.

A content name serving as content specification information is recorded in a playlist. In this case, the file name of the commercial content [CM#3] 350 recorded in the disc 100 is recorded in the playlist. The information processing device 150 obtains the set content of the virtual file system (VFS) in accordance with the file name recorded in the playlist.

The virtual file system (VFS) records the file name of the local storage unit 155 by mapping processing as the access destination of the content name [CM3] recorded in the playlist. That is to say, the VFS specifies the download content [CM3] 352 as a content access destination. In step S224, in accordance with the virtual file system (VFS) set in accordance with such mapping information, the data processing unit 151 of the information processing device 150 obtains the commercial content [CM#3] 352 downloaded from the local storage unit 155 to perform playback processing.

Figure 13:
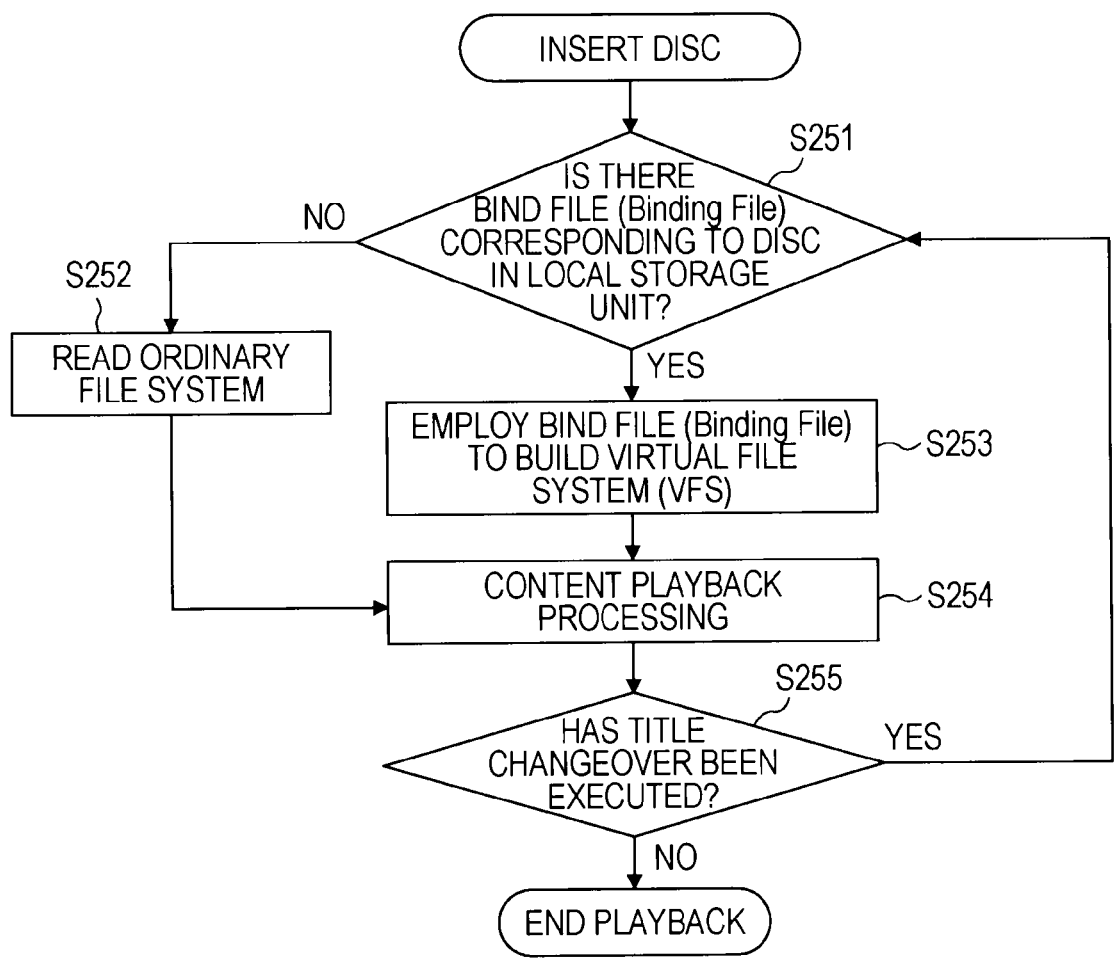
FIG. 13 is a diagram illustrating a flowchart for describing the building sequence of a virtual file system (VFS)

Note that building of a virtual file system (VFS) is performed prior to title specification processing by the user. For example, virtual file system (VFS) building processing is performed at the time of the disc 100 being mounted on the information processing device. Description will be made regarding virtual file system (VFS) building sequence with reference to FIG. 13.

Upon detecting that the disc being mounted on the information processing device, in step S251 the information processing device determines whether or not there is a bind file (Binding file) corresponding to a disc in the local storage unit. Various discs are mounted on the information processing device, and the identifier of each disc is recorded in a bind file (Binding file) recorded in the local storage unit in a correlated manner.

Specifically, in a case wherein the directory corresponding to each disc is set in the local storage unit, and there is a bind file (Binding file) corresponding to each disc thereof, the bind file (Binding file) is recorded in the directory thereof. The information processing device verifies whether or not a bind file (Binding file) is recorded in the directory corresponding to the mounted disc.

In a case wherein no bind file (Binding file) is recorded in the directory corresponding to the mounted disc, the processing proceeds to step S252, where a file system employing no bind file (Binding file) is built, and content playback employing the file system built in step S254 is performed.

On the other hand, in a case wherein determination is made in step S252 that a bind file (Binding file) is recorded in the directory corresponding to the mounted disc, the processing proceeds to step S253, where a file system employing a bind file (Binding file) is built, and content playback employing the virtual file system built (VFS) in step S254 is performed.

Processing employing the mapping information of bind file (Binding file) (see FIG. 10) is performed at the time of building a VFS in step S253. That is to say, in a case wherein a content name which is recorded in a playlist as a content to be played is recorded as "(b) a playback specified content file name on a playlist" of a bind file (Binding file), a VFS is built so as to select "(a) the file name of a content entity (download content)" recorded in a manner corresponding to "(b) the playback specified content file name on a playlist" thereof as a playback content.

That is to say, the virtual file system (VFS) is built as a file system holding mapping information. In the case of having searched with a disc stored file name recorded in a playlist as a search key, the virtual file system (VFS) holding mapping information is configured to present the search result with the file name (download content) of the local storage unit mapped form the file name thereof as an access destination, and the information processing device employs the VFS holding this mapping information to enable the file of the local storage unit determined with the local storage unit stored file name mapped from a recorded file name of the playlist to be obtained and played.

In step S255, determination is made whether or not switching of a title by the user has occurred, and in a case wherein switching of a title has occurred, the processing returns to step S251, where the processing is repeated. This is because there is a case wherein a newer bind file (Binding file) than the bind file (Binding file) read the last time has downloaded during playback processing, and in such a case, a virtual file system (VFS) is rebuilt employing the new bind file (Binding file).

Note that an arrangement may be made wherein multiple bind files (Binding files) as to one disc are stored by appending version numbers to local storage units, or an arrangement may be made wherein a new bind file (Binding file) is overwritten on an old bind file (Binding file).

4. Automatic Download and Automatic Playback Processing of Content

As described above, with the content playback processing employing mapping information, a playback content is selected with a content name described in a playlist. In a case wherein a content name recorded in the playlist at this time is recorded in a bind file (Binding file) as "(b) a playback specified content file name on the playlist", "(a) the file name of a content entity (download content)" stipulated with the mapping information by the bind file (Binding file) is selected as a playback content.

For example, in a case wherein the download content from the server is a commercial content, and this commercial content is recorded in the local storage unit, whereby the commercial content recorded in the local storage unit can be played in a sure manner by employing a particular playlist.

Figure 14:
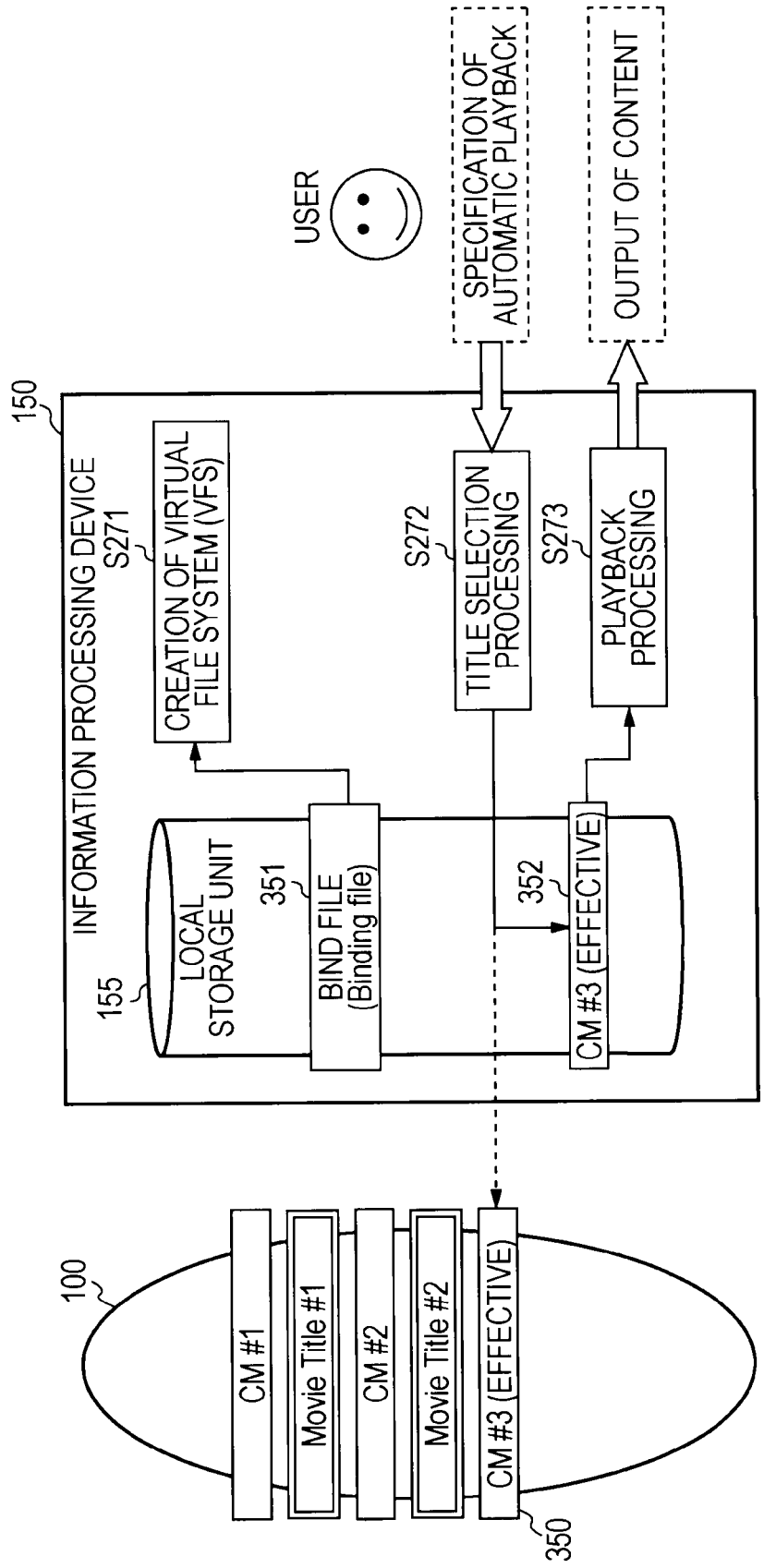
FIG. 14 is a diagram for describing processing for automatically playing a commercial content.

Description will be made regarding processing for automatically playing a commercial content obtained from the server and stored in the local storage unit 155 with reference to FIG. 14. The information processing device 150 stores the commercial content [CM#3] 352 downloaded from the server, and the bind file (Binding file) 351 in the local storage unit 155.

The information processing device 150 on which the disc 100 is mounted builds a virtual file system (VFS) in step S271. Processing employing the mapping information (see FIG. 10) of a bind file (Binding file) is performed at the time of building a VFS. That is to say, in a case wherein a content name which is recorded in a playlist as a content to be played is recorded as "(b) a playback specified content file name on a playlist" of a bind file (Binding file), a VFS including mapping information is built so as to select "(a) the file name of a content entity (download content)" recorded in a manner corresponding to "(b) the playback specified content file name on a playlist" thereof as a playback content.

Next, the user specifies automatic playback in step S272. In accordance with this specification, the information processing device 150 selects a playlist for automatic playback processing set as a default beforehand. Note that the playlist is information recorded beforehand in the disc 100. With this playlist for automatic playback, the commercial content [CM#3] is recorded as the first playback content.

The file name of the commercial content [CM#3] is recorded in the playlist as content specification information. The information processing device 150 obtains the content set by the virtual file system (VFS) in accordance with the file name recorded in the playlist.

An arrangement is made wherein the virtual file system (VFS) specifies not a file of the disc but a file of the local storage unit as the access destination of the content name [CM3] recorded in the playlist. That is to say, an arrangement is made wherein a file name of the local storage unit 155 is specified as an access destination by mapping processing. That is to say, the virtual file system (VFS) specifies the download content [CM3] 352 stored in the local storage unit 155 as an access destination. In step S273, in accordance with such a virtual file system (VFS) including mapping information, the data processing unit 151 of the information processing device 150 obtains the commercial content [CM#3] 352 downloaded from the local storage unit 155 to perform playback processing.

Note that the basic sequence of content download processing has been described with reference to the flowchart shown in FIG. 8, but with the processing described with reference to FIG. 8, first, the basic sequence has been described as a processing example wherein a list of contents which can be presented from the server to the user side is presented, and the user selects a content to be downloaded from the list. However, for example, in the case of estimating a situation wherein commercial contents are updated periodically, or the like, the server which provides commercial contents desires to present the latest commercial content to the user constantly to play this with the information processing device on the user side in a sure manner. Description will be made below regarding content automatic download processing and playback sequence example corresponding to such a request.

Figure 15:
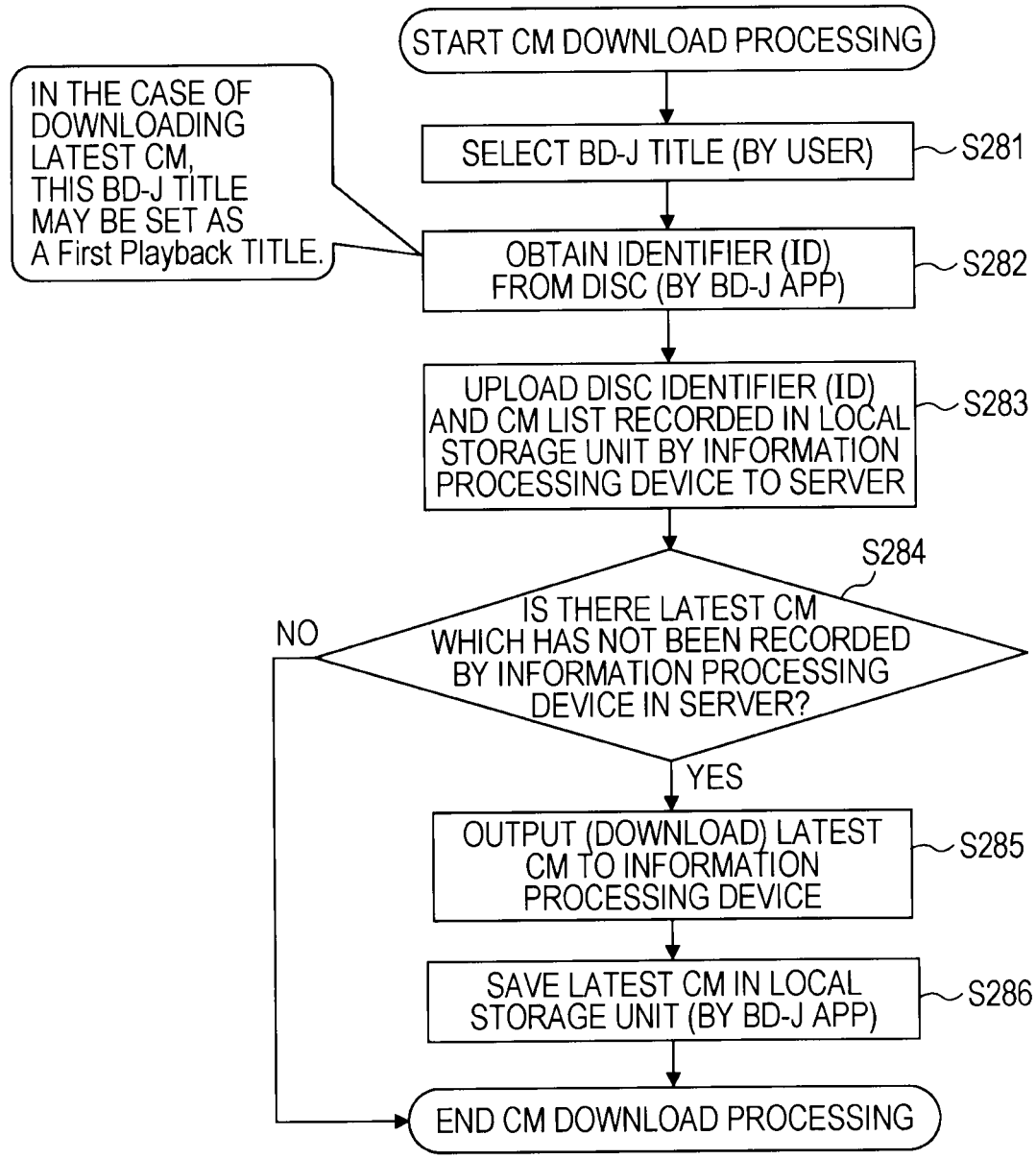
FIG. 15 is a diagram illustrating a flowchart for describing a processing sequence for automatically downloading the latest content from the server.

First, description will be made with reference to the flowchart shown in FIG. 15 regarding processing sequence for downloading the latest content from the server automatically. Note that FIG. 15 is an example with a commercial content as a download content.

First, in step S281, the user selects an application program (BD-J app) for performing downloading of a content using a title. This processing is executed by the user employing the information processing device 150. Next, in step S282, the information processing device 150 executes the application program (BD-J app) read from the disc 100 by the specification of the user to obtain the identifier of an ID corresponding to the disc, e.g., at lead one identifier of a content ID, volume ID, and PMSN which is a serial number equivalent to a media ID, which are recorded in a processing control file.

Next, in step S283, the application program (BD-J app) uploads the identifier (ID) corresponding to the disc recorded in the disc obtained in step S282, and a list of the commercial contents which the information processing device 150 stores in the local storage unit 155. The application program (BD-J app) includes a program for executing processing for generating a list of the commercial contents stored in the local storage unit 155 to transmit this to the server, and the data processing unit of the information processing device executes processing in accordance with this application program.

Step S284 and step S285 are processing on the server side, and in step S284, the server confirms whether or not the server side holds a commercial content stored in the disc, and a commercial content to be provided to the user other than the commercial contents stored in the local storage unit based on the disc recording identifier (ID) and commercial content list received from the information processing device.

In a case wherein the server holds no new commercial content to be provided to the user, the processing is ended. In a case wherein the server holds a new commercial content to be provided to the user, in step S285 the server transmits the latest commercial content to the information processing device on the user side. At this time, the server also transmits a bind file (Binding file) recording mapping information and a playlist file as necessary.

Step S286 is processing of the information processing device on the user side, and the information processing device stores the commercial content received from the server in the local storage unit of the information processing device on the user side. Note that at this time the information processing device also receives the bind file (Binding file) recording mapping information and the playlist file as necessary, and stores these in the local storage unit.

Figure 16:
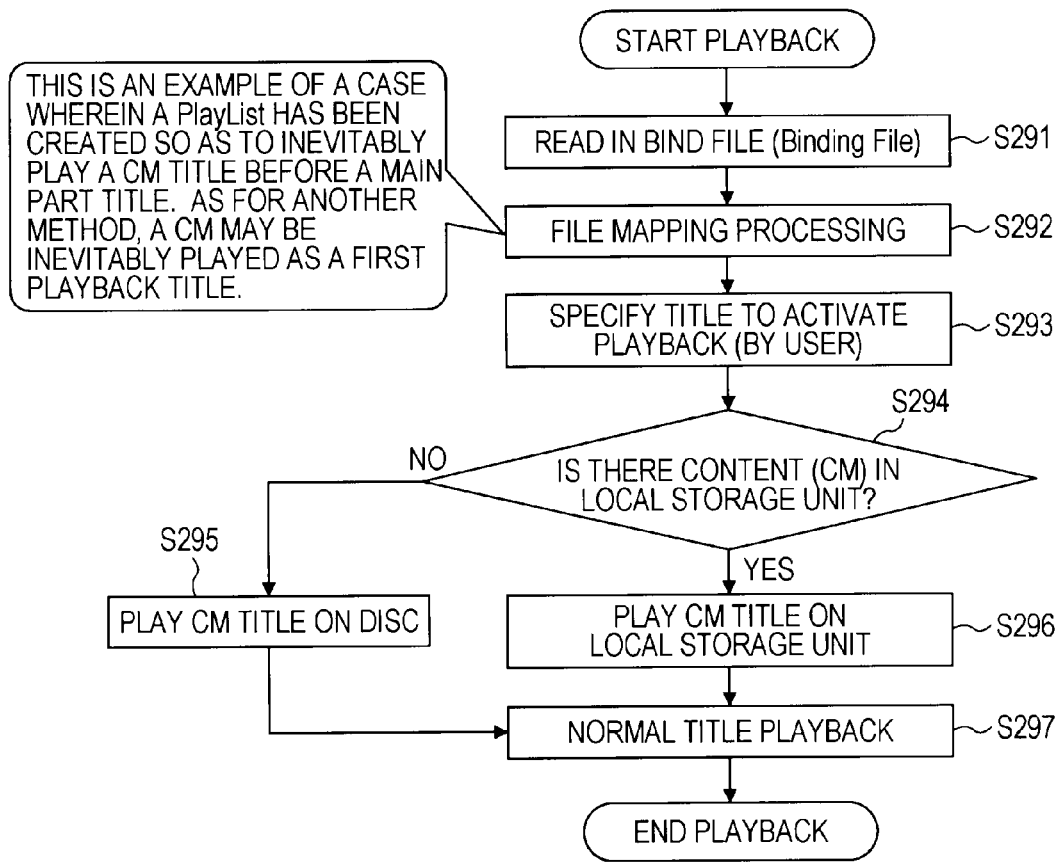
FIG. 16 is a diagram illustrating a flowchart for describing a content automatic playback processing sequence.

Next, content automatic playback processing sequence will be described with reference to the flowchart shown in FIG. 16. This sequence corresponds to the processing described with reference to FIG. 14. The information processing device 150 the commercial contents and bind file (Binding file) downloaded from the server in the local storage unit 155.

In step S291, the information processing device on which the disc is mounted reads the bind file (Binding file) from the local storage unit 155, and in step S292 builds a virtual file system (VFS) employing the mapping information (see FIG. 10) recorded in the bind file (Binding file).

According to the virtual file system (VFS) building processing, in a case wherein a content name which is recorded in a playlist as a content to be played is recorded as "(b) a playback specified content file name on a playlist" of a bind file (Binding file), "(a) the file name of a content entity (download content)" recorded in a manner corresponding to "(b) the playback specified content file name on a playlist" thereof is selected as a playback content.

Next, the user requests playback of a content by specifying a title in step S293. This title is a playlist for performing playback of a commercial content. An example of this is the playlist for automatic playback processing selected with automatic playback described with reference to FIG. 14. The information processing device plays the contents recorded in the playlist sequentially.

In step S294, the information processing device determines whether or not the content accessed with an index (content file name) serving as content specification information recorded in the playlist is in the local storage unit, and in a case wherein the content is on the disc, the processing proceeds to step S295, where the information processing device reads out a commercial content from the disc, and in step S297 executes playback of the commercial content, and in a case wherein the content accessed with the index (content file name) recorded in the playlist is in the local storage unit, the processing proceeds to step S296, where the information processing device reads out the commercial content from the local storage unit, and in step S297 executes playback of the commercial content.

Note that the determination of content access destination in step S294 is processing executed by employing the virtual file system (VFS) built by employing the mapping information (see FIG. 10) recorded in a bind file (Binding file). That is to say, in a case wherein a content name which is recorded in a playlist as a content to be played is recorded as "(b) a playback specified content file name on a playlist" of a bind file (Binding file), "(a) the file name of a content entity (download content)" recorded in a manner corresponding to "(b) the playback specified content file name on a playlist" thereof is extracted as a playback content.

5. Details of Download Processing According to Content Type

With the above-mentioned processing examples, a commercial content has been described as an example of a content to be downloaded from the server, but the content to be downloaded from the server is not restricted to a commercial, and for example, a main content such as an AV stream content, Java (registered trademark) application program (BD-J app), playlist, and further in addition to these ordinary contents, usage control information (Usage Rule) is downloaded in some cases. Description will be made below regarding specific download processing sequence regarding each piece of the above-mentioned data.

5.1 Download Processing Example of Commercial Content

Figure 17:
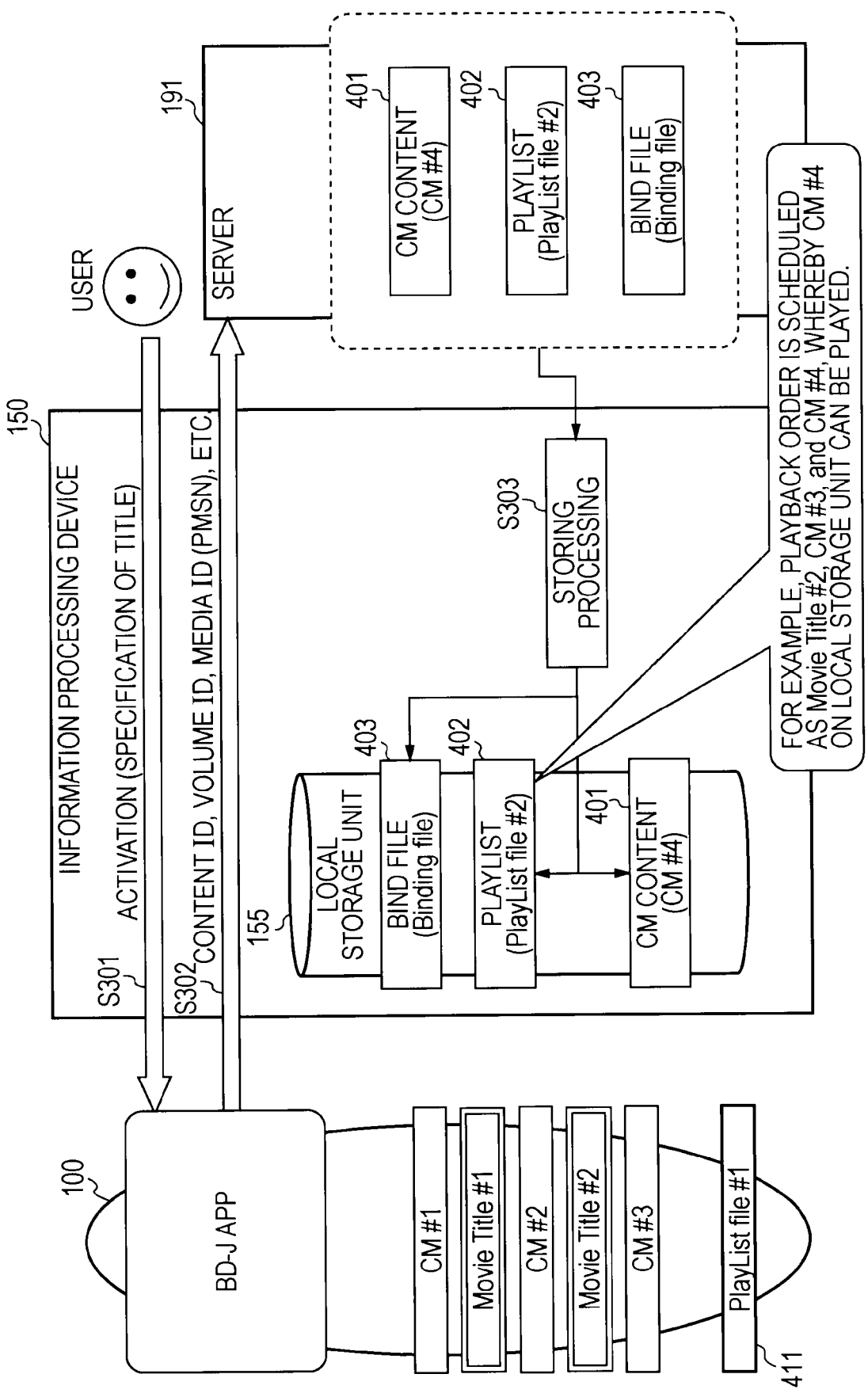
FIG. 17 is a diagram for describing a download processing example of a commercial content.

First, description will be made regarding a download processing example of a commercial content with reference to FIG. 17. The example shown in FIG. 17 is not replacement of a commercial content recorded in the disc 100 but an example for adding a new commercial content (CM#4) 401. In this case, a playlist 411 recorded in the disc 100 does not include the playback specification information of the commercial content (CM#4) 401 to be downloaded and obtained from the server 191, and accordingly, a new playlist 402 in which the commercial content (CM#4) 401 serving as a download content is recorded as playback content information is also downloaded from the server and stored in the local storage unit 155 of the information processing device 150.

First, in step S301, the user activates a content management application (BD-J app) recorded in the disc 100 through the input unit (UI) of the information processing device 150 on which the disc 100 is mounted. This processing is equivalent to the activation processing of the content management application (BD-J app 1) 321 described with reference to FIG. 7. As described above, as the processing on the user side the content management application (BD-J app 1) is activated by the same title specification processing as that in the case of playing a movie content.

According to the execution of the content management application (BD-J app) by the information processing device 150, in step S302 the information processing device 150 obtains identification information recorded in the disc 100, e.g., at least one of a content ID, volume ID, and PMSN which is a serial number equivalent to a media ID from the disc 100, and transmits this to the server 191 which performs providing processing of a content or the like. Note that transmission information as to the server 191 may be any data of a content ID, volume ID, and PMSN which is a serial number equivalent to a media ID, or may be data which can identify the other playback disc as long as the data can inform the server of which content is played. Further, an arrangement may be made wherein a user ID, information processing device ID, and so forth are transmitted by the settings of the content management application (BD-J app 1).

Upon receiving a download request from the information processing device 150, the server 191 obtains a download content from a database based on the received disc recorded identification information and so forth to transmit this to the information processing device 150. In this case, transmission data is the following data.

(a) commercial content (CM#4) 401,
(b) playlist file (PlayList file #2) 402, and
(c) bind file (Binding file) 403

Note that the playlist file (PlayList file #2) 402 is a playlist in which the commercial content (CM#4) 401 is included as a playback content. The information processing device 150 receives the above-mentioned data from the server 191, and in step S303 stores this in the local storage unit 155.

According to this processing, the following data is recorded in the local storage unit 155.

(a) commercial content (CM#4) 401,
(b) playlist file (PlayList file #2) 402, and
(c) bind file (Binding file) 403

In a state after recording of such data, upon playback with the playlist file (PlayList file #2) 402 selected as a playback playlist being performed, content playback including the commercial content (CM#4) 401 is performed. For example, in a case wherein the playlist file (PlayList file #2) 402 has the following playback specification information, Movie Title #2→CM #3→CM #4

Subsequently to Movie Title #2, and CM #3 from the disc 100, playback of CM #4 of the local storage unit 155 is performed.

5.2 Download Processing Example of Program Content

Figure 18:
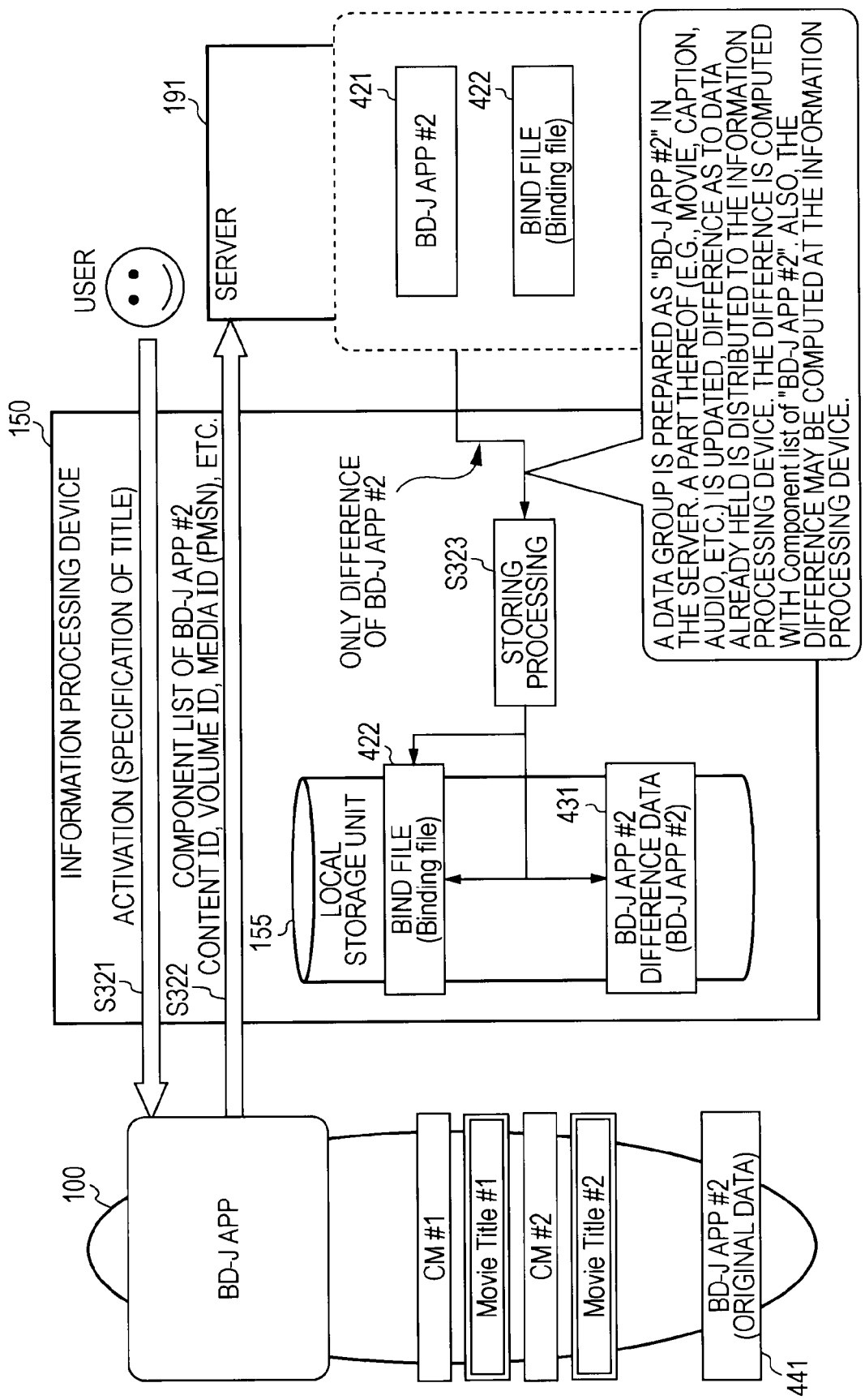
FIG. 18 is a diagram for describing a download processing example of a program content.

Next, a download processing example of a program content will be described with reference to FIG. 18. The example shown in FIG. 18 is an example wherein the update version of the BD-J app #2 441 which is a program content recorded in the disc 100 is obtained from the server 191.

First, in step S321, the content management application (BD-J app) recorded in the disc 100 is activated through the input unit (UI) of the information processing device 150 on which the user mounted the disc 100. This processing is equivalent to the activation processing of the content management application (BD-J app 1) 321 described with reference to FIG. 7.

According to the execution of the content management application (BD-J app) by the information processing device 150, in step S322 the information processing device 150 obtains identification information recorded in the disc 100, e.g., at least one of a content ID, volume ID, and PMSN which is a serial number equivalent to a media ID from the disc 100, and transmits this to the server 191 which performs providing processing of a content or the like. Further, with the present processing example, the information processing device 150 transmits a program component list corresponding to the BD-J app #2 441, which is a program content of which the update version is to be obtained, to the server 191. With the content manage application (BD-J app 1), the sequence is stipulated so as to perform processing for generating a program component list corresponding to the BD-J app #2 441 to transmit this. Further, a user ID, information processing device ID, and so forth are transmitted in some cases depending on the settings of the content management application (BD-J app 1).

Upon receiving a download request from the information processing device 150, the server 191 obtains a download content from a database based on the received disc recorded identification information and so forth, further calculates the difference as to the BD-J app #2 421 serving as an update version with reference to a program component list corresponding to the BD-J app #2 441, and selects only a component included in the received component list to transmit this to the information processing device 150.

The server 191 holds a data group which can be transmitted in increments of components as the BD-J app #2 421, and transmits not the component held by the information processing device 150 but the difference alone thereof. In this case, the transmission data is as follows.

(a) difference of BD-J app #2, and
(b) bind file (Binding file) 422

As a result thereof, the following data, i.e., (a) BD-J app #2 difference data 431, and
(b) bind file (Binding file) 422 are recorded in the local storage unit 155.

After download of these data, playback of the BD-J app #2 is performed, thereby performing playback processing of a combination of the BD-J app #2 441 of the previous version recorded in the disc 100, and an additional component included in the BD-J app #2 difference data 431 recorded in the local storage unit 155.

Thus, the data processing unit of the information processing device 150 transmits the component information of a program content stored in the disc 100 to the server 191, receives a program component equivalent to the difference with the disc stored program content from the server 191 to store this in the local storage unit 155, thereby performing program execution processing employing both of the disc stored program and local storage unit stored program.

Note that, with the above-mentioned processing example, an arrangement is made wherein the difference calculation processing of the BD-J app #2 is executed at the server 191, but an arrangement may be made wherein all data of the BD-J app #2 421 is transmitted, difference calculation is executed on the information processing device 150 side, and only the difference is stored in the local storage unit 155, or an arrangement may be made wherein all data of the BD-J app #2 421 is recorded in the local storage unit 155 as is, and the BD-J app #2 441 of the disc 100 is not employed.

Note that the setting of the bind file (Binding file) 422 is also setting corresponding to the above-mentioned setting mode. That is to say, the readout portion of the BD-J app #2 441 of the previous version recorded in the disc 100 is not subjected to mapping setting, and with regard to the readout data of the component included in the BD-J app #2 difference data 431 recorded in the local storage unit 155 instead of the BD-J app #2 of the previous version, the mapping information is recorded in the bind file (Binding file) 422.

5.3 Download Processing Example of Main Content

Next, description will be made regarding a download processing example of a main content, for example, such as an AV stream which is a movie content with reference to FIG. 19. The example shown in FIG. 19 is an example wherein a new main content (Movie Title #3) 451 is provided to the information processing device 150 on the user side, which differs from a main content (Movie Titles #1, #2) including an AV stream, for example, such as a movie or the like recorded in the disc 100.

In the case of this example, playlists #1 through #n 461 recorded in the disc 100 does not include the playback specification information of the main content (Movie Title #3) 451, and accordingly, a new playlist 452 in which the main content (Movie Title #3) 451 which is a download content is recorded as a content to be played is also downloaded from the server 191 to store this in the local storage unit 155 of the information processing device 150.

The playlist 452 is a playlist in which the main content (Movie Title #3) 451 which is a download content is recorded as a content to be played. Note that the playlist 452 may be a playlist in which only the main content (Movie Title #3) 451 is a playback target, or may be a playlist including another disc stored content as a playback specified content. Also, with the present example, the playlist to be downloaded from the server 191 shows an example of a playlist #n+1 452, but an arrangement may be made wherein playlists #n+1 through #n+m are downloaded as multiple playlists wherein a plurality of different playback order information is set.

Description will be made regarding the processing of each step of the flow in FIG. 19. First, in step S341, the user activates the content management application (BD-J app) recorded in the disc 100 through the input unit (UI) of the information processing device 150 on which the disc 100 is mounted. This processing is equivalent to the activation processing of the content management application (BD-J app 1) 321 described with reference to FIG. 7.

According to the execution of the content management application (BD-J app) by the information processing device 150, in step S342 the information processing device 150 obtains the disc recorded identifier of at least one of a content ID, volume ID, and PMSN which is a serial number equivalent to a media ID from the disc 100, and transmits this to the server 191 which performs providing processing of a content or the like. Note that transmission information as to the server 191 may be any data of a content ID, volume ID, and PMSN which is a serial number equivalent to a media ID, or may be data which can identify the other playback disc as long as the data can inform the server of which content is played. In addition, a user ID, device ID, and so forth may be included in the transmission information.

Upon receiving a download request from the information processing device 150, the server 191 obtains a download content corresponding to identification information from a database based on the received disc identification information and so forth to transmit this to the information processing device 150. In this case, transmission data is the following data.

(a) main content (Movie Title #3) 451,
(b) playlist file (PlayList file #n+1) 452, and
(c) bind file (Binding file) 453

Note that the playlist file (PlayList file #n+1) 452 is a playlist in which the main content (Movie Title #3) 451 is included as a playback content.

Description will be made regarding an example of a playlist file which the server 191 transmits to the information processing device 150 with reference to FIG. 20. As described above, a playlist is a file stipulating the playback order of contents. With the example shown in FIG. 20, the following data is recorded.

Number of streams equivalent to number of playback contents [Number of Streams]: k, and Stream file index (Stream fileindex): file name of each stream (content) of k streams (contents).

The file name of a file created by a content editor (Authoring facility) and included in the server 191 is recorded in the stream file index (Stream fileindex). At least the index of a content file to be downloaded is added to this loop.

Thus, the server 191 also provides to the user the playlist file (PlayList file #n+1) 452 made up of an updated playlist (Updated PlayList) to which an index (Index) corresponding to the main content (Movie Title #3) 451 to be provided to the user is added along with a content.

As described above, the playlist 452 may be a playlist wherein only the main content (Movie Title #3) 451 is a playback target, or may be a playlist including another disc stored content as a playback specified content. For example, in a case wherein the server 191 creates and provides a playlist including a content stored in a disc possessed by the user, and all of the contents to be provided newly as playback contents, the number of streams equivalent to the number of playback contents [Number of Streams]: k becomes the sum of the number of contents (streams) stored in the disc possessed by the user, and the number of contents (number of streams) to be provided newly, and all of the file names are recorded in the index. Note that processing for dividing a single content into multiple streams can be performed, and accordingly, the number of contents is not necessarily matched with the number of streams.

The information processing device 150 receives the above-mentioned data from the server 191, and in step S343 stores this in the local storage unit 155. According to this processing, the following data, i.e., (a) main content (Movie Title #3) 451,
(b) playlist file (PlayList file #n+1) 452, and
(c) bind file (Binding file) 453 are recorded in the local storage unit 155.

In a state after recording of such data, upon playback with the playlist file (PlayList file #n+1) 452 selected as a playback playlist being performed, content playback including the main content (Movie Title #3) 451 is performed.

5.4 Download Processing Example of Usage Control Information (Usage Rule)

Next, description will be made regarding a download processing example of usage control information (Usage Rule) with reference to FIG. 21. As described above, usage control information (Usage Rule) is data including permissive/non-permissive information of a content usage mode, for example, such as copying/playback control information (CCI) or the like, corresponding to a content, and in the case of performing content use at the information processing device 150, control is performed so as to perform content use in accordance with usage control information (Usage Rule).

Figure 21:
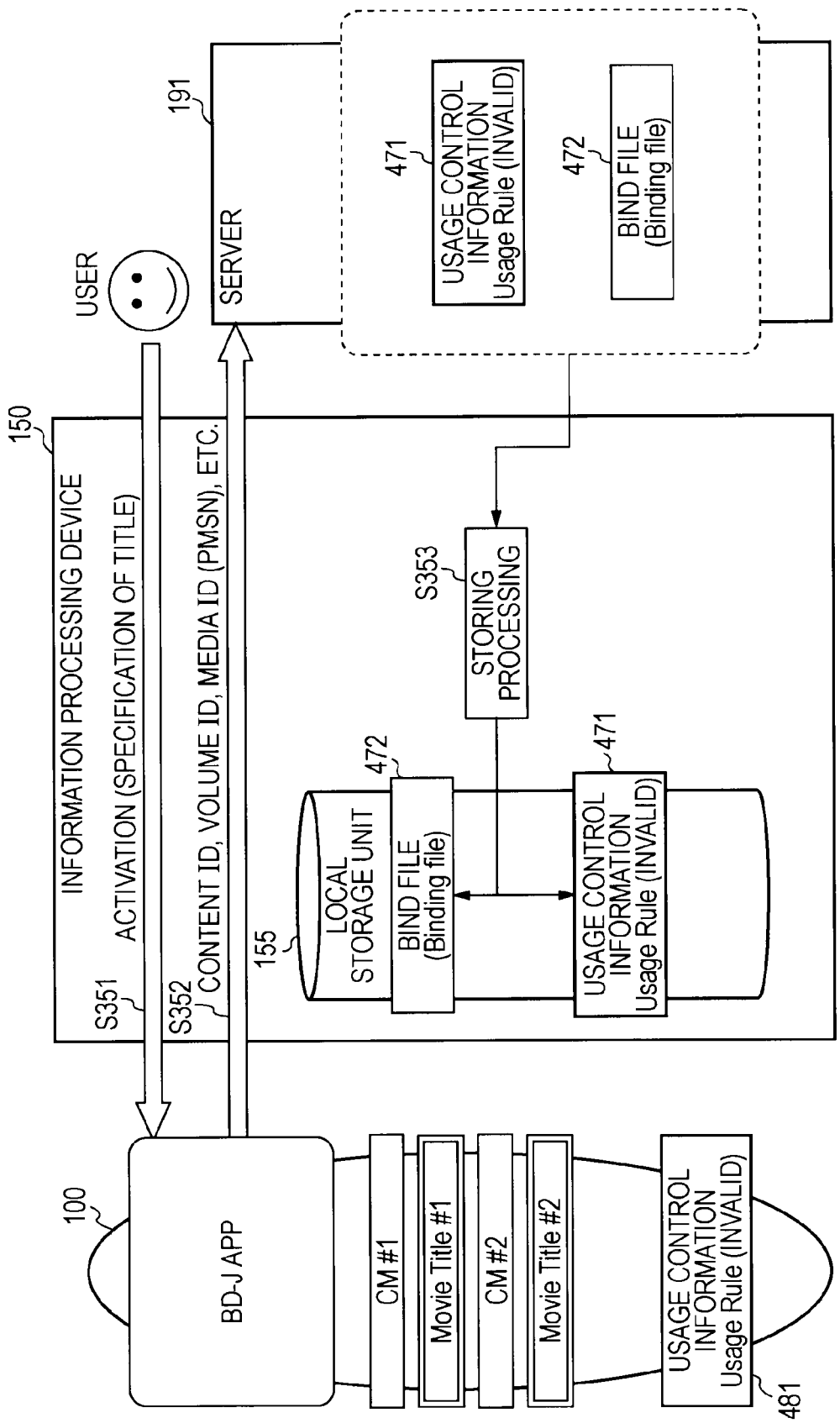
FIG. 21 is a diagram for describing a download processing example of usage control information (Usage Rule)

The example shown in FIG. 21 is a processing example wherein usage control information (Usage Rule) 481 recorded beforehand in the disc 100 is invalidated, and new updated usage control information (Usage Rule) 471 is provided to the information processing device 150 from the server 191.

In the case of this example, usage control information corresponding to main contents (Movie Titles #1 and #2) and commercial contents #1 and #2 recorded in the disc 100 is recorded in the usage control information (Usage Rule) recorded in the disc 100. Usage control information corresponding to main contents (Movie Titles #1 and #2) and commercial contents #1 and #2 recorded in the disc 100 is also recorded in the updated usage control information (Usage Rule) 471 newly provided from the server 191.

Specifically, for example, there is a processing example wherein, in a case wherein with regard to the main content (Movie Title #1), copying has been inhibited for two years since release of the disc, but after elapse of two years copying is permitted, the new updated usage control information (Usage Rule) 471 subjected to copy permissive setting is provided from the server 191 to the information processing device 150.

Description will be made regarding the processing of each step in FIG. 21. First, in step S351, the user activates the content management application (BD-J app) recorded in the disc 100 through the input unit (UI) of the information processing device 150 on which the disc 100 is mounted. This processing is equivalent to the activation processing of the content management application (BD-J app 1) 321 described with reference to FIG. 7.

According to the execution of the content management application (BD-J app) by the information processing device 150, in step S352 the information processing device 150 obtains, for example, a content ID, volume ID, and PMSN which is a serial number equivalent to a media ID from the disc 100, and transmits these to the server 191 which performs providing processing of a content or the like. Note that transmission information as to the server 191 may be any data of a content ID, volume ID, and PMSN which is a serial number equivalent to a media ID, or may be data which can identify the other playback disc as long as the data can inform the server of which content is played.

Upon receiving a download request from the information processing device 150, the server 191 obtains usage control information (Usage Rule) serving as download data corresponding to identification information from a database based on the received disc identification information and so forth to transmit this to the information processing device 150. In this case, transmission data is the following data.

(a) usage control information (Usage Rule) 471, and
(b) bind file (Binding file) 472

Note that, in the case of the present example, the usage control information (Usage Rule) 471 is data employed as the replacement data of the usage control information (Usage Rule) recorded in the disc 100, wherein usage control information corresponding to the main content (Movie Titles #1 and #2), and commercial contents #1 and #2 recorded in the disc 100 is recorded.

The information processing device 150 receives such data from the server 191, and in step S353 stores the received data in the local storage unit 155. According to this processing, the following data, i.e., (a) usage control information (Usage Rule) 471, and (b) bind file (Binding file) 472 are recorded in the local storage unit 155.

In a state after recording of such data, usage control is executed in accordance with the usage control information (Usage Rule) 471 newly recorded in the local storage unit 155 at the time of content use such as playback of the main contents (Movie Titles #1 and #2) and commercial contents #1 and #2 recorded in the disc 100.

Note that the file name of the usage control information (Usage Rule) 481 recorded in the disc is mapped to the file name of the usage control information (Usage Rule) 471 recorded in the local storage unit 155 by employing the mapping information recorded in the bind file (Binding file) 472, thereby building a virtual file system (VFS). With playback processing employing the file system (VFS) having such mapping information, readout of the usage control information (Usage Rule) 471 recorded in the local storage unit 155 is performed.

Note that usage control information (Usage Rule) is frequently set according to the type of content. In general, usage of a content such as a movie or the like is restricted strictly, and restrictions regarding usage of a content such as a commercial or the like are alleviated. Description will be made regarding a data structure example of specific usage control information (Usage Rule) with reference to FIGS. 22 and 23. FIG. 22 shows usage control information (Usage Rule) corresponding to a main content (Movie Title) such as a movie or the like, and FIG. 23 is an example of usage control information (Usage Rule) corresponding to a commercial content.

Usage control information (Usage Rule) corresponding to a main content (Movie Title) such as a movie or the like has, for example, the following content usage control information, as shown in FIG. 22.

(1) EPN (flag regarding Internet retransmission)

EPN-unasserted: CCI is referenced only at the time of Copy Control Not Asserted (2) CCI (Copy control information)

Never Copy: Copy inhibit (3) Image_Constraint_Token (information relating to resolution restriction)

High Definition Analog Output in High Definition Analog Form: without resolution restriction (4) Digital_Only_Token (information relating to analog output)

Output of decrypted content is allowed for Analog/Digital Outputs: both of digital and analog are output enabled (5) APS (information relating to protection of an analog-output content APS1 on: type 1 (AGC): type 1 of Macro-vision (6) Type_of_Title (information whether or not Internet connection is necessary at the time of playback)

Basic Title Internet connection is not indispensable

Also, usage control information (Usage Rule) corresponding to a commercial content has, for example, the following content usage control information, as shown in FIG. 23.

(1) EPN (flag regarding Internet retransmission)

EPN-unasserted: encryption is not indispensable (2) CCI (Copy control information)

Copy Control Not Asserted: without copy restriction, recorded as plaintext (3) Image_Constraint_Token (information relating to resolution restriction)

High Definition Analog Output in High Definition Analog Form: without resolution restriction (4) Digital_Only_Token (information relating to analog output)

Output of decrypted content is allowed for Analog/Digital Outputs: both of digital and analog are output enabled (5) APS (information relating to protection of an analog-output content APS1 off: without analog protection (6) Type_of_Title (information whether or not Internet connection is indispensable at the time of playback)

Basic Title: Internet connection is not indispensable

Note that usage control information (Usage Rule) shown in FIGS. 22 and 23 is an example of usage control information corresponding to each content type, and various settings are performed according to each content type.

6. Download Providing Processing Configuration of Playlist as to Playlist Unrecorded Disc The above-mentioned content download processing example has been described as an arrangement wherein playback of a disc stored content can be executed by applying a playlist stored beforehand in the disc, and a content to be added and content to be corrected are provided from the server, but for example, an arrangement may be made wherein a main content (Movie Title #n) such as a movie or the like is stored in the disc, a playlist employed for playing this content is not recorded in the disc, playback of the content is disabled only with data recorded in the disc, and playback of the main content (Movie Title #n) recorded in the disc is permitted by downloading a playlist from the server. Such an arrangement example will be described with reference to FIGS. 24 and 25.

As described above, a playlist is necessary for playing a content, and a playback content is selected with the index described in the playlist, thereby executing playback of the content. Accordingly, even when a content such as a movie or the like is recorded in the disc, in a case wherein there is no playlist which sets the content thereof as a playback content, playback of the content thereof is not executed.

An example which will be described below has an arrangement wherein, for example, a disc storing a movie content is distributed to an unspecified user, following which procedures set beforehand between the information processing device on which the disc is mounted and the server are executed, thereby providing a playlist having the playback specification information of the content stored in the disc from the server to allow the user to store this playlist in the local storage unit of the information processing device on the user side, and accordingly, playback of the disc stored content can be performed by employing the playlist thereof.

The procedures executed between the information processing device and server are various procedures, for example, such as user registration processing, accounting processing, authentication processing, or the like, which are realized with providing of user information, and can be set arbitrarily on the server side for providing a content.

Figure 24:
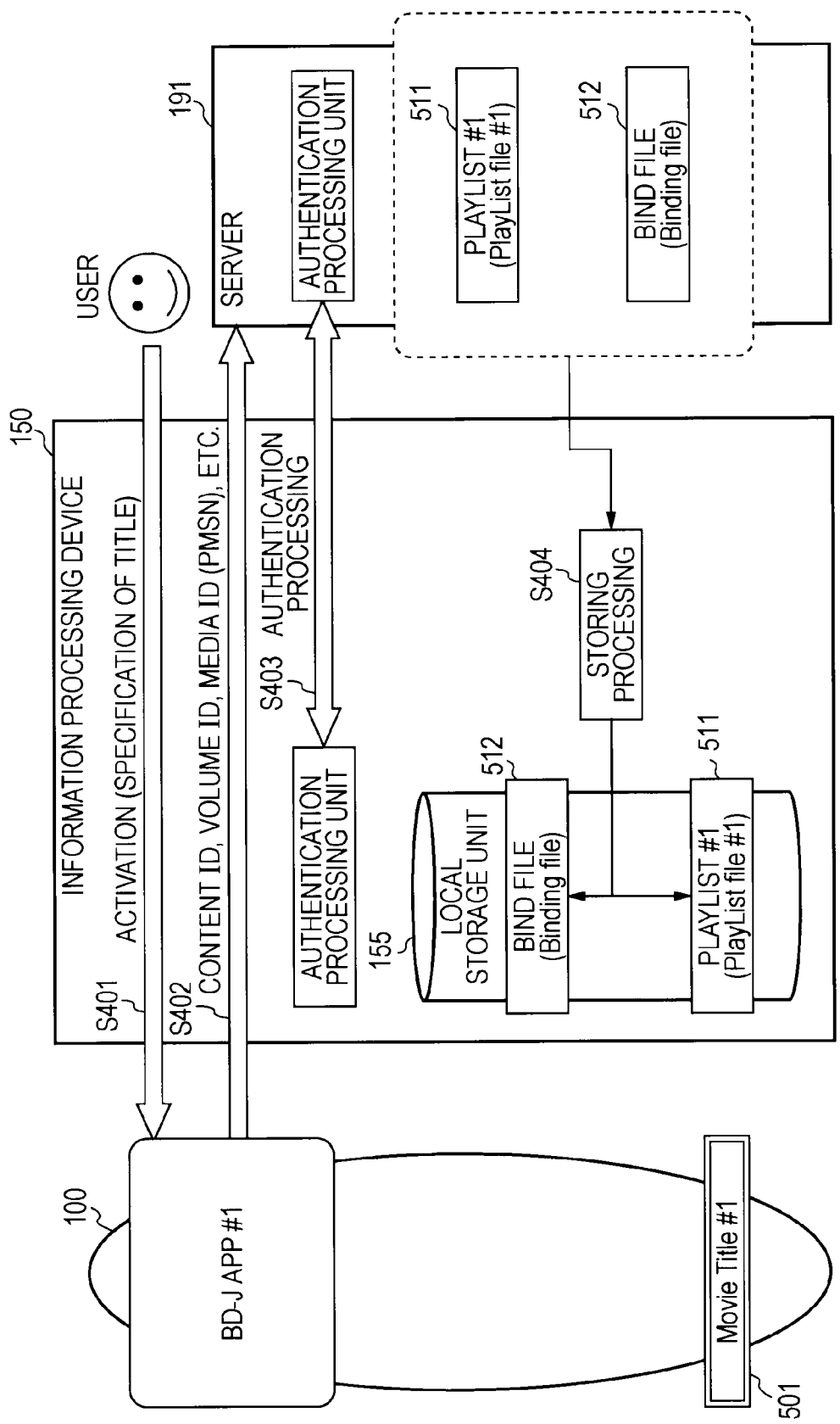
FIG. 24 is a diagram for describing a processing example wherein the information processing device obtains a playlist #1 (PlayList file #1) employed for playback of a main content (Movie Title #1) from the server.

Description will be made with reference to FIG. 24 regarding a processing example wherein the information processing device 150 on which the disc 100 wherein a main content (Movie Title #1) 501 such as a movie or the like is recorded, and a playlist employed for playback of the main content (Movie Title #1) 501 is not recorded is mounted obtains a playlist #1 (PlayList file #1) 511 employed for playback of the main content (Movie Title #1) 501 from the server 191.

First, in step S401, the user activates a content management application (BD-J app #1) recorded in the disc 100 through the input unit (UI) of the information processing device 150 on which the disc 100 is mounted. This processing is equivalent to the activation processing of the content management application (BD-J app 1) 321 described with reference to FIG. 7. That is to say, the content management application (BD-J app #1) recorded in the disc 100 is activated by the same processing as the title specification executed at the time of playback of a movie.

According to the execution of the content management application (BD-J app #1) by the information processing device 150, in step S402 the information processing device 150 obtains disc recorded identifiers, e.g., a content ID, volume ID, and PMSN which is a serial number equivalent to a media ID from the disc 100, and transmits these to the server 191 which performs providing processing of a playlist. Note that transmission information as to the server 191 may be any data of a content ID, volume ID, and PMSN which is a serial number equivalent to a media ID, or may be data which can identify the other playback disc as long as the data can inform the server of which content is played. Also, an arrangement may be made wherein a user ID, information processing device ID, and so forth are transmitted. Such an arrangement is stipulated by the content management application (BD-J app #1).

Upon receiving a download request from the information processing device 150, in step S403 the server 191 executes authentication processing with the information processing device 150. This authentication processing is performed in accordance with authentication conditions set arbitrarily by the server 191, for example, whether or not the disc 100 mounted on the information processing device 150 is an authentic disc, or whether or not the information processing device 150 is a device wherein playback of a AACS stipulated content is permitted, or the like.

The information processing device 150 transmits identification data indicating the validity of the disc or the validity of the information processing device to the server 191, the server 191 performs authentication processing to which the identification data is applied, and as a condition that the validity of the disc or the validity of the information processing device has been confirmed, the information processing device 150 can receive the playlist employed for playback processing of a disc recorded content.

The server 191 performs authentication employing the ID corresponding to the disc, for example, such as PMSN which is a serial number equivalent to a media ID, and as a condition that this authentication has succeeded, based on the disc identification information received from the information processing device 150, obtains the playlist corresponding to the identification information from a database, and transmits this to the information processing device 150. In this case, transmission data is as follows.

(a) playlist file (PlayList file #1) 511, and
(b) bind file (Binding file) 512

Note that the playlist file (PlayLIst file #1) 511 is a playlist in which the main content (Movie Title #1) 501 stored in the disc 100 is included as a playback content.

The information processing device 150 receives such data from the server 191, and in step S404 stores this in the local storage unit 155. According to this processing, the following data, i.e., (a) playlist file (PlayList file #1) 511, and
(b) bind file (Binding file) 512 are recorded in the local storage unit 155.

In a state after recording of such data, upon playback with the playlist file (PlayList file #1) 511 selected as a playback playlist being performed, playback of the main content (Movie Title #1) 501 is performed.

Thus, with the present example, the main content (Movie Title #1) 501 stored in the disc 100 is prevented from playback until authentication succeeds, and the playlist is received from the server 191. Thus, an arrangement is made wherein the playlist is provided to a particular user who is allowed to perform playback, whereby a content stored disc can be freely distributed to the general public.

Also, a user having an interest in playback of a disc stored content accesses the server, whereby the server can collect user information effectively, for example, by collecting information of a user who accessed the server. As a result thereof, the server 191 can collect the information of a user having an interest in a particular content, and accordingly, processing can be performed such that the preference information of a user is analyzed to provide a new service to a user. Note that obtaining and management processing of the preference information or the like of a user will be described later in detail.

Note that, with the above-mentioned example, an example has been described wherein a playlist corresponding to a stored content of a disc wherein no playlist is recorded at all is provided from the server, but an arrangement may be made wherein of contents stored in a disc, a playlist for playing a particular content alone is stored in a disc to provide the disc, or a playlist for playing all of the contents stored in a disc is provided from the server. Also, an arrangement may be made wherein a playlist having playback order different from a playlist stored in a disc is provided from the server.

Thus, an arrangement is made wherein a playlist corresponding to a disc stored content is distributed from the server, and accordingly, for example, a disc is distributed to users of the general public, and a playlist can be distributed to a client alone who executed predetermined procedures from the server, and an arrangement is made wherein playlists including a different playback content are set, and a playlist to be employed is selected according to the user, whereby various playable contents can be set according to the user.

Also, an arrangement is made wherein a playlist file to be provided by downloading is protected, for example, with an electronic signature employing a secret key of the server, or the like, whereby circulation of an unauthorized playlist can be prevented. That is to say, an arrangement is made wherein an electronic signature employing a secret key of the server is applied to a playlist file to be provided by downloading to provide this to the information processing device on the user side, electronic signature verification is performed with a public key of the server provided on the user side, only in a case wherein confirmation is made that the playlist to be employed is an authorized playlist with no tampering, the playlist thereof is employed, whereby circulation of an unauthorized playlist can be prevented.

Also, the server 191 may restrict the number of times of download by counting the number of times of download as to each disc employing the content ID, volume ID, PMSN which is a serial number equivalent to a media ID, and so forth. Also, an authorized disc may be found by pirated disc check processing.

Also, an arrangement may be made wherein, with the authentication processing, the server 191 registers the ID corresponding to the information processing device 150, e.g., the hardware ID peculiar to the information processing device 150, or a random number generated by the information processing device on the user side and received as the ID corresponding to the information processing device 150 as the management data of the server, performs the management of the number of times of download in increments of information processing devices, thereby restricting the number of times of download. If an arrangement is made wherein a user ID is transmitted to the server 191, management by a user ID can be performed.

Figure 25:
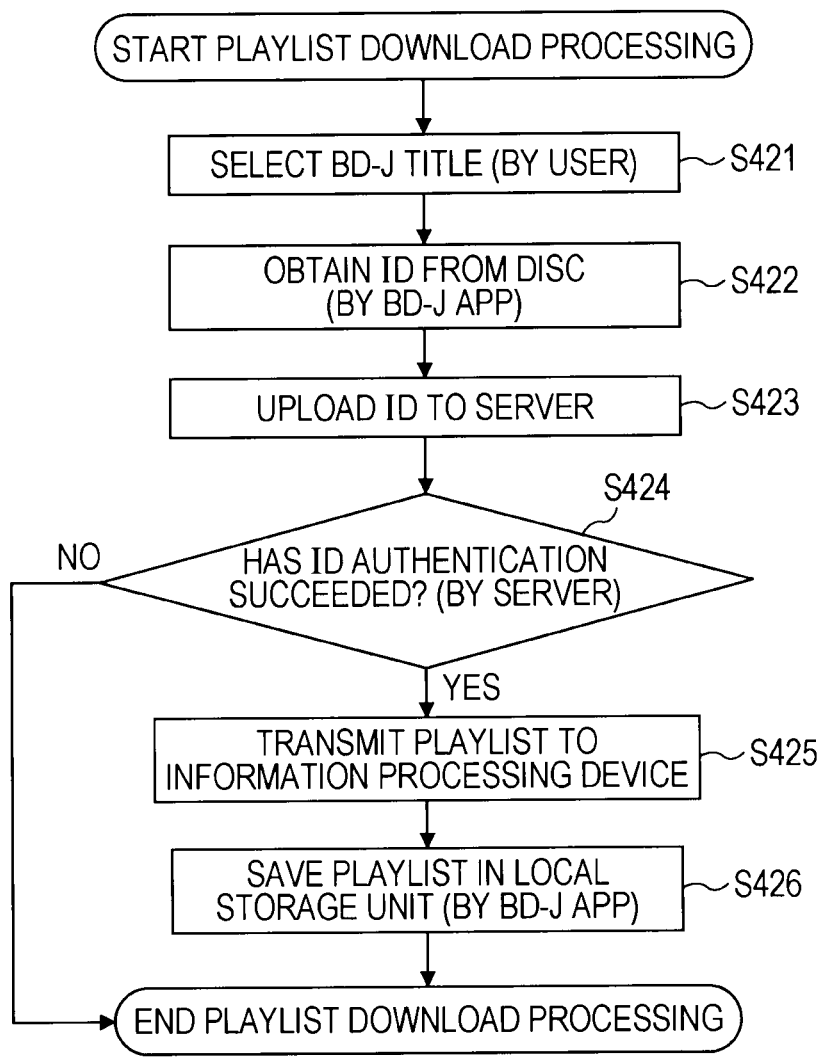
FIG. 25 is a diagram illustrating a flowchart for describing a download processing sequence of a playlist.

Description will be made with reference to the flowchart shown in FIG. 25 regarding the playlist download processing sequence described with reference to FIG. 24. In step S421, the user activates the content management application (BD-J app) recorded in the disc 100 through the input unit (UI) of the information processing device 150 on which the disc 100 is mounted.

Next, in step S422, the information processing device 150 obtains an identifier corresponding to the disc, e.g., at least one of a content ID, volume ID, and PMSN which is a serial number equivalent to a media ID from the disc 100 through the content management application (BD-J app), and in step S423 transmits the obtained identifier corresponding to the disc to the server for performing playlist providing processing.

Note that, as described above, the transmission information as to the server may be any data of a content ID, volume ID, and PMSN which is a serial number equivalent to a media ID, or may be data which can identify the other playback disc as long as the data can inform the server of which content is played.

The subsequent processing in steps S424 and S425 is processing on the server side. In step S424, the server employs the identifier corresponding to the disc received from the information processing device to execute authentication processing, for example, thereby determining whether or not the disc mounted on the information processing device is an authenticated disc. As described above, this authentication processing is performed in accordance with authentication conditions set by the server arbitrarily, e.g., whether or not the disc 100 mounted on the information processing device 150 is an authentic disc, or whether or not the information processing device 150 is a device wherein playback of a AACS stipulated content is permitted, or the like.

In a case wherein this authentication has failed, the processing ends without transmitting a playlist. In a case wherein the authentication has succeeded, the processing proceeds to step S425, where based on the disc identification information and so forth received from the information processing device, the server obtains the playlist corresponding to the identification information from the database to transmit this to the information processing device. In this case, the transmission data is the following data, i.e., (a) playlist file (PlayList file), and (b) bind file (Binding file), and the playlist file (PlayList file) is a playlist in which a main content (Movie Title) stored in the disc is included as a playback content.

In step S426, the information processing device receives such data from the server to store this in the local storage unit. According to this processing, the playlist file (PlayList file) and bind file (Binding file) are recorded in the local storage unit. In a state after recording of such data, upon playback with the playlist file (PlayList file) selected as a playback playlist being performed, playback of the main content (Movie Title) recorded in the disc is performed.

7. User Management Processing by Server

The server serving as a content providing device for providing a content or the like to a client (information processing device 150) receives a content download request from the client (information processing device 150), and provides a content, e.g., main content such as a movie or the like, commercial content, application program, playlist, usage control information, or the like to the client. The server receives identification information or the like recorded in the disc from the client (information processing device 150) at the time of this processing. Description will be made below regarding an arrangement example wherein user management is performed based on the data received from the client (information processing device 150) at the time of content providing processing by the server.

Figure 26:
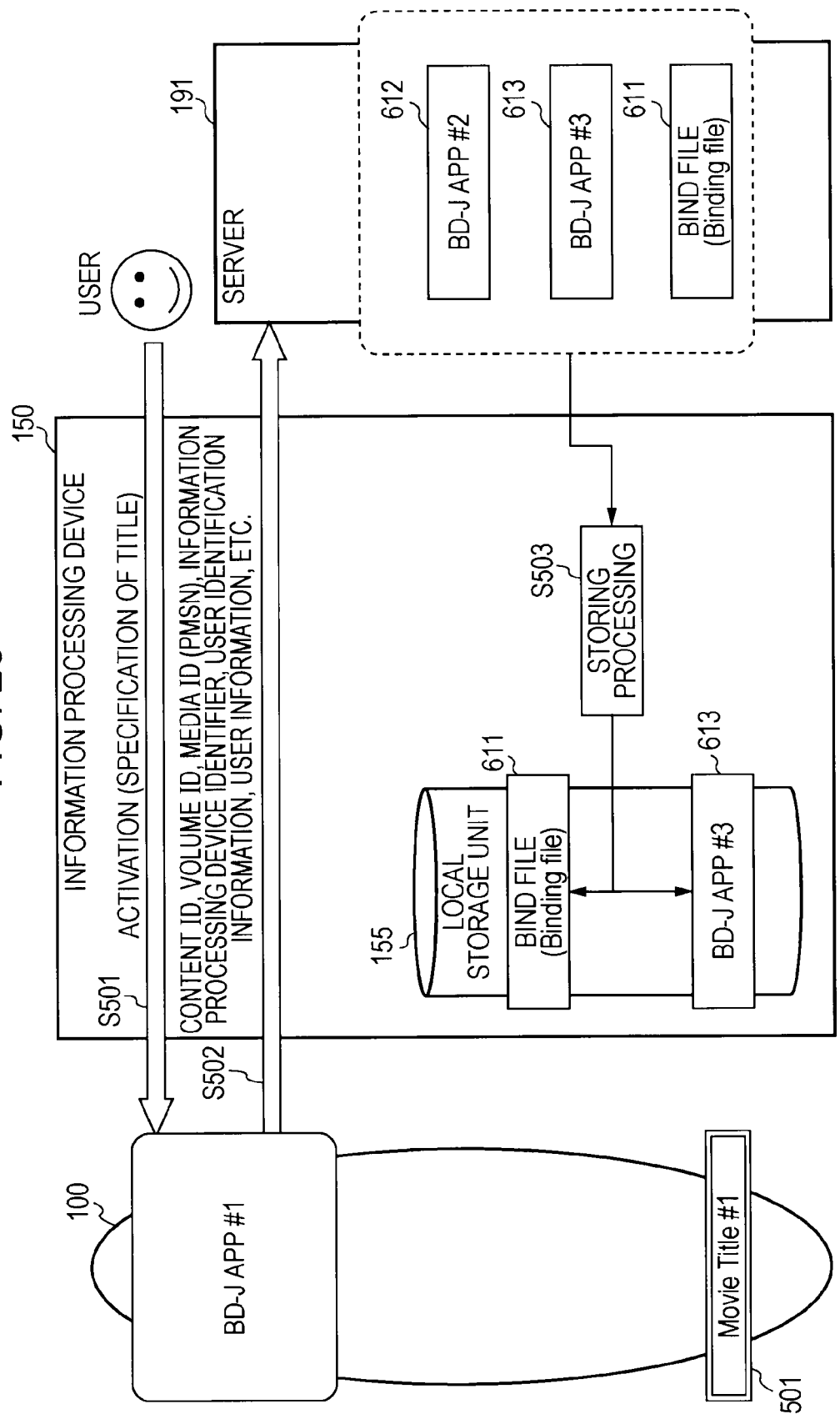
FIG. 26 is a diagram for describing processing for accessing the server to download a content.

FIG. 26 is a diagram for describing processing wherein the information processing device 150 on which the disc 100 is mounted accesses the server 191 to perform content download processing. In step S501, the user activates an application (BD-J app #1) serving as a download processing execution program to execute content download processing.

In step S502, according to the execution of the application (BD-J app #1), the information processing device 150 obtains at least one disc recorded ID of a content ID, volume ID, PMSN which is a serial number equivalent to a media ID, recorded in the disc 100, and transmits such information to the server 191. With the present example, let us say that data to be transmitted to the server 191 when performing a content download request is any of the following information (a) through (d), or a combination thereof.

(a) disc recorded ID of at least any of a content ID, volume ID, PMSN which is a serial number equivalent to a media ID, (b) identifier of information processing device 150 (information processing device ID)

(c) user identifier (user ID), and (d) user information

The administrator of the server 191 may set arbitrarily what kind of data is requested, and in this case, it is desirable to record the application (BD-J app #1) for executing processing in accordance with the setting thereof in the disc 100.

The server 191 receives at least one of the above-mentioned information (a) through (d) from the information processing device 150, executes authentication processing as appropriate, and then transmits a content to the information processing device 150. In step S503, the information processing device 150 stores the content received from the server 191 in the local storage unit 155.

The server 191 performs user management based on data received from the information processing device at the content download processing process, e.g., the above-mentioned information (a) through (d), i.e., (a) disc recorded ID of at least one of a content ID, volume ID, PMSN which is a serial number equivalent to a media ID, (b) identifier of information processing device 150 (information processing device ID)

(c) user identifier (user ID), and (d) user information.

Figure 27:
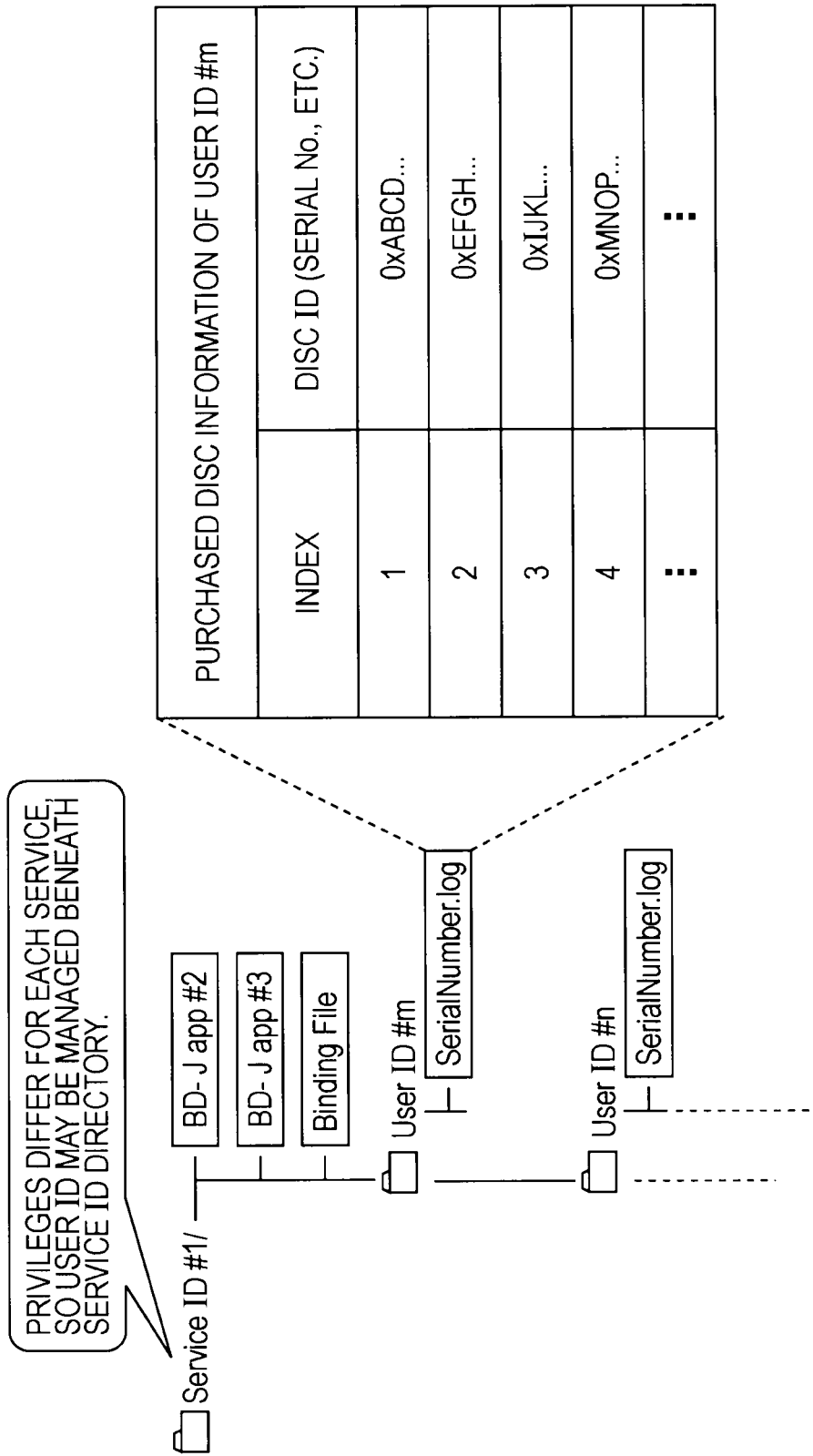
FIG. 27 is a diagram for describing a specific example of user management by the server.

Description will be made regarding a specific example of user management with reference to FIG. 27. FIG. 27 illustrates a directory example of a management database held by the server 191. With the management database of the server 191, for example, as shown in FIG. 27, directories in increments of services (service IDs) provided by the server 191 are set. However, this example is an example, various settings such as in increments of contents, in increments of users, and so forth may be performed.

With the example shown in FIG. 27, under the directory of service ID #1 directories in increments of users (UserID #m through #n) which receive this service are set, which is setting wherein information in increments of users is recorded.

For example, the purchased disc information of a user m such as shown in the drawing is recorded as the user management information of the user m (UserID #m). As shown in the table on the right side of FIG. 27, disc IDs are recorded corresponding to indexes. The disc IDs are data received from the information processing device 150 at the time of a content download request as to the server 191. That is to say, it has been confirmed that the user m (UserID #m) has these discs.

An arrangement is made wherein the information processing device 150 transmits the ID obtained form the disc mounted on the information processing device 150 to the server 191 at the time of a content download request. At this time, an arrangement is made wherein the server 191 transmits a user ID along with the disc ID, whereby user management information such as shown in FIG. 27 can be generated and updated.

Thus, for example, if an arrangement is made wherein the identifier of a disc is held for each user ID, the server can count the number of purchased discs of a user, and can change a content to be distributed to the user depending on the count. For example, processing can be performed such that a service content is provided to a user who purchased a certain number of discs. Further, if an arrangement is made wherein the personal information of a user is transmitted to the server 191 at the time of executing download, and the server 191 manages user personal information, processing can be performed such that a distributed content is changed according to user personal information.

In an arrangement is made wherein a user inputs the personal information of the user such as an address, name, sex, age, hobby, and so forth at the time of a content download request to transmit the information to the server, or an arrangement is made wherein the identification information of the information processing device is transmitted to the server, the server 191 can receive and manage further detailed information, e.g., can generate and update user management information including user personal information and device information such as shown in FIG. 28. The data shown in FIG. 28 is management data wherein the information of users who purchased a disc storing a particular content is summarized. Note that an arrangement may be made wherein user information, device ID, and so forth are transmitted only once at the time of first content download processing.

Thus, if an arrangement is made wherein the server holds the identifier of a disc for each user ID or information processing device ID, the server can count the number of purchased discs of a user, or the number of employed discs in increments of information processing devices, and can change a content to be distributed to the user depending on the count. For example, processing can be performed such that a service content is provided to a user who purchased a certain number of discs. Further, processing can be performed such that a distributed content is changed according to user personal information.

The server 191 thus obtains information relating to a user and device along with employed disc information, whereby a field or the like which a user has interest in can be analyzed, e.g., the analysis results can be employed for transmission of a message, selective providing of commercial data, or the like as to the user.

Next, description will be made with reference to FIGS. 29 and 30 regarding a processing example wherein the server is informed of a user actually playing a disc stored content, analyzes such notice information to select a content to be provided to the user.

Figure 29:
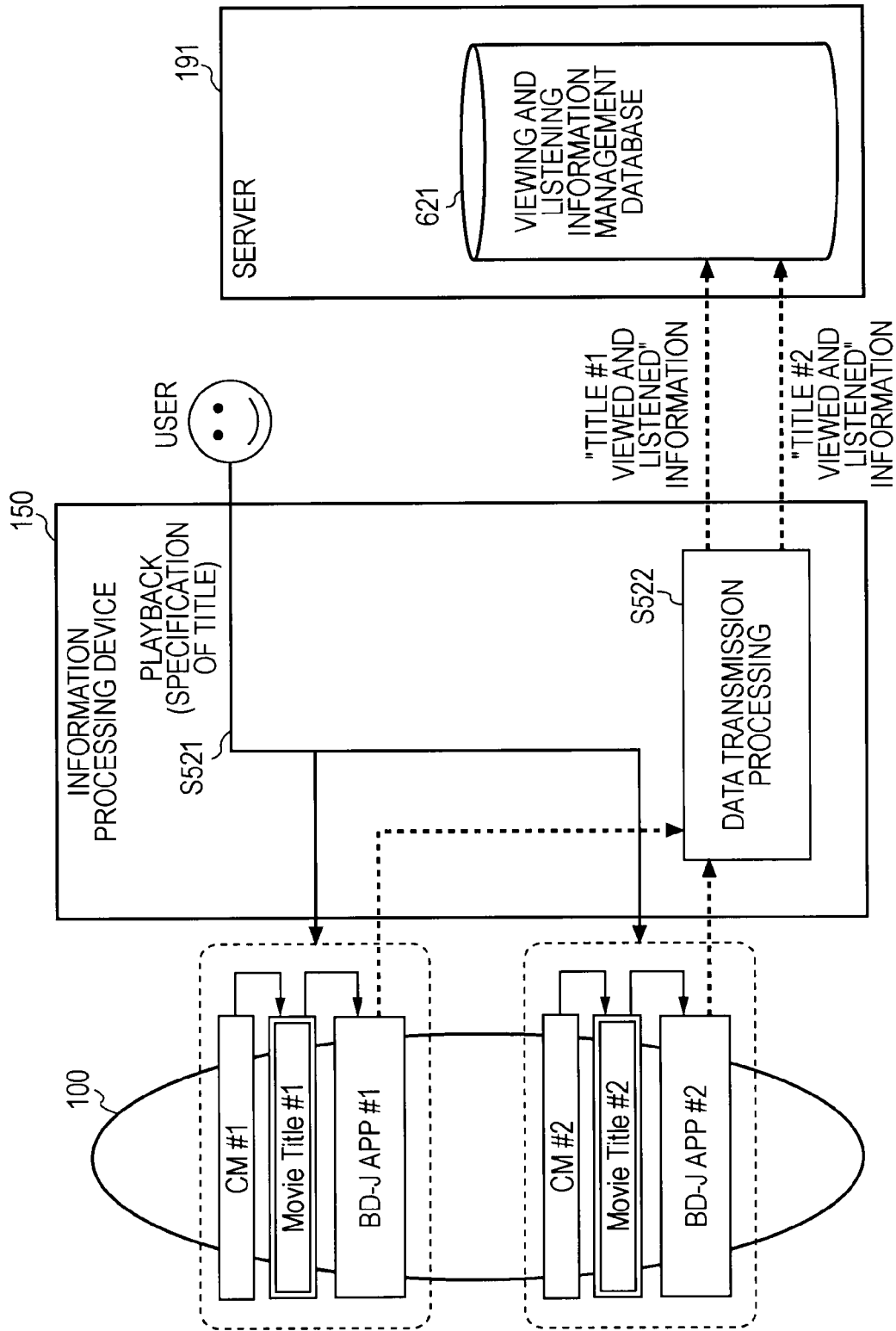
FIG. 29 is a diagram for describing a processing example wherein the server is notified of a user playing a disc stored content, and the server analyzes the notification information to select a provided content.

With the disc 100 shown in FIG. 29, the following content set
(a1) commercial content (CM #1),
(a2) main content #1 (Movie Title #1), and
(a3) application program (BD-J #1),
and the following data set
(b1) commercial content (CM #2),
(b2) main content #2 (Movie Title #2), and
(b3) application program (BD-J #2),
are recorded therein. Note that, though not shown in the drawing, playlists employed for playback of these contents are stored in the disc 100.

For example, a playlist #1 has a setting for playing the following contents in order of (a1), (a2), and (a3),
(a1) commercial content (CM #1),
(a2) main content #1 (Movie Title #1), and
(a3) application program (BD-J #1),
and a playlist #2 has a setting for playing the following contents in order of (b1), (b2), and (b3),
(b1) commercial content (CM #2),
(b2) main content #2 (Movie Title #2), and
(b3) application program (BD-J #2).

Now, (a3) application program (BD-J #1) is executed by the data processing unit of the information processing device 150, and is a program for executing processing for informing the server 191 of playback of the following contents being executed.
(a1) commercial content (CM #1), and
(a2) main content #1 (Movie Title #1)
Note that, with this notice processing, the server 191 is informed of an ID set corresponding to a disc, e.g., at least one disc recorded ID of a content ID, volume ID, and PMSN which is a serial number equivalent to a media ID.

Similarly, (b3) application program (BD-J #2) is executed by the data processing unit of the information processing device 150, and is a program for executing processing for informing the server 191 of playback of the following contents being executed.
(b1) commercial content (CM #2), and
(b2) main content #2 (Movie Title #2)

According to such a playback information notice arrangement, the server 191 can confirm contents actually played at the information processing device 150. Description will be made regarding a processing example employing such playback information with reference to FIG. 30.

Figure 30:
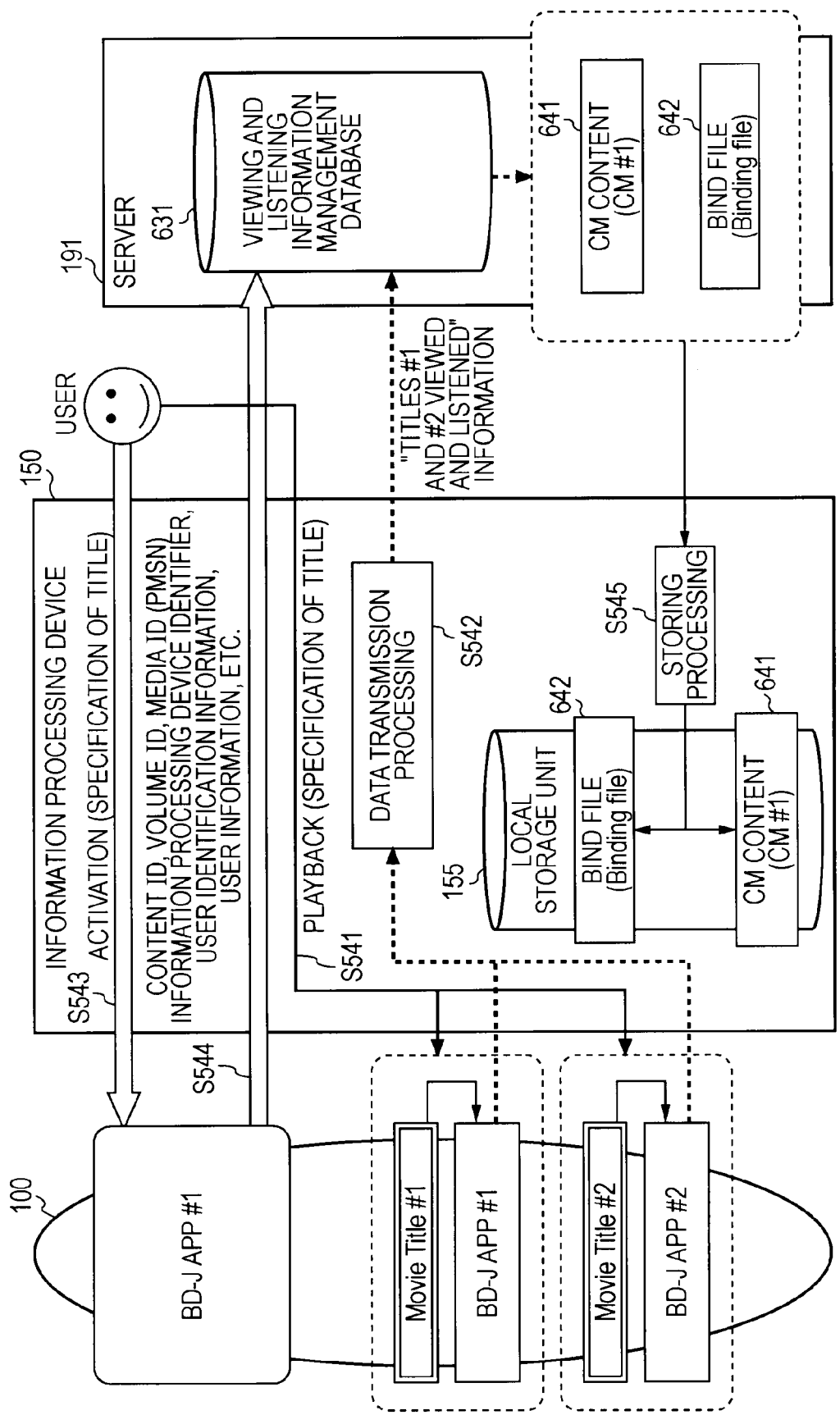
FIG. 30 is a diagram for describing a processing example wherein the server is notified of a user playing a disc stored content, and the server analyzes the notification information to select a provided content.

FIG. 30 is a diagram illustrating a processing example wherein the server 191 confirms contents played at the information processing device 150 employed by a user, determines the user's preference based on playback content information, and determines and provides a commercial content to be provided to the user from the server 191.

With the disc 100 shown in FIG. 30, the following content set
(a1) main content #1 (Movie Title #1), and
(a2) application program (BD-J #1), and the following content set
(b1) main content #2 (Movie Title #2), and
(b2) application program (BD-J #2),
and unshown playlists are stored therein.

A playlist #1 has a setting for playing the following contents in order of (a1), and (a2),
(a1) main content #1 (Movie Title #1), and
(a2) application program (BD-J #1),
and a playlist #2 has a setting for playing the following contents in order of (b1), and (b2),
(b1) main content #2 (Movie Title #2), and
(b2) application program (BD-J #2).

Now, (a2) application program (BD-J #1) includes a program for executing processing for informing the server 191 of playback of (a1) main content #1 (Movie Title #1) being executed, and (b2) application program (BD-J #2) includes a program for executing processing for informing the server 191 of playback of (b1) main content #2 (Movie Title #2) being executed.

First, in step S541, when the user employing the information processing device 150 plays the following contents by employing the corresponding playlist, (a1) main content #1 (Movie Title #1),
(a2) application program (BD-J #1),
(b1) main content #2 (Movie Title #2), and
(b2) application program (BD-J #2), in step S542 the server 191 is informed of playback fact by execution of each application program. With this notice processing, an ID set corresponding to the disc, e.g., information such as a content ID, volume ID, PMSN which is a serial number equivalent to a media ID, information requested by the server 191, e.g., identification information of the information processing device 150, user ID, user information, or the like is informed. Note that such settings can be changed arbitrarily by the following program settings:

(a2) application program (BD-J #1), and
(b2) application program (BD-J #2).

The server receives such information to record this in a user preference information management database 631. This database is a database wherein the user management information described with reference to FIGS. 27 and 28 is recorded.

Next, in step S543, the user employing the information processing device 150 activates the application (BD-J app #1) serving as a program for executing download processing to execute download processing. In step S544, according to the execution of the application (BD-J app #1), transmission request data set beforehand in the program, e.g., one of the following information (a) through (d):

(a) disc recorded ID of at least one of a content ID, volume ID, PMSN which is a serial number equivalent to a media ID,
(b) identifier of information processing device 150 (information processing device ID)
(c) user identifier (user ID), and
(d) user information, or a combination thereof is transmitted to the server 191.

Upon receiving a content download request from the information processing device 150, the server 191 searches the recorded information of the user preference information management database 631 based on various types of identification information included in the received data, and determines the preference of the user by confirming the data previously received from the user who performed a download request. The server 191 selects a commercial content (CM #1) 641 which is a commercial content adapted to the determined user's preference as a download content, and provides this to the information processing device 150. Note that the server 191 transmits a bind file (Binding file) 642, and further a playlist as appropriate. In step S545, the information processing device 150 stores these received contents in the local storage unit 155.

According to such processing, the server can analyze the preference of the user to provide a commercial content according to the user's preference, or the like. For example, specifically, in a case wherein the viewing and listening content of the user is a movie content relating to cars, a car-related commercial is provided, and in a case wherein the viewing and listening content of the user is a South Korean movie content, a commercial of South Korean travel or South Korean products is provided.

Note that, with the above-mentioned processing example, an arrangement example has been described wherein the preference of the user is determined to provide a commercial content adapted to the user's preference, but a providing content is not restricted to a commercial. For example, an arrangement may be made wherein a main content such as a movie content according to the user's preference is selected to make recommendation of this to the user, or an arrangement may be made wherein a game program content adapted to the user's interest is selected.

Thus, the server serving as a content providing device for providing a content to a client includes a data processing unit for executing content providing processing in response to a content request from the client (information processing device 150), the data processing unit receives a disc recorded identifier for identifying a disc or content recorded in the mounted disc of the client, and the identification information of at least either the device identifier of the client side device or the user identifier of the client side user from the client, accumulates the history information of the disc recorded identifier received from the client in the management database in increments of devices or in increments of users, and analyzes the preference of the user on the client side to provide a content adapted to the user's preference based on the accumulation information of the management database. Also, an arrangement may be made wherein the server receives personal information from the client, accumulates the personal information in the management database, and selects a providing content employing the personal information.

Note that the data processing unit of the server 191 provides the above-mentioned bind file (Binding file) to the client along with a content. That is to say, the data processing unit of the server 191 provides to the client a disc recorded content recorded in the mounted disc of the client (information processing device 150), and a bind file (Binding file) including the mapping information of a local storage unit stored content provided to the client by the content providing device and stored in the local storage unit of the client. As described above, the mapping information includes information for obtaining and playing a local storage unit stored content as a playback content based on disc recorded content information recorded in a playlist at the time of playback of a content at the client.

For example, the server 191 performs processing for providing a commercial content adapted to the user's preference, and mapping information for playing the commercial content instead of a disc recorded commercial content recorded in the disc on the client (information processing device 150) side to the client.

8. Creation and Management Processing of Disc Stored Content and Download Content Next, description will be made regarding the details of generation and management of a disc stored content and download content, and content providing processing as to the client (information processing device 150) with reference to FIGS. 31 through 33. These processing arrangements differ depending on a content type. Description will be made below regarding a processing example corresponding to each content type with reference to FIGS. 31 through 33.

Figure 32:
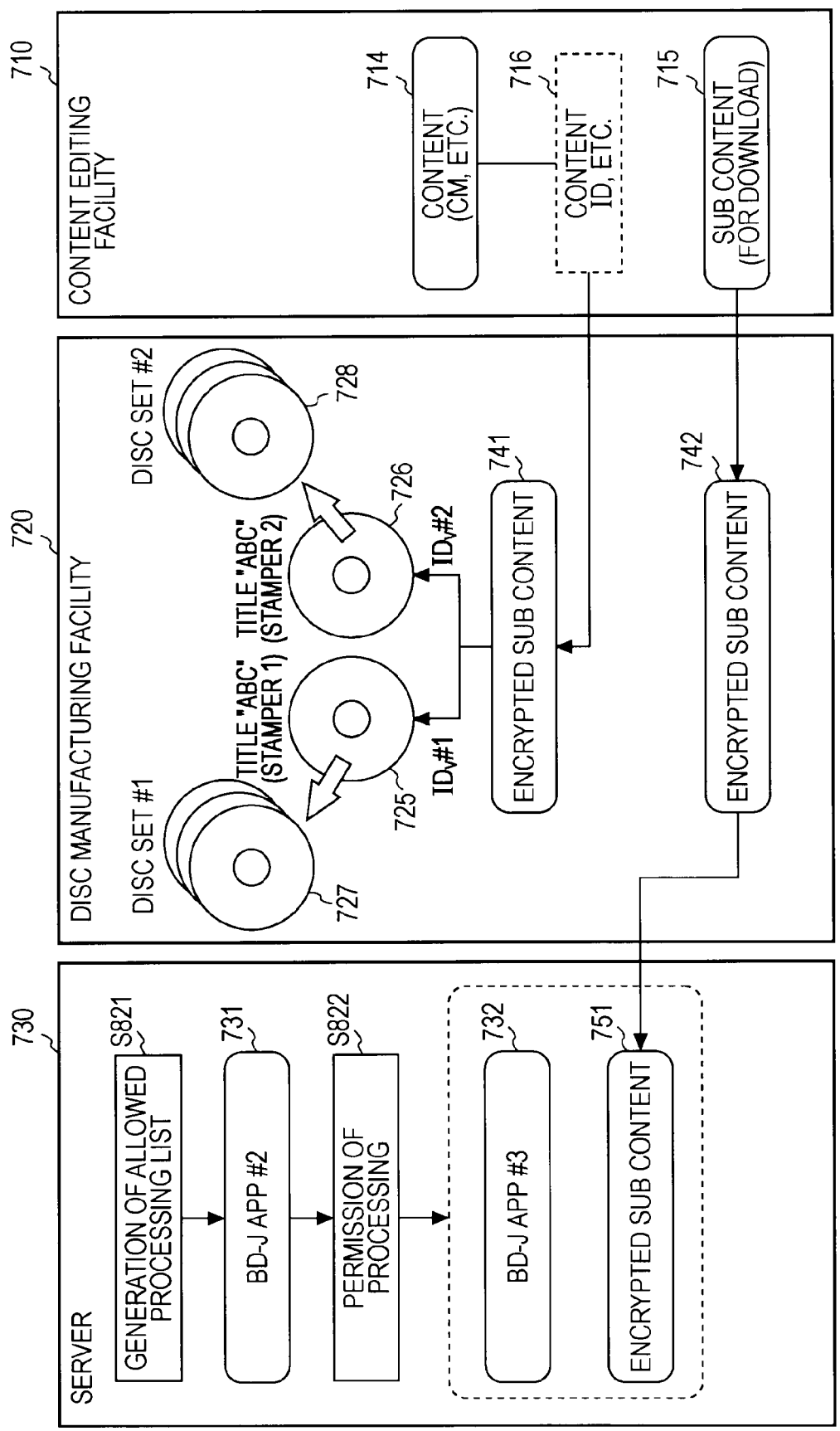
FIG. 32 is a diagram for describing the details of the generation, management, and providing processing as to a user of a disc stored content and a content for download, in a case wherein a download content is an unencrypted content.
Figure 33:
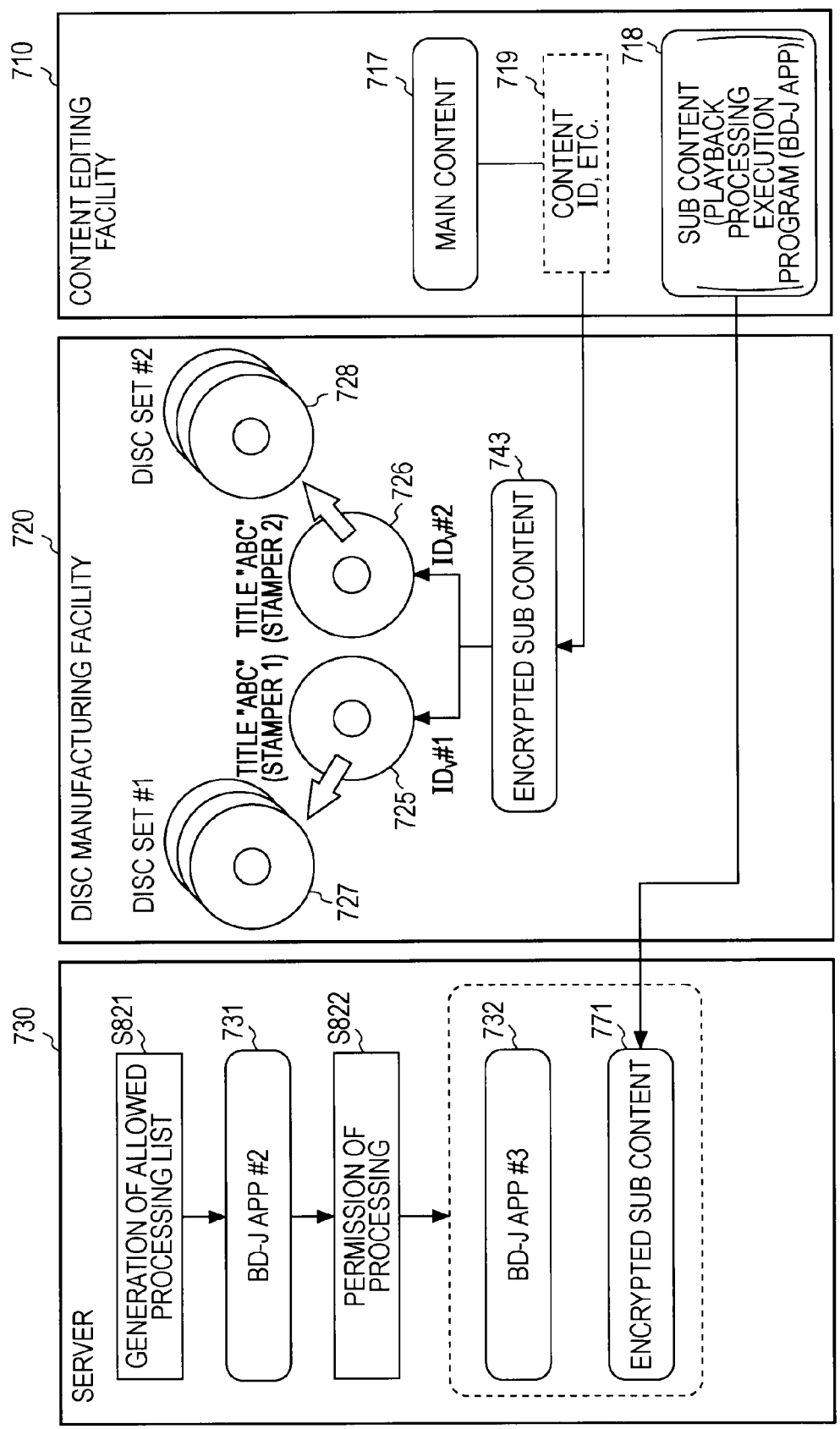
FIG. 33 is a diagram for describing the details of the generation, management, and providing processing as to a user of a disc stored content and a content for download, in a case wherein a download content is a program content.

(1) Case wherein a download content is an encrypted content (FIG. 31)
(2) Case wherein a download content is an unencrypted content (FIG. 32)
(3) Case wherein a download content is a program content (FIG. 33)

(1) Case Wherein a Download Content is an Encrypted Content

First, description will be made regarding a processing example in a case wherein a download content is an encrypted content with reference to FIG. 31.

Figure 31:
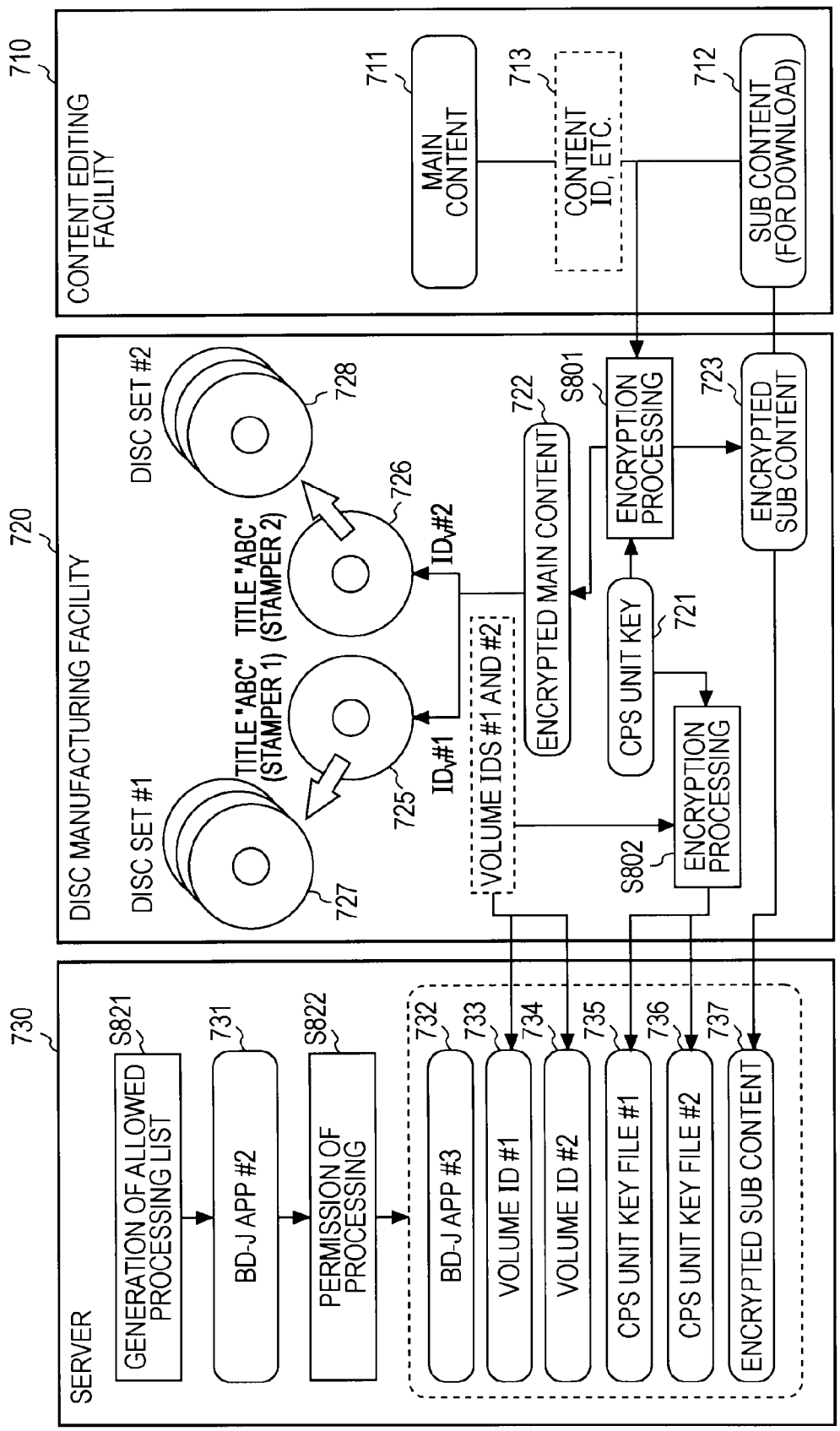
FIG. 31 is a diagram for describing the details of the generation, management, and providing processing as to a user of a disc stored content and a content for download, in a case wherein a download content is an encrypted content.

FIG. 31 illustrates the following arrangements and processing thereof.

(a) content editing facility 710 for executing content editing processing, (b) disc manufacturing facility 720 serving as a disc manufacturing unit for manufacturing a disc, and (c) server 730 for executing content providing processing as to the client (information processing device 150)

Note that the server 730 is equivalent to the server 191 for executing providing processing of a content or bind file with the above description.

First, the content editing facility 710 performs content editing processing to generate a main content 711 for storing a disc, and a sub content 712 for download. Note that these contents include a playlist and bind file to be applied to the above-mentioned content playback. The generated content is provided to the disc manufacturing facility 720. Note that content attribute information 713 such as a content ID and so forth is also provided at the time of this providing processing along with the generated content.

Upon receiving the main content 711 for storing a disc, and sub content 712 for download, generated by the content editing facility 710, in step S801 the disc manufacturing facility 720 executes encryption processing of these contents. A key applied to the encryption processing is the CPS unit key 721 described above. Note that a playlist, bind file, and other data become an encryption target in some cases.

An encrypted content 722 to be recorded in a disc, and an encrypted sub content 723 for download are generated by encryption processing to which the CPS unit key 721 is applied. Note that in a case wherein a single content is classified into multiple units, encryption processing is performed by applying a different CPS unit key in increments of units. An arrangement may be made wherein a main content and sub content are also subjected to encryption to which a different CPS unit key is applied.

The encrypted main content 722 is recorded in a stamper. The stamper is a master disc for manufacturing a disc. With the example shown in the drawing, an example is illustrated wherein two master discs: stamper 1 (725) and stamper 2 (726) are generated. An identifier, i.e., volume ID is set in increments of stampers.

volume ID #1 for stamper 1 (725), and volume ID #2 for stamper 2 (726)

A disc to be provided to a user is manufactured by employing these stampers. A disc set #1 727 is generated based on the stamper 1 (725), a disc set #2 728 is generated based on the stamper 2 (726), and these discs are provided to a user. Note that the same main content is recorded in both of these discs. However, both have a different volume ID.

Note that though not shown in the drawing, as described above with reference to FIG. 1, in addition to the contents, various data such as a CPS unit key file, MKB, usage control information (Usage Rule), and so forth is recorded in the discs.

Further, in step S802, the disc manufacturing facility 720 executes encryption processing of the CPS unit key 721 applied to content encryption processing to generate a CPS unit key file. The CPS unit key is encrypted by employing a value derived from a volume ID serving as identification information corresponding to each stamper, or volume ID.

The disc manufacturing facility 720 provides the following data to the server 730 for executing providing processing of a download content as to a user.

(a) encrypted sub content 723 encrypted by applying a CPS unit key (b) volume ID #1 and volume ID #2 serving as a stamper 1 (725) and stamper 2 (726)

(c) CPS unit key file #1 and CPS unit key file #2 generated by encrypting the CPS unit keys employing volume ID #1 and volume ID #2

The server 730 holds the following data received from the disc manufacturing facility 720 volume ID #1 (733), volume ID #2 (734),

CPS unit key file #1 (735),

CPS unit key file #2 (736), and encrypted sub content 737, and further includes the following programs serving as application programs employed for content download processing BD-J app #2 (731), and BD-J app #3 (732).

Note that, as described above, the BD-J app #2 (731) and BD-J app #3 (732) are, for example, application programs for executing the following processing, respectively.

The BD-J app #2 executes the following processing:

(a) processing for allowing a user to select a product (download data), (b) processing for informing the server of the product selected by a user, and (c) accounting processing (optional).

The BD-J app #3, which is executed at the time of recording download data in the local storage unit, executes the following processing:

(a) processing for setting an AV-related file (playback target content) in a state available by a virtual file system (VFS) for setting a disc stored content and local storage unit stored content as a virtual media stored content, and recording this in the local storage unit, and (b) processing for setting an AACS-related file (management information) in a state available by a VFS to record this to the local storage unit.

Upon receiving a content download request from an unshown user's information processing device, the server 730 executes download content providing processing. This processing is equivalent to processing described with reference to FIG. 7 and others. Specifically, in step S821, the server 730 generates an allowed processing list which is a list of processing which the user (information processing device) is allowed to perform, based on a content ID and user ID included in download request data from the information processing device, and selects the content management application (BD-J app 2) 731 to provide this to the information processing device. The information processing device displays the allowed processing list on the display unit of the information processing device by processing to which the content management application (BD-J app 2) 731 received from the server 730 is applied, the user selects a download content, the information processing device transmits the selected information to the server, and further executes settlement processing as appropriate. In this case, the information processing device displays a settlement screen on the display unit of the information processing device, the user inputs data suitable for settlement, for example, such as a credit card number and so forth, on the settlement screen, and the information processing device transmits this data. Following completion of a series of processing, in step S822, the server 730 allows download processing, selects data such as a download content and so forth, and transmits the selected information to the information processing device.

Note that the information processing device, which transmitted a download request to the server 730, transmits a volume ID obtained from the mounted disc to the server 730, so the server 730 selects a CPS unit key file based on the received volume ID to provide this to the information processing device. That is to say, even when discs store a content having the same title, if the discs have a different volume ID, applied CPS unit key files differ, so when distributing a CPS unit key file, the server 730 selects a CPS unit key file in accordance with a volume ID.

Note that the server 730 receives an identifier for identifying a disc or a disc recorded content form the client (information processing device 150) on which the disc manufactured by the disc manufacturing facility 720 which is a disc manufacturing unit is mounted, and transmits the following data to the client (information processing device 150):

(a) server distributing content, and (b) bind file (Binding file) having mapping information between a disc recorded content and server distributing content, whereby at the time of playback of a content employing a playlist in which disc recorded content information is recorded as playback content information, the client can perform processing wherein a server distributing content is played in addition to or instead of a disc recorded content specified with a playlist by the content providing processing employing the mapping information described above.

Also, with the example shown in FIG. 31, an arrangement is made wherein the disc manufacturing facility 720 which is a disc manufacturing unit performs processing wherein a disc stored content is encrypted by employing the encryption key (CPS unit key 721), and is recorded in the disc along with a volume ID which is an identifier corresponding to a disc set made up of multiple discs, and further, a key file (CPS unit key file) including data obtained by encrypting the encryption key (CPS unit key 721) with the volume ID or a value derived from the volume ID is provided to the server 730. The server 730 performs processing wherein the volume ID corresponding to the disc mounted on the client (information processing device 150) is distinguished based on the disc recorded identifier received from the client, and a key file (CPS unit key file) including data encrypted with the same volume ID as the distinguished volume ID, or a value derived from the volume ID is selected to provide this to the client.

(2) Case Wherein a Download Content is an Unencrypted Content

Next, description will be made regarding a processing example in a case wherein a download content is an unencrypted content with reference to FIG. 32. For example, a commercial content or the like is downloaded as an unencrypted content in many cases, and the example shown in FIG. 32 is an example wherein the content editing facility 710 employs a disc stored content and sub content as encrypted contents such as a commercial content or the like.

FIG. 31 illustrates the following arrangements and processing thereof, similar to FIG. 32:

(a) content editing facility 710 for executing content editing processing, (b) disc manufacturing facility 720 for manufacturing a disc, and (c) server 730 for executing content providing processing.

First, the content editing facility 710 performs content editing processing to generate a content 714 for storing a disc, and a sub content 715 for download. Note that these contents include a playlist and bind file to be applied to the above-mentioned content playback. The generated contents are provided to the disc manufacturing facility 720. Note that content attribute information 716 such as a content ID and so forth is also provided at the time of this providing processing along with the generated contents.

The disc manufacturing facility 720 records an unencrypted content 741 which is the content for storing a disc generated by the content editing facility 710 in the stampers as follows:

volume ID #1 for stamper 1 (725), and volume ID #2 for stamper 2 (726).

The disc manufacturing processing is similar to the processing described with reference to FIG. 31, so description thereof will be omitted.

The disc manufacturing facility 720 provides the following content to the server 730 for executing providing processing of a download content as to a user:

(a) unencrypted sub content 742.

The server 730 holds the following data received from the disc manufacturing facility 720 encrypted sub content 751, and further includes the following programs serving as application programs employed for content download processing BD-J app #2 (731), and BD-J app #3 (732).

Upon receiving a content download request from an unshown user's information processing device, the server 730 executes download content providing processing. This processing is basically the same processing as the processing described with reference to FIG. 31. However, the download content is the unencrypted content 751, so providing processing of a CPS unit key file is not demanded.

The example shown in FIG. 32 is a processing example wherein the disc manufacturing facility 720 serving as a disc manufacturing unit records an encrypted content in the disc as a disc stored content, and the server 730 executes processing for providing a server distributing content serving as a substituted unencrypted content to be played instead of an encrypted content included as a disc stored content to the client (information processing device 150). For example, the unencrypted content to be recorded in the disc is a commercial content, and the unencrypted content which the server 730 provides the client is a second commercial content to be played instead of the commercial content recorded in the disc.

(3) Case Wherein a Download Content is a Program Content

Next, description will be made regarding a processing example in a case wherein the download content is a program content with reference to FIG. 33. For example, an application program (BD-J app) for executing content playback processing, or the like can be provided to the user's information processing device through the server. For example, in a case wherein a disc stored content is a content to be played with special playback sequence, or the like, a dedicated program for playing the disc stored content thereof is used in some cases. The application program (BD-J app) applied to such playback is also generated by the content editing facility 710 as a content.

FIG. 33 illustrates the following arrangements and processing thereof, similar to FIGS. 31 and 32:

(a) content editing facility 710 for executing content editing processing, (b) disc manufacturing facility 720 for manufacturing a disc, and (c) server 730 for executing content providing processing.

First, the content editing facility 710 performs content editing processing to generate a main content 717 for storing a disc, and a sub content 718 for download. The sub content 718 for download is a program content to be applied to the playback processing of the main content 717 for storing a disc. The generated contents are provided to the disc manufacturing facility 720. Note that content attribute information 719 such as a content ID and so forth is also provided at the time of this providing processing along with the generated contents.

The disc manufacturing facility 720 records an unencrypted content 743 which is the content for storing a disc generated by the content editing facility 710 in the stampers as follows:

volume ID #1 for stamper 1 (725), and
volume ID #2 for stamper 2 (726).

The disc manufacturing processing is similar to the processing described with reference to FIG. 31, so description thereof will be omitted.

The content editing facility 710 directly provides the sub content 718 for download which is a program content to be applied to the playback processing of the main content 717 for storing a disc to the server 730 for executing providing processing of a download content to a user.

The disc manufacturing facility 720 executes no processing particularly as to a sub content, so the content editing facility 710 provides the sub content 718 to the server 730 without through the disc manufacturing facility 720. However, an arrangement may be made wherein the sub content 18 is provided to the server 730 through the disc manufacturing facility 720.

The server 730 holds the following data received from the content editing facility 710
sub content 711,
and further includes the following programs serving as application programs employed for content download processing
BD-J app #2 (731), and
BD-J app #3 (732).

Upon receiving a content download request from an unshown client (information processing device 150), the server 730 executes download content providing processing. This processing is basically the same processing as the processing described with reference to FIG. 31. However, the download content is an unencrypted content, so providing processing of a CPS unit key file is not demanded. The server 730 provides a program content to be applied to the playback processing of a disc stored content to the client (information processing device 150) as a server distributing content.

As described above, description has been made in detail regarding the present invention with reference to the specific embodiments. Note however, it is clearly evident that one skilled in the art can perform various modifications and alternations of the embodiments without departing from the essence of the present invention. That is to say, the present invention has been disclosed in an exemplification mode, and is not to be interpreted in a limited manner. The Claims should be referred to in order to determine the scope (essence) of the present invention.

The series of processing described in the present Specification may be executed by hardware, or software, or a compound arrangement of both. In a case of executing the processing by software, a program in which the processing sequence is recorded may be installed for execution in memory within a computer embedded in dedicated hardware, or the program may be installed for execution in a general-purpose computer which can execute various types of processing. For example, the program may be recorded in a recording medium beforehand. The program may be installed in a computer from the recording medium, and also may be received through a network such as a LAN (Local Area Network) or the Internet, and installed in a recording medium such as a built-in hard disk or the like.

Note that the various types of processing described in the present Specification may be executed not only in time-sequence following the order laid forth but also in parallel or individually according to the processing capabilities of a device for executing the processing or as appropriate. Also, with the present Specification, the term "system" represents a logical group arrangement of multiple devices, which is not restricted to an arrangement wherein the devices each having an individual configuration are housed in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device for executing a playback processing of a disc recorded content, comprising:
    circuitry configured to employ a playlist where content playback order information has been recorded to execute a playback of a content; and
    a local memory configured to store local memory stored content;
    wherein said circuitry is configured to
        play the local memory stored content instead of the disc recorded content specified with said playlist by a content obtaining processing employing mapping information for obtaining the local memory stored content as a playback content by employing disc recorded content information recorded in said playlist,
        execute a processing for reading out an identifier for identifying the disc or content recorded in the disc to transmit the identifier to a server,
        receive server content and a binding file from the server for storage in said local memory, said binding file indicating the disc recorded content and the local memory stored content,
        receive usage control permissions of the server content from said server for storage in said local memory,
        execute content usage control to which usage control information stored in said local memory has been applied independent of usage control information recorded in the disc,
        build a file system based on said binding file, and
        play the local memory stored content instead of the disc recorded content recorded in said playlist by a content playback processing employing said file system.

2. The information processing device according to claim 1, wherein said local memory stores the binding file.

3. The information processing device according to claim 1, wherein said circuitry receives a commercial content from said server for storage in said local memory, and executes a playback of the commercial content stored in said local memory instead of a commercial content recorded in the disc.

4. The information processing device according to claim 1, wherein said circuitry receives a commercial content and the playlist including playback specification information of the commercial content thereof from said server for storage in said local memory, and executes a playback processing by the playlist stored in said local memory to execute a playback of the commercial content stored in said local memory.

5. The information processing device according to claim 1, wherein said circuitry receives the server content and the playlist from said server for storage in said local memory, and employs the playlist stored in said local memory to execute a playback of a commercial content stored in said local memory.

6. The information processing device according to claim 1, wherein said circuitry receives a program content from said server for storage in said local memory, and executes a playback of the program content stored in said local memory.

7. The information processing device according to claim 6, wherein said circuitry transmits component information of the program content stored in said disc to said server, receives a program component equivalent to a difference as to the disc stored program content from said server for storage in said local memory, and performs a program execution processing employing both of the disc stored program content and the local memory stored program content.

8. A content using system, comprising:
an information processing device configured to execute a playback processing of a disc recorded content; and
a server configured to execute a content providing processing;
wherein said information processing device reads out an identifier for identifying the disc or content recorded in the disc mounted on said information processing device for a transmission to said server;
said server transmits a content selected based on said identifier received from said information processing device, and a binding file having mapping information of the disc recorded content and local memory stored content to said information processing device, the mapping information indicating the disc recorded content and the local memory stored content;
said information processing device also receives usage control permissions of the server content from said server for storage in said local memory, and executes content usage control to which usage control information stored in said local memory has been applied independent of usage control information recorded in the disc;
said information processing device stores the content and the binding file received from said server in the local memory of said information processing device;
and the local memory stored content is played instead of the disc recorded content specified with a playlist by a content playback processing employing the mapping information of said binding file;
said information processing device builds a file system based on said binding file, and plays the local memory stored content instead of the disc recorded content recorded in said playlist by a content playback processing employing said file system.

9. A storage medium storing a computer program for causing an information processing device to execute an execution information processing, which is a content playback wherein circuitry of the information processing device executes a playback of a content by employing a playlist where content playback order information has been recorded, comprising:
playing a local memory stored content instead of a disc recorded content specified with said playlist by a content obtaining processing employing mapping information for obtaining the local memory stored content as a playback content by employing disc recorded content information recorded in said playlist;
reading out an identifier for identifying the disc or content recorded in the disc for a transmission to a server; and
receiving a content and a binding file from the server to store in said local memory, said binding file indicating the disc recorded content and the local memory stored content,
receiving usage control permissions of the server content from said server for storage in said local memory, and
executing a content usage control to which usage control information stored in said local memory has been applied independent of usage control information recorded in the disc;
building a file system based on said binding file, wherein the step of playing includes playing the local memory stored content instead of the disc recorded content recorded in said playlist by a content playback processing employing said file system.

\* \* \* \* \*